(12) United States Patent
Feldman et al.

(10) Patent No.: US 12,449,336 B2
(45) Date of Patent: Oct. 21, 2025

(54) TESTING DEVICES

(71) Applicant: HERO SCIENTIFIC LTD., Jerusalem (IL)

(72) Inventors: Zvi Feldman, Sde Zvi (IL); Robert Eric Levitz, Beit Shemesh (IL); Leah Forgosh, West Hartford, CT (US); Avi Fruchter, Neve Daniel (IL)

(73) Assignee: HERO SCIENTIFIC LTD., Jerusalem (IL)

( * ) Notice: Subject to any disclaimer, the term of this patent is extended or adjusted under 35 U.S.C. 154(b) by 516 days.

(21) Appl. No.: 17/802,614

(22) PCT Filed: Mar. 11, 2021

(86) PCT No.: PCT/IB2021/052056
§ 371 (c)(1),
(2) Date: Aug. 26, 2022

(87) PCT Pub. No.: WO2021/181339
PCT Pub. Date: Sep. 16, 2021

(65) Prior Publication Data
US 2023/0096409 A1    Mar. 30, 2023

Related U.S. Application Data

(60) Provisional application No. 62/988,145, filed on Mar. 11, 2020.

(51) Int. Cl.
*G01N 1/40* (2006.01)

(52) U.S. Cl.
CPC .................. *G01N 1/4077* (2013.01)

(58) Field of Classification Search
CPC ................... G01N 1/40; G01N 1/4005; G01N 2001/4016; G01N 2001/4088
See application file for complete search history.

(56) References Cited

U.S. PATENT DOCUMENTS

| 1,856,811 A | 5/1932 | Inaki |
| 2,425,945 A | 8/1947 | Leach |
| (Continued) | | |

FOREIGN PATENT DOCUMENTS

| CN | 1084045 A | 3/1994 |
| CN | 102325598 A | 1/2012 |
| (Continued) | | |

OTHER PUBLICATIONS

Invitation to Pay Additional Fees dated Jun. 5, 2023 issued in Application No. PCT/IL2023/050014.

(Continued)

*Primary Examiner* — Alexander A Mercado
(74) *Attorney, Agent, or Firm* — Sughrue Mion, PLLC

(57) ABSTRACT

A method is provided that includes introducing a fluid sample (19) into a fluid container (2, 502, 702) of a filtration assembly (20, 500, 720) and passing the fluid sample (19) through a porous filter (5, 705) by distally advancing a plunger (3, 610, 703) within the fluid container (2, 502, 702), thereby capturing, on or within the porous filter (5, 705) at least a portion of any particulate present in the fluid sample (19). Thereafter, a cavity (28, 628, 728) is created within the fluid container (2, 502, 702) between a distal end of the plunger and a distal end (49, 549, 749) of the fluid container (2, 502, 702) by proximally partially withdrawing the plunger (3, 610, 703) within the fluid container (2, 502, 702), while one or more vacuum-prevention openings (11, 711) are open. An extraction liquid (30) is prepared by introducing one or more extraction reagents (29) into the cavity (28, 628, 728) and bathing the porous filter (5, 705). The extraction liquid (30) is tested for the presence of a biological target. Other embodiments are also described.

37 Claims, 40 Drawing Sheets

(56) References Cited

U.S. PATENT DOCUMENTS

| | | |
|---|---|---|
| 2,857,908 A | 10/1958 | Cornfield |
| 3,295,686 A | 1/1967 | Kruger |
| 3,449,081 A | 6/1969 | Hughes |
| 3,481,712 A | 12/1969 | Bernstein et al. |
| 3,745,090 A | 7/1973 | Chappelle |
| 3,897,902 A | 8/1975 | Yanez |
| 3,933,592 A | 1/1976 | Clendenning |
| 3,971,703 A | 7/1976 | Picciolo et al. |
| 4,144,134 A | 3/1979 | Plakas |
| 4,303,752 A | 12/1981 | Kolehmainen et al. |
| 4,421,848 A | 12/1983 | Whitlock |
| 4,503,149 A | 3/1985 | Boyd |
| 4,698,311 A | 10/1987 | Hall et al. |
| 4,729,846 A | 3/1988 | Matsui et al. |
| 4,829,005 A | 5/1989 | Friedman et al. |
| 4,863,602 A | 9/1989 | Johnson |
| 4,902,421 A | 2/1990 | Pascale et al. |
| 4,906,565 A | 3/1990 | Vossen |
| 5,024,237 A | 6/1991 | Guirguis |
| 5,073,272 A | 12/1991 | O'Neill et al. |
| 5,077,012 A | 12/1991 | Guirguis |
| 5,139,031 A | 8/1992 | Guirguis |
| 5,186,897 A | 2/1993 | Eason et al. |
| 5,238,812 A | 8/1993 | Coulter et al. |
| 5,258,285 A | 11/1993 | Aegidius |
| 5,264,184 A | 11/1993 | Aysta et al. |
| 5,339,829 A | 8/1994 | Thieme et al. |
| 5,376,337 A | 12/1994 | Seymour |
| 5,403,551 A | 4/1995 | Galloway et al. |
| 5,405,527 A | 4/1995 | Covington |
| 5,427,739 A | 6/1995 | Meserol et al. |
| 5,429,742 A | 7/1995 | Gutman et al. |
| 5,576,185 A | 11/1996 | Coulter et al. |
| 5,595,653 A | 1/1997 | Good et al. |
| 5,634,885 A | 6/1997 | Kiro |
| 5,690,825 A | 11/1997 | Parton |
| 5,695,989 A | 12/1997 | Kalamasz |
| 5,736,351 A | 4/1998 | Miller et al. |
| 5,776,341 A | 7/1998 | Barnard et al. |
| 5,830,359 A | 11/1998 | Knight et al. |
| 5,868,928 A | 2/1999 | Bradley |
| 5,888,729 A | 3/1999 | Kacian et al. |
| 5,891,702 A | 4/1999 | Sakakibara et al. |
| 5,897,492 A | 4/1999 | Feller et al. |
| 5,905,029 A | 5/1999 | Andreotti et al. |
| 5,908,751 A | 6/1999 | Higo et al. |
| 5,980,456 A | 11/1999 | Falcone |
| 6,004,766 A | 12/1999 | Atrache et al. |
| 6,015,681 A | 1/2000 | Ralls et al. |
| 6,045,913 A | 4/2000 | Castle |
| 6,090,572 A | 7/2000 | Crosby |
| 6,140,040 A | 10/2000 | Palm et al. |
| 6,152,887 A | 11/2000 | Blume |
| 6,174,704 B1 | 1/2001 | Chu et al. |
| 6,197,598 B1 | 3/2001 | Schrier et al. |
| 6,200,767 B1 | 3/2001 | Sakakibara et al. |
| 6,207,445 B1 | 3/2001 | Crosby |
| 6,221,655 B1 | 4/2001 | Fung et al. |
| 6,251,660 B1 | 6/2001 | Muir et al. |
| 6,265,229 B1 | 7/2001 | Fodstad et al. |
| 6,451,260 B1 | 9/2002 | Dusterhoft et al. |
| 6,465,201 B1 | 10/2002 | Presente et al. |
| 6,531,578 B1 | 3/2003 | Webber et al. |
| 6,565,749 B1 | 5/2003 | Hou et al. |
| 6,576,460 B1 | 6/2003 | Baeumner et al. |
| 6,588,681 B2 | 7/2003 | Rothrum et al. |
| 6,641,543 B1 | 11/2003 | Osgoodby |
| 6,660,489 B2 | 12/2003 | Schrecengost et al. |
| 6,677,129 B1 | 1/2004 | Blume |
| 6,767,714 B2 | 7/2004 | Nazareth et al. |
| 6,811,971 B2 | 11/2004 | Klepp et al. |
| 6,824,560 B2 | 11/2004 | Pelton |
| 6,846,648 B2 | 1/2005 | Maes |
| 6,861,067 B2 | 3/2005 | Mcghee et al. |
| 6,911,148 B1 | 6/2005 | Demmer et al. |
| 6,967,261 B1 | 11/2005 | Soerens et al. |
| 6,991,898 B2 | 1/2006 | O'Connor |
| 7,005,143 B2 | 2/2006 | Abuelyaman et al. |
| 7,045,913 B2 | 5/2006 | Ebrahim et al. |
| 7,052,831 B2 | 5/2006 | Fletcher et al. |
| 7,060,223 B2 | 6/2006 | Dicesare et al. |
| 7,083,911 B2 | 8/2006 | Wood et al. |
| 7,141,033 B2 | 11/2006 | Kanjilal et al. |
| 7,160,689 B2 | 1/2007 | Matsumoto et al. |
| 7,282,181 B2 | 10/2007 | Hudak et al. |
| 7,338,692 B2 | 3/2008 | Smith et al. |
| 7,422,868 B2 | 9/2008 | Fan et al. |
| 7,485,609 B2 | 2/2009 | Reddy et al. |
| 7,553,417 B2 | 6/2009 | Waller, Jr. et al. |
| 7,618,591 B2 | 11/2009 | Slowey et al. |
| 7,642,060 B2 | 1/2010 | Nagar et al. |
| 7,682,688 B2 | 3/2010 | Smith |
| 7,682,835 B2 | 3/2010 | Giordano |
| 7,824,732 B2 | 11/2010 | Sahouani et al. |
| 7,837,939 B2 | 11/2010 | Tung et al. |
| 7,927,548 B2 | 4/2011 | Slowey et al. |
| 7,935,161 B1 | 5/2011 | Adams et al. |
| 7,993,283 B1 | 8/2011 | Altschul |
| 8,030,088 B2 | 10/2011 | Mccash et al. |
| 8,039,206 B1 | 10/2011 | Keenan |
| 8,057,608 B1 | 11/2011 | Saaski et al. |
| 8,069,690 B2 | 12/2011 | Desantolo et al. |
| 8,110,112 B2 | 2/2012 | Alburty et al. |
| 8,142,570 B1 | 3/2012 | Saaski et al. |
| 8,268,634 B2 | 9/2012 | Wu et al. |
| 8,272,255 B2 | 9/2012 | Halverson et al. |
| 8,278,091 B2 | 10/2012 | Rutter et al. |
| 8,281,937 B2 | 10/2012 | Collins et al. |
| 8,287,809 B2 | 10/2012 | Gould et al. |
| 8,322,539 B1 | 12/2012 | Ellis et al. |
| 8,343,726 B2 | 1/2013 | Boone et al. |
| 8,404,479 B2 | 3/2013 | Shimizu et al. |
| 8,475,739 B2 | 7/2013 | Holmes et al. |
| 8,541,242 B2 | 9/2013 | Boone et al. |
| 8,546,100 B2 | 10/2013 | Kshirsagar et al. |
| 8,562,572 B2 | 10/2013 | Proulx et al. |
| 8,563,264 B2 | 10/2013 | Halverson et al. |
| 8,569,072 B2 | 10/2013 | Halverson et al. |
| 8,584,535 B2 | 11/2013 | Page et al. |
| 8,597,878 B2 | 12/2013 | Hillebrand et al. |
| 8,603,008 B2 | 12/2013 | Libby et al. |
| 8,640,882 B2 | 2/2014 | Collins et al. |
| 8,647,508 B2 | 2/2014 | Halverson |
| 8,647,574 B2 | 2/2014 | Halverson et al. |
| 8,647,890 B2 | 2/2014 | Aberl et al. |
| 8,664,001 B2 | 3/2014 | Niskanen et al. |
| 8,685,746 B2 | 4/2014 | Halverson et al. |
| 8,709,796 B2 | 4/2014 | Faure et al. |
| 8,726,744 B2 | 5/2014 | Alburty et al. |
| 8,741,595 B2 | 6/2014 | Kshirsagar |
| 8,871,155 B2 | 10/2014 | Wu et al. |
| 8,898,069 B2 | 11/2014 | Hood et al. |
| 8,900,462 B2 | 12/2014 | Yamada et al. |
| 8,940,527 B2 | 1/2015 | Guirguis |
| 9,044,694 B2 | 6/2015 | Hacker et al. |
| 9,103,843 B2 | 8/2015 | Nieuwenhuis et al. |
| 9,113,850 B2 | 8/2015 | Skakoon |
| 9,115,382 B2 | 8/2015 | Bell |
| 9,295,453 B2 | 3/2016 | Katz |
| 9,297,804 B2 | 3/2016 | Palmon et al. |
| 9,314,570 B2 | 4/2016 | Kim |
| 9,327,284 B2 | 5/2016 | Rosman et al. |
| 9,328,325 B2 | 5/2016 | Kshirsagar et al. |
| 9,360,404 B2 | 6/2016 | Okanojo et al. |
| 9,381,000 B2 | 7/2016 | Morsey |
| 9,382,570 B2 | 7/2016 | Rajagopal et al. |
| 9,388,448 B2 | 7/2016 | Halverson |
| 9,470,612 B2 | 10/2016 | Rajagopal et al. |
| 9,482,351 B2 | 11/2016 | Proulx et al. |
| 9,546,391 B2 | 1/2017 | Rey et al. |
| 9,592,508 B2 | 3/2017 | Holmes et al. |
| 9,675,755 B2 | 6/2017 | Shick et al. |
| 9,709,468 B2 | 7/2017 | Ebi et al. |
| 9,719,125 B2 | 8/2017 | Kshirsagar et al. |

(56) References Cited

U.S. PATENT DOCUMENTS

| | | |
|---|---|---|
| 9,945,855 B2 | 4/2018 | Carrino et al. |
| 9,987,633 B2 | 6/2018 | Roscoe et al. |
| 10,106,830 B2 | 10/2018 | Maitra et al. |
| 10,376,878 B2 | 8/2019 | Calanca et al. |
| 10,612,258 B2 | 4/2020 | Coelho et al. |
| 10,993,705 B2 | 5/2021 | Katz et al. |
| 2002/0127630 A1 | 9/2002 | Diguiseppi et al. |
| 2003/0003441 A1 | 1/2003 | Colston et al. |
| 2003/0057147 A1 | 3/2003 | Sutcliffe |
| 2003/0064526 A1 | 4/2003 | Niedbala et al. |
| 2003/0092086 A1 | 5/2003 | Hirata et al. |
| 2003/0098271 A1 | 5/2003 | Somack et al. |
| 2003/0104507 A1 | 6/2003 | Wood et al. |
| 2003/0153021 A1 | 8/2003 | Lu et al. |
| 2003/0211566 A1 | 11/2003 | Gazenko |
| 2004/0005246 A1 | 1/2004 | Efthimiadis et al. |
| 2004/0038425 A1 | 2/2004 | Ferguson et al. |
| 2004/0149636 A1 | 8/2004 | Backes |
| 2004/0157971 A1 | 8/2004 | Kim |
| 2004/0161788 A1 | 8/2004 | Chen et al. |
| 2004/0197845 A1 | 10/2004 | Hassibi et al. |
| 2004/0220498 A1 | 11/2004 | Li et al. |
| 2005/0048592 A1 | 3/2005 | Wood et al. |
| 2005/0070701 A1 | 3/2005 | Hochstetler et al. |
| 2005/0142571 A1 | 6/2005 | Parthasarathy et al. |
| 2005/0152992 A1 | 7/2005 | Johnson et al. |
| 2005/0153423 A1 | 7/2005 | Baba et al. |
| 2005/0181467 A1 | 8/2005 | Schrecengost et al. |
| 2005/0189290 A1 | 9/2005 | Maiden |
| 2005/0244943 A1 | 11/2005 | Ladisch et al. |
| 2005/0250138 A1 | 11/2005 | Young et al. |
| 2006/0062854 A1 | 3/2006 | Chandra et al. |
| 2006/0166347 A1 | 7/2006 | Faulstich et al. |
| 2006/0184085 A1 | 8/2006 | Kimura et al. |
| 2006/0273049 A1 | 12/2006 | Leach et al. |
| 2007/0062870 A1 | 3/2007 | Chen et al. |
| 2007/0148458 A1 | 6/2007 | Sahouani et al. |
| 2007/0212266 A1 | 9/2007 | Johnston et al. |
| 2007/0254320 A1 | 11/2007 | Olstein |
| 2007/0269341 A1 | 11/2007 | Halverson et al. |
| 2008/0023408 A1 | 1/2008 | Hansen |
| 2008/0064939 A1 | 3/2008 | Reynolds et al. |
| 2008/0078717 A1 | 4/2008 | Shigesada et al. |
| 2008/0153125 A1 | 6/2008 | Buttry et al. |
| 2008/0207794 A1 | 8/2008 | Wright et al. |
| 2009/0011403 A1 | 1/2009 | Smith et al. |
| 2009/0068065 A1 | 3/2009 | Pagoria et al. |
| 2009/0258411 A1 | 10/2009 | Petithory et al. |
| 2009/0281483 A1 | 11/2009 | Baker et al. |
| 2010/0190171 A1 | 7/2010 | Kshirsagar et al. |
| 2010/0209927 A1 | 8/2010 | Menon et al. |
| 2010/0209961 A1 | 8/2010 | Kshirsagar et al. |
| 2010/0248214 A1 | 9/2010 | Kshirsagar et al. |
| 2010/0248350 A1 | 9/2010 | Gazenko |
| 2010/0273177 A1 | 10/2010 | Piasio et al. |
| 2011/0315625 A1 | 12/2011 | Keenan et al. |
| 2011/0318814 A1 | 12/2011 | Kshirsagar et al. |
| 2012/0107799 A1 | 5/2012 | Daum |
| 2012/0156114 A1 | 6/2012 | Ziegman et al. |
| 2012/0203167 A1 | 8/2012 | Johnson |
| 2012/0301907 A1 | 11/2012 | Sellappan et al. |
| 2013/0023443 A1 | 1/2013 | Shirai et al. |
| 2013/0059290 A1 | 3/2013 | Armes |
| 2013/0244225 A1 | 9/2013 | Kshirsagar et al. |
| 2013/0260370 A1 | 10/2013 | Kshirsagar et al. |
| 2014/0110356 A1 | 4/2014 | Mckay |
| 2014/0315221 A1 | 10/2014 | Morsey |
| 2015/0010918 A1 | 1/2015 | Ruvinsky |
| 2015/0031040 A1 | 1/2015 | Calanca et al. |
| 2015/0076069 A1 | 3/2015 | Ellis et al. |
| 2015/0093749 A1 | 4/2015 | Ling |
| 2015/0133574 A1 | 5/2015 | Kshirsagar et al. |
| 2016/0209305 A1 | 7/2016 | Kshirsagar et al. |
| 2016/0296927 A1 | 10/2016 | Kirschhoffer et al. |
| 2016/0341641 A1 | 11/2016 | Williams et al. |
| 2017/0043336 A1 | 2/2017 | Khattak et al. |
| 2017/0248503 A1 | 8/2017 | Kshirsagar et al. |
| 2017/0283792 A1 | 10/2017 | Benitez Porras et al. |
| 2018/0051313 A1 | 2/2018 | Rajagopal et al. |
| 2018/0339292 A1 | 11/2018 | Katz et al. |
| 2019/0381498 A1 | 12/2019 | Fruchter et al. |
| 2019/0383807 A1 | 12/2019 | Connelly et al. |
| 2020/0070071 A1 | 3/2020 | Chin |
| 2020/0140251 A1 | 5/2020 | Katz et al. |
| 2021/0102876 A1 | 4/2021 | Fruchter et al. |
| 2022/0288583 A1 | 9/2022 | Katz et al. |
| 2023/0152192 A1 | 5/2023 | Feldman et al. |
| 2023/0165570 A1 | 6/2023 | Levitz et al. |

FOREIGN PATENT DOCUMENTS

| | | |
|---|---|---|
| CN | 206910919 U | 1/2018 |
| CN | 109567967 A | 4/2019 |
| EP | 0364173 A1 | 4/1990 |
| EP | 0378353 A2 | 7/1990 |
| EP | 0520408 A2 | 12/1992 |
| EP | 0 952 209 A2 | 10/1999 |
| EP | 1089800 B1 | 11/2003 |
| EP | 1166078 B1 | 9/2004 |
| EP | 1674867 B1 | 7/2009 |
| EP | 2214830 B1 | 9/2012 |
| EP | 2214829 B1 | 12/2012 |
| EP | 2217378 B1 | 2/2013 |
| EP | 2217377 B1 | 9/2013 |
| EP | 1907527 B1 | 2/2016 |
| EP | 3290920 A1 | 3/2018 |
| EP | 2868742 B1 | 8/2018 |
| GB | 2411668 B | 7/2008 |
| JP | 1-312991 A | 12/1989 |
| JP | 5-203649 A | 8/1993 |
| JP | 2002-153297 A | 5/2002 |
| JP | 2003-38162 A | 2/2003 |
| JP | 2003-215126 A | 7/2003 |
| JP | 2004-279113 A | 10/2004 |
| JP | 2005-257604 A | 9/2005 |
| JP | 2006-167411 A | 6/2006 |
| JP | 2013-107 A | 1/2013 |
| JP | 2017-181131 A | 10/2017 |
| JP | 6931839 B1 | 9/2021 |
| WO | 89/09279 A1 | 10/1989 |
| WO | 93/01271 A1 | 1/1993 |
| WO | 96/04067 A1 | 2/1996 |
| WO | 00/21973 A1 | 4/2000 |
| WO | 00/29112 A1 | 5/2000 |
| WO | 01/14257 A1 | 3/2001 |
| WO | 03/069301 A2 | 8/2003 |
| WO | 2004/015413 A1 | 2/2004 |
| WO | 2006/100452 A1 | 9/2006 |
| WO | 2007/050072 A1 | 5/2007 |
| WO | 2007/137257 A2 | 11/2007 |
| WO | 2008/075044 A2 | 6/2008 |
| WO | 2008/093329 A2 | 8/2008 |
| WO | 2009/018544 A1 | 2/2009 |
| WO | 2009/048743 A1 | 4/2009 |
| WO | 2009/067498 A1 | 5/2009 |
| WO | 2009/067503 A1 | 5/2009 |
| WO | 2009/067513 A1 | 5/2009 |
| WO | 2009/067518 A1 | 5/2009 |
| WO | 2009/082667 A1 | 7/2009 |
| WO | 2010/056128 A1 | 5/2010 |
| WO | 2012/031156 A1 | 3/2012 |
| WO | 2013/013253 A1 | 1/2013 |
| WO | 2013/082301 A1 | 6/2013 |
| WO | 2014/048263 A1 | 4/2014 |
| WO | 2014/145810 A2 | 9/2014 |
| WO | 2017/027956 A1 | 2/2017 |
| WO | 2017/112911 A1 | 6/2017 |
| WO | 2018/102783 A1 | 6/2018 |
| WO | 2019/060950 A1 | 4/2019 |
| WO | 2019/139901 A1 | 7/2019 |
| WO | 2020/049569 A2 | 3/2020 |
| WO | 2021/181338 A1 | 9/2021 |
| WO | 2021/229564 A1 | 11/2021 |
| WO | 2022/044002 A1 | 3/2022 |

(56) References Cited

FOREIGN PATENT DOCUMENTS

OTHER PUBLICATIONS

Office Action dated Jun. 27, 2023 from the Japanese Patent Office in Application No. 513275/2021.
Non-Final Office Action issued May 12, 2023 by the United States Patent and Trademark Office in U.S. Appl. No. 18/093,942.
Arnold, John C. and Victor Nizet. (2002). 27 "Pharyngitis". Clin Infect Dis., 35:, pp. 113-125.
Bernheimer, A. W. and Pappenheimer A. M. Jr., "Factors necessary for massive growth of Group A hemolytic Streptococcus", Journal of Bacteriology, 1941, vol. 43, No. 4, pp. 481-494.
Decelle JG & Taylor GR., "Autoflora in the Upper Respiratory Tract of Apollo Astronauts", Applied and Environmental Microbiology, Nov. 1976, vol. 32, No. 5, pp. 659-665.
Edwards E.A et al., "Diagnosis of Group A Streptococcal Infections Directly from Throat Secretions," Journal of Clinical Microbiology, Mar. 1982, vol. 15, No. 3, pp. 481-483.
Covalciuc KA et al., "Comparison of Four Clinical Specimen Types for Detection of Influenza A and B Viruses by Optical Immunoassay (Flu Oia Test) and Cell Culture Methods," Journal of Clinical Microbiology, Dec. 1999, vol. 37, No. 12, p. 3971-3974.
Bisno, Alan L., Michael A. Gerber, Jack M. Gwaltney Jr., Edward L. Kaplan, and Richard H. Schwartz., "Practice Guidelines for the Diagnosis and Management of Group A Streptococcal Pharyngitis", Clinical Infectious Diseases, 2002, vol. 35, pp. 113-125.
Fox, James W et al., "Diagnosis of Streptococcal Pharyngitis by Detection of *Streptococcus pyogenes* in Posterior Pharyngeal versus Oral Cavity Specimens", Journal of Clinical Microbiology, Jul. 2006, vol. 44, No. 7, pp. 2593-2594.
Gao Y et al., "The Scl1 of M41-type group A *Streptococcus* binds the high-density lipoprotein," FEMS Microbiol Lett., Aug. 1, 2010, vol. 309, No. 1, pp. 55-61.
Thais Francini Garbieri et al., "Human DNA extraction from whole saliva that was fresh or stored for 3, 6 or 12 months using five different protocols", J. Appl. Oral Sci., Mar./Apr. 2017, vol. 25, No. 2.
Morton Hamburger Jr., "Studies on the Transmission of Hemolytic Streptococcus Infections: II. Beta Hemolytic Streptococci in the Saliva of Persons with Positive Throat Cultures" The Journal of Infectious Diseases, 1944, vol. 75, No. 1, pp. 71-78. https://www.jstor.org/stable/30089409.
Johnston DA & Bodey GP, "Semiquantitative Oropharyngeal Culture Technique", Applied Microbiology, Aug. 1970, vol. 20, No. 2, pp. 218-223.
Jordens JZ, et al., "Detection of Meningococcal Carriage by Culture and PCR of Throat Swabs and Mouth Gargles", J. Clin. Microbiol., Jan. 2002, vol. 40, No. 1, pp. 75-79.
Kaplan, Edward L., Robert Couser, Barbara Ballard Huwe, Carolyn Mckay, and Lewis W. Wannamaker. (1979). "Significance of Quantitative Salivary Cultures for Group A and Non-group A Beta-Hemolytic Streptococci in Patients with Pharyngitis and in Their Family Contacts", Pediatrics. 64(6): 904-912.
McKesson Strep_A_5003_insert_2015_12.
Spellerberg, Barbara and Claudia Brandt. (2016). "Laboratory Diagnosis of *Streptococcus pyogenes*(group A streptococci)", In Ferretti JJ, Stevens DL, Fischetti VA (Ed), *Streptococcus pyogenes*: Basic Biology to Clinical Manifestations [Internet] Oklahoma City (OK): University of Oklahoma Health Sciences Center, 2016.
Thermo Scientific Titan3 and Target2 Syringe Filters Product Catalog 2016.
Mlmaz F et al. (Abstract) 2008, "Effectiveness of rapid antigen test with throat gargle in detecting group A beta-hemolytic streptococci," Kulak Burun Bogaz Ihtis Derg. Sep.-Oct. 2008;18(5):280-3.
Yilmaz, Fahrettin, et al.(2008). "Boğaz gargaras ile yapilan hizli antijen testinin grup A beta-hemolitik streptokoklari saptamadaki etkinliği". Kulak Burun Bogaz Ihtis Derg. 18(5): 280-283. Klinik Çalişma. Turkish.
Yilmaz, Fahrettin, et al. (2008). "Effectiveness of rapid antigen test with throat gargle in detecting group A beta-hemolytic streptococci". Journal of Ear Nose and Throat. 18(5): 280-283. Clinical Study. Google Translation.
An International Search Report and a Written Opinion both dated Jun. 29, 2020, which issued during the prosecution of Applicant's PCT/IL2019/050997.
An International Search Report and a Written Opinion both dated Dec. 31, 2019, which issued during the prosecution of Applicant's PCT/IL2019/050994.
An International Search Report and a Written Opinion both dated Aug. 23, 2018, which issued during the prosecution of Applicant's PCT/IL2018/050225.
An Invitation to pay additional fees dated Mar. 3, 2020, which issued during the prosecution of Applicant's PCT/IL2019/050997.
An Office Action dated Jul. 21, 2017, which issued during the prosecution of UK Patent Application No. 1703383.8.
An Invitation to pay additional fees dated Jun. 12, 2018, which issued during the prosecution of Applicant's PCT/IL2018/050225.
"DNA extraction from water: 50-50-50 buffer-chloroform/phenol method", Laboratory for Environmental Pathogens Research, Department of Environmental Sciences, University of Toledo, Oct. 1, 2004, pp. 1-5.
International Search Report and Written Opinion dated Dec. 3, 2020, in International Application No. PCT/IL2020/050957.
Invitation to Pay Additional Fees issued May 25, 2022 in International Application No. PCT/IL2022/050024.
ISR and Written Opinion in PCT/IL2021/051035, dated Jan. 10, 2022.
Karabay et al., "Efficacy of Throat Gargling for Detection of Group A Beta-Hemolytic Streptococcus", Jpn. J. Infect. Dis., 2005, vol. 58, pp. 39-40.
Notice of Allowance issued in the counterpart Chinese Application CN 201880028401.4 dated Oct. 25, 2022.
Office Action issued Jul. 15, 2022 in U.S. Appl. No. 17/122,594.
Office Action issued Jul. 8, 2022 in European Application No. 19769600.8.
Official Action dated Oct. 15, 2021 in Chinese Appl. No. CN 201880028401.4.
"Oil filter", Wikipedia, Accessed via the Internet: https://en.wikipedia.org/w/index.php?title=Oil_filter&oldid=978674262 Nov. 24, 2020 (5 pages total).
Translation of Office Action issued Apr. 15, 2022 in Chinese Application No. 201880028401.4.
Written Opinion of the International Searching Authority issued Jul. 21, 2022 in International Application No. PCT/IL2022/050024.
International Search Report issued Jun. 22, 2021 in International Application No. PCT/IB2021/052055.
Written Opinion of the International Searching Authority issued Jun. 22, 2021 in International Application No. PCT/IB2021/052055.
International Search Report issued Jun. 22, 2021 in International Application No. PCT/IB2021/052056.
Written Opinion of the International Searching Authority issued Jun. 22, 2021 in International Application. No. PCT/IB2021/052056.
Ek et al., "A combination of naso- and oropharyngeal swabs improves the diagnostic yield of respiratory viruses in adult emergency department patients", Infectious Diseases, 2019, vol. 51, No. 4, pp. 241-248.
Kim et al., "Comparison of Nasopharyngeal and Oropharyngeal Swabs for the Diagnosis of Eight Respiratory Viruses by Real-Time Reverse Transcription-PCR Assays", PLoS ONE, Jun. 2011, vol. 6, Issue 6, e21610, pp. 1-6.
Maowei Dou et al., "A low-cost microfluidic platform for rapid and instrument-free detection of whooping cough", Analytica Chimica Acta, 2019, vol. 1065, pp. 71-78.
Gilles Duverlie et al., "A nylon membrane enzyme immunoassay for rapid diagnosis of influenza A infection", Journal of Virological Methods, 1992, vol. 40, pp. 77-84.
Black et al., "Reverse transcriptase-polymerase chain reaction for the detection of equine rhinitis B viruses and cell culture isolation of the virus", Arch Virol, 2007, vol. 152, pp. 137-149.

(56) References Cited

OTHER PUBLICATIONS

International Search Report and Written Opinion dated Aug. 4, 2021 in International Application No. PCT/IL2021/050519.
Non-Final Office Action dated Mar. 25, 2021 in U.S. Appl. No. 16/489,853.
Final Office Action dated Aug. 24, 2021 in U.S. Appl. No. 16/489,853.
Non-Final Office Action dated Apr. 1, 2022 in U.S. Appl. No. 16/489,853.
Notice of Allowance including Examiner's Interview Summary dated Nov. 15, 2022 in U.S. Appl. No. 16/489,853.
Restriction Requirement issued in U.S. Appl. No. 17/270,544, dated Feb. 22, 2023.
Non-Final Office Action issued in U.S. Appl. No. 18/093,939, dated Oct. 20, 2023.
Office Action in Chinese Appl. No. CN 202211157897.X, dated Jan. 31, 2024.

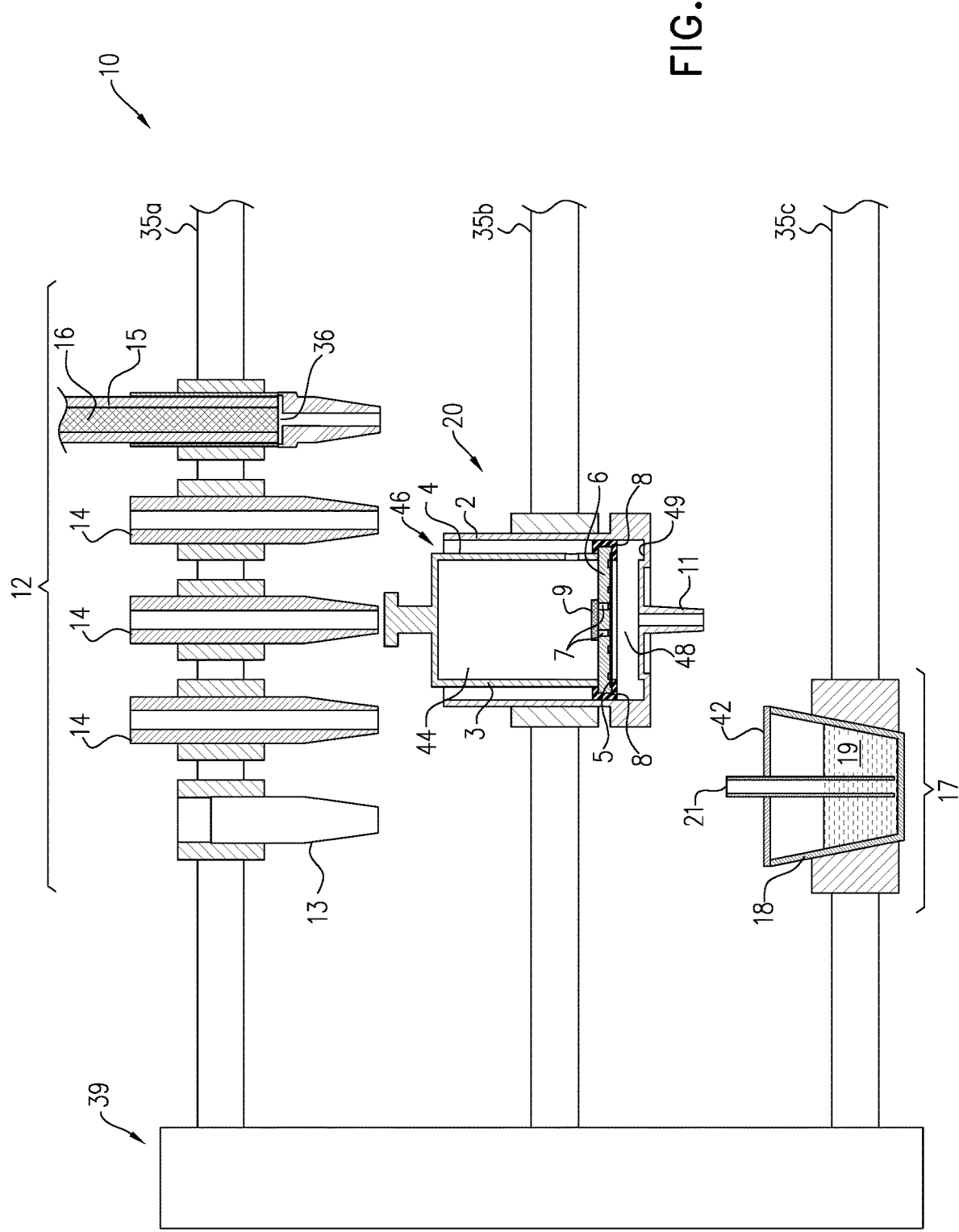

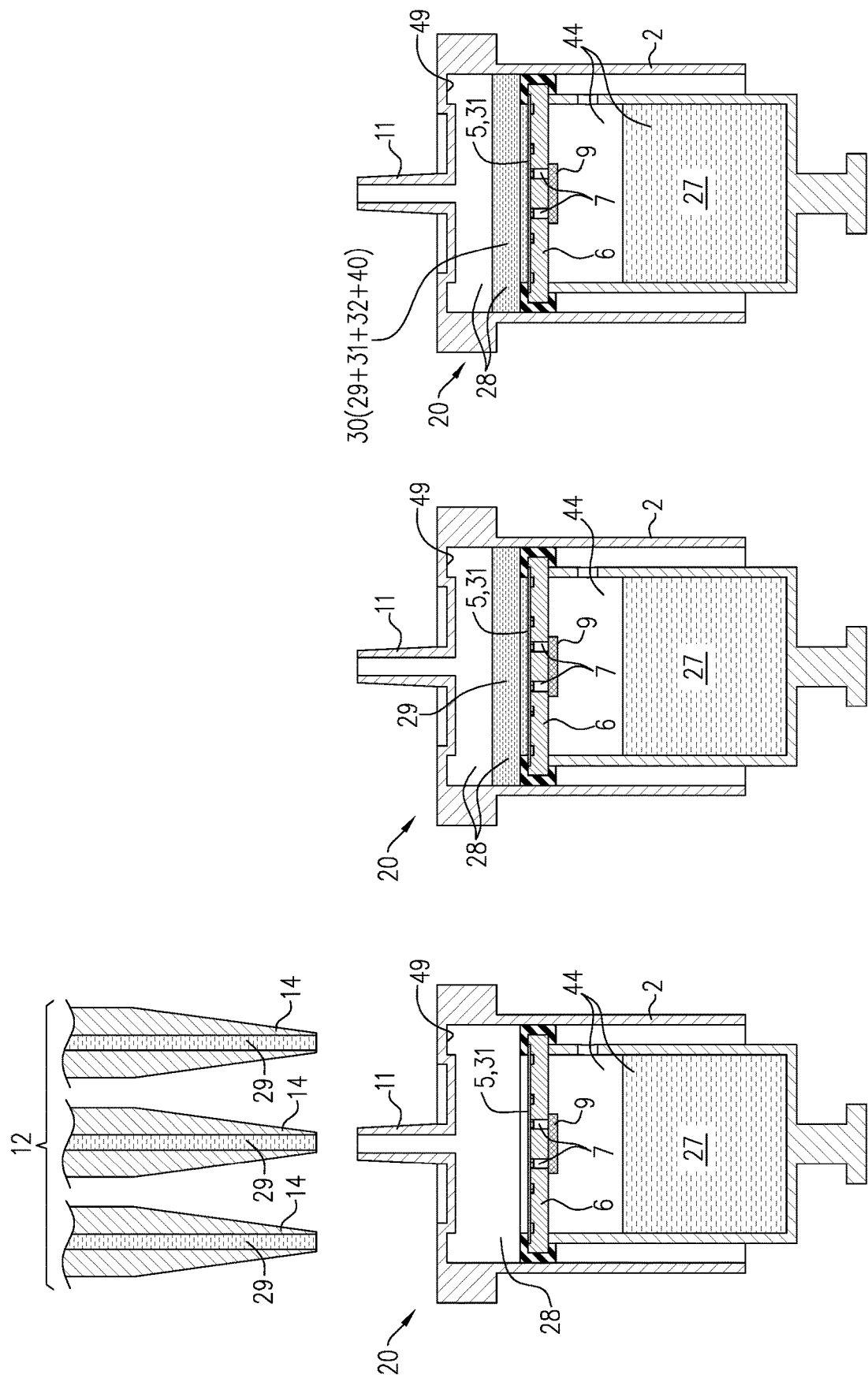

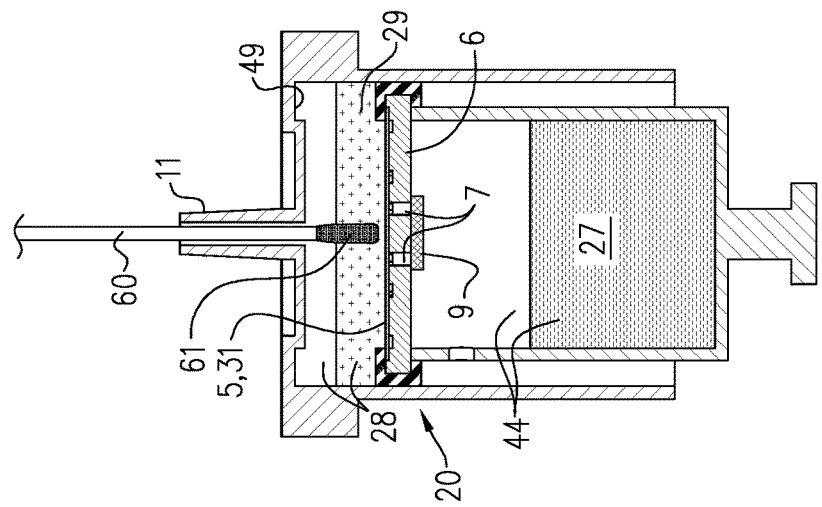
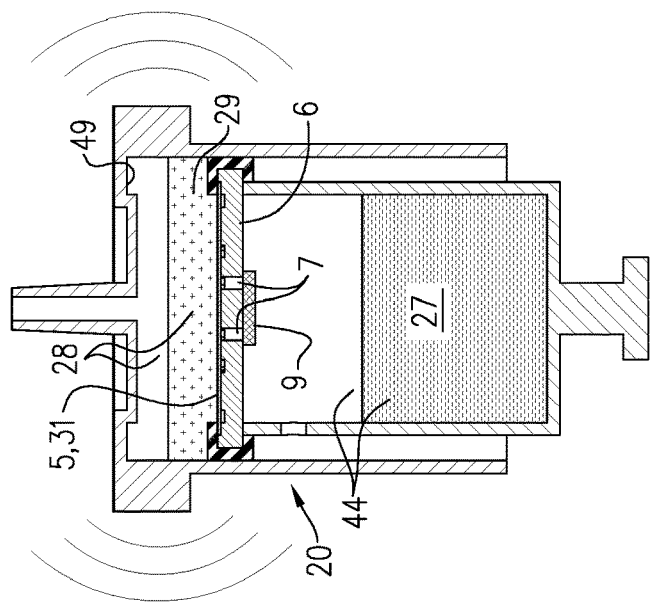
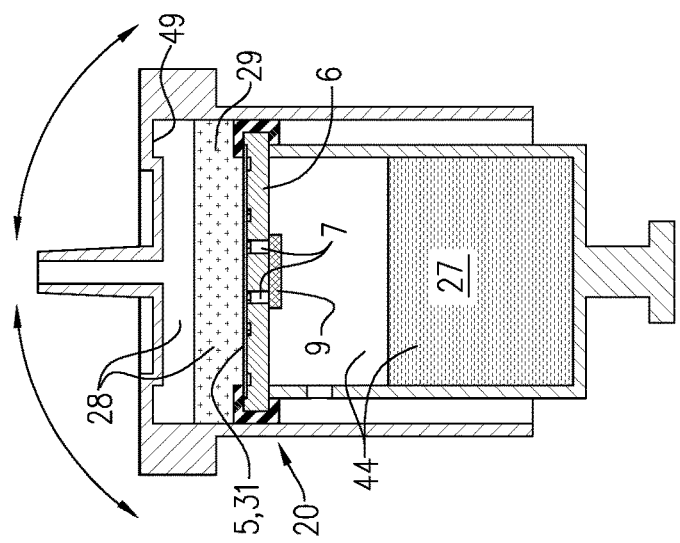
FIG. 4C
FIG. 4B
FIG. 4A

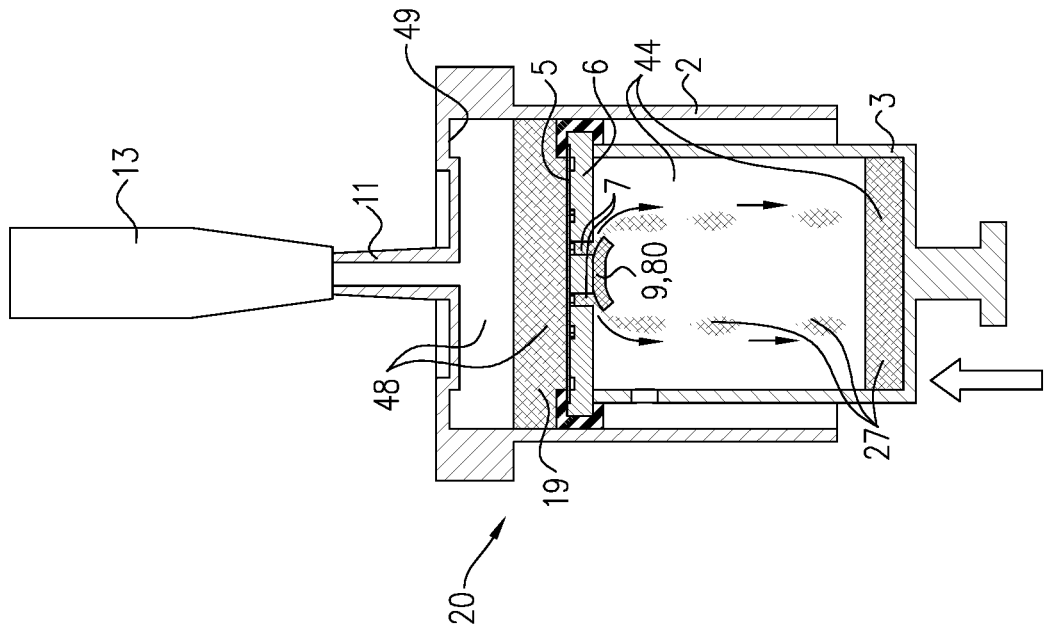
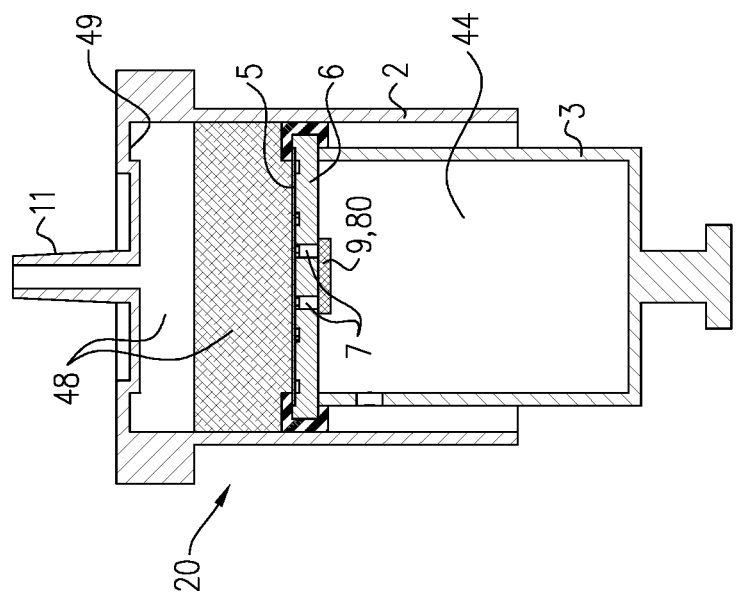
FIG. 6B
FIG. 6A

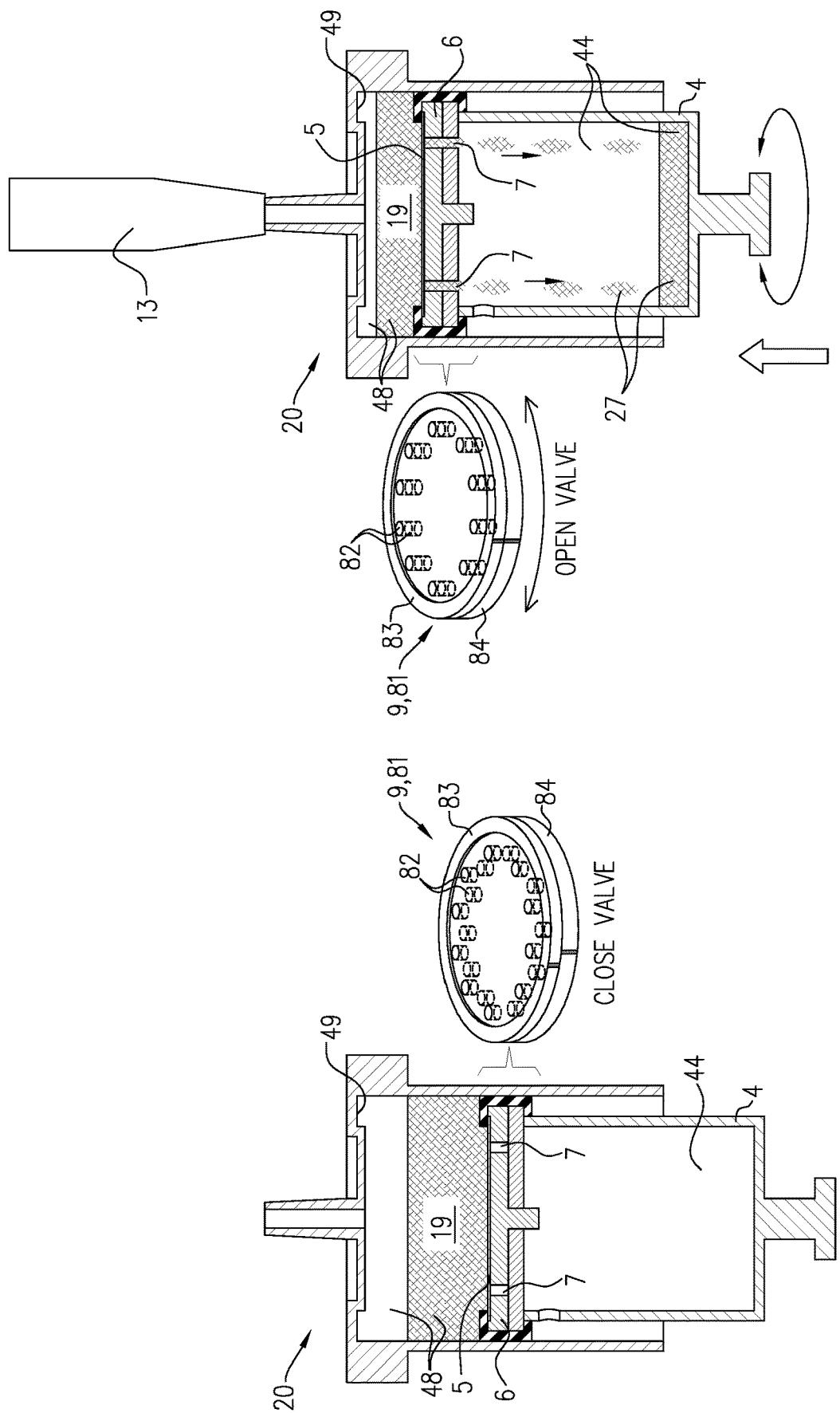

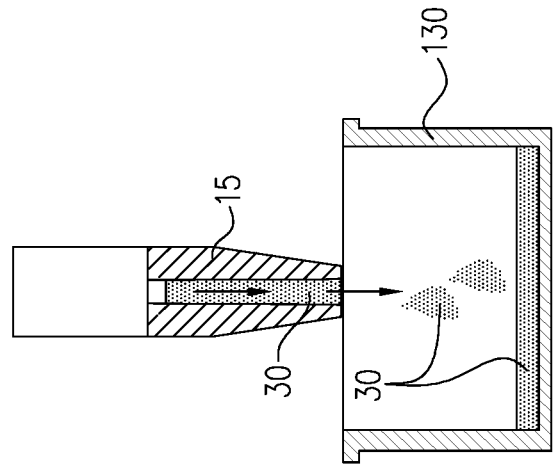
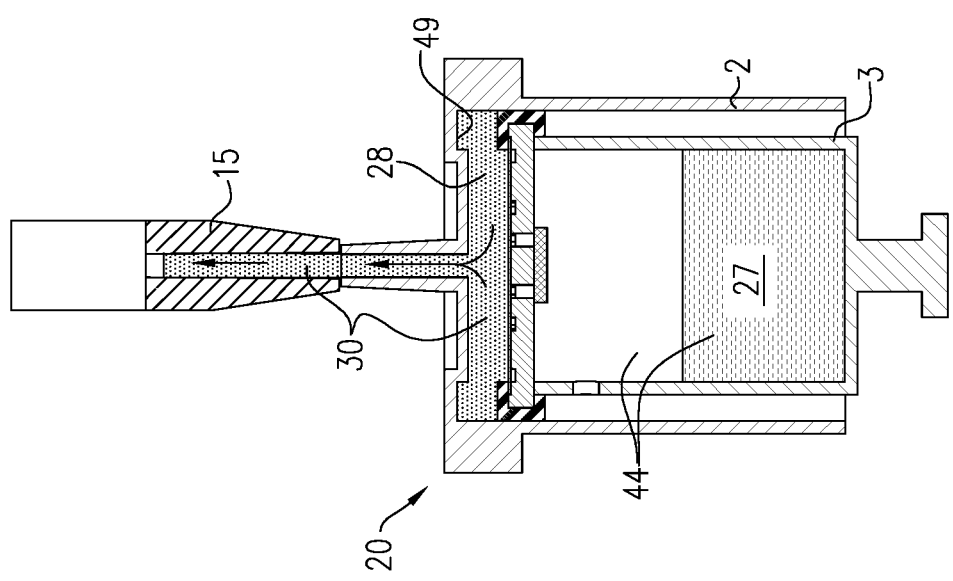
FIG. 7E
FIG. 7F

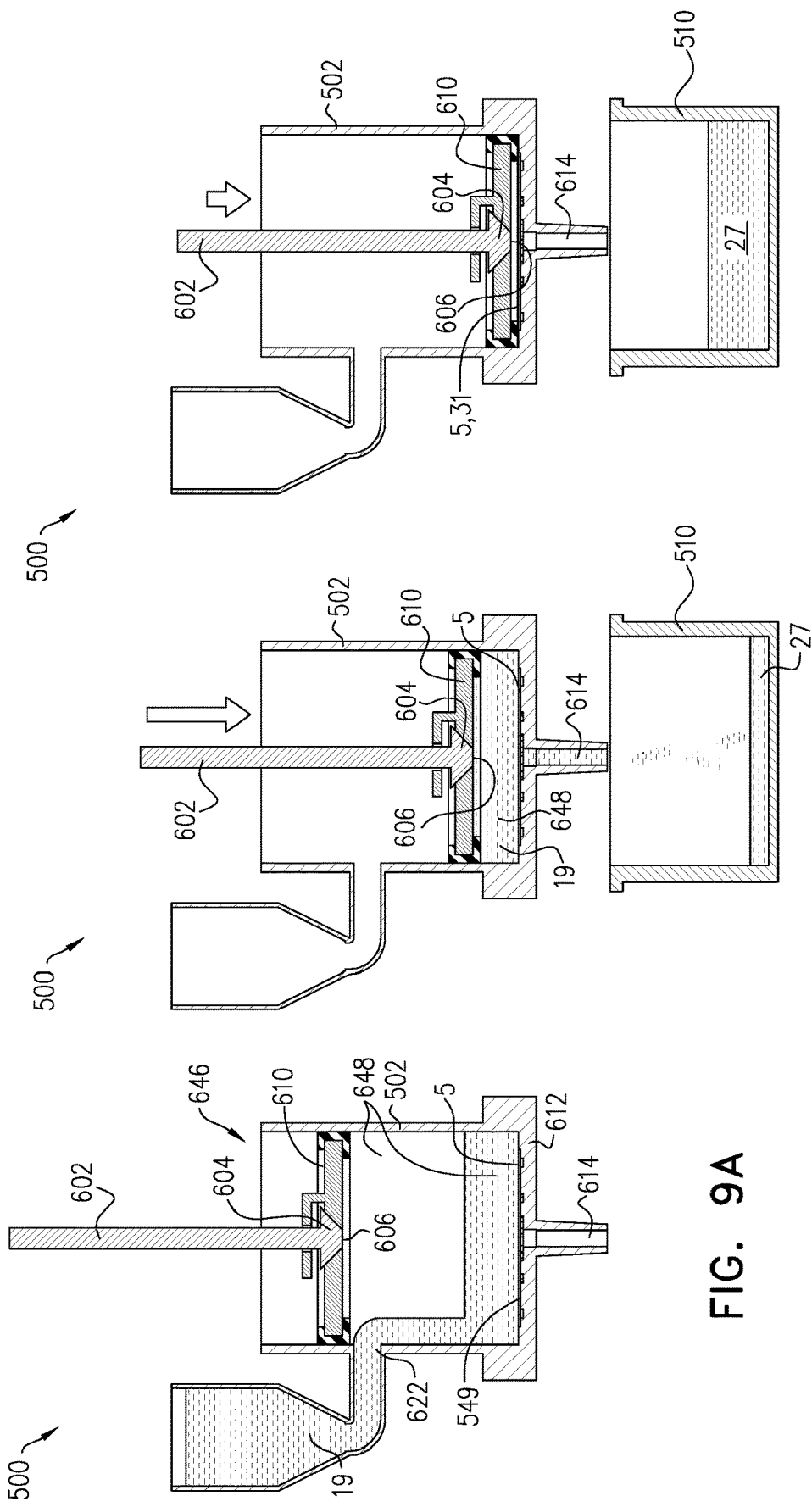

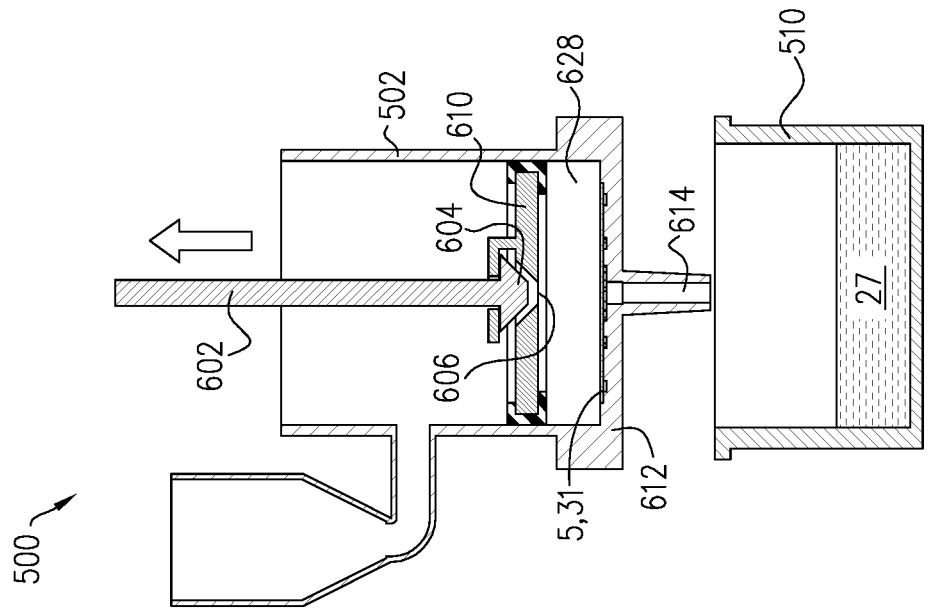
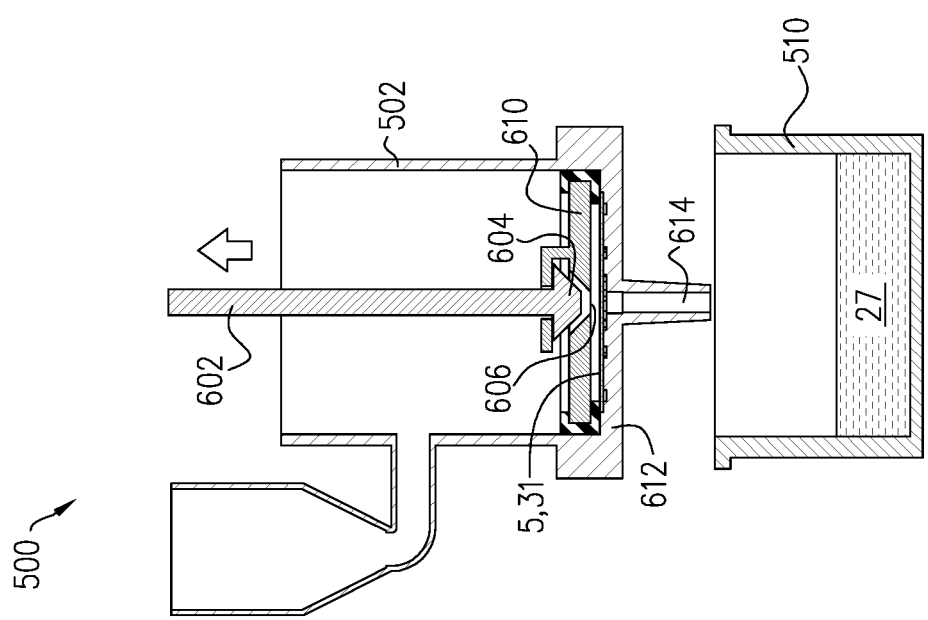

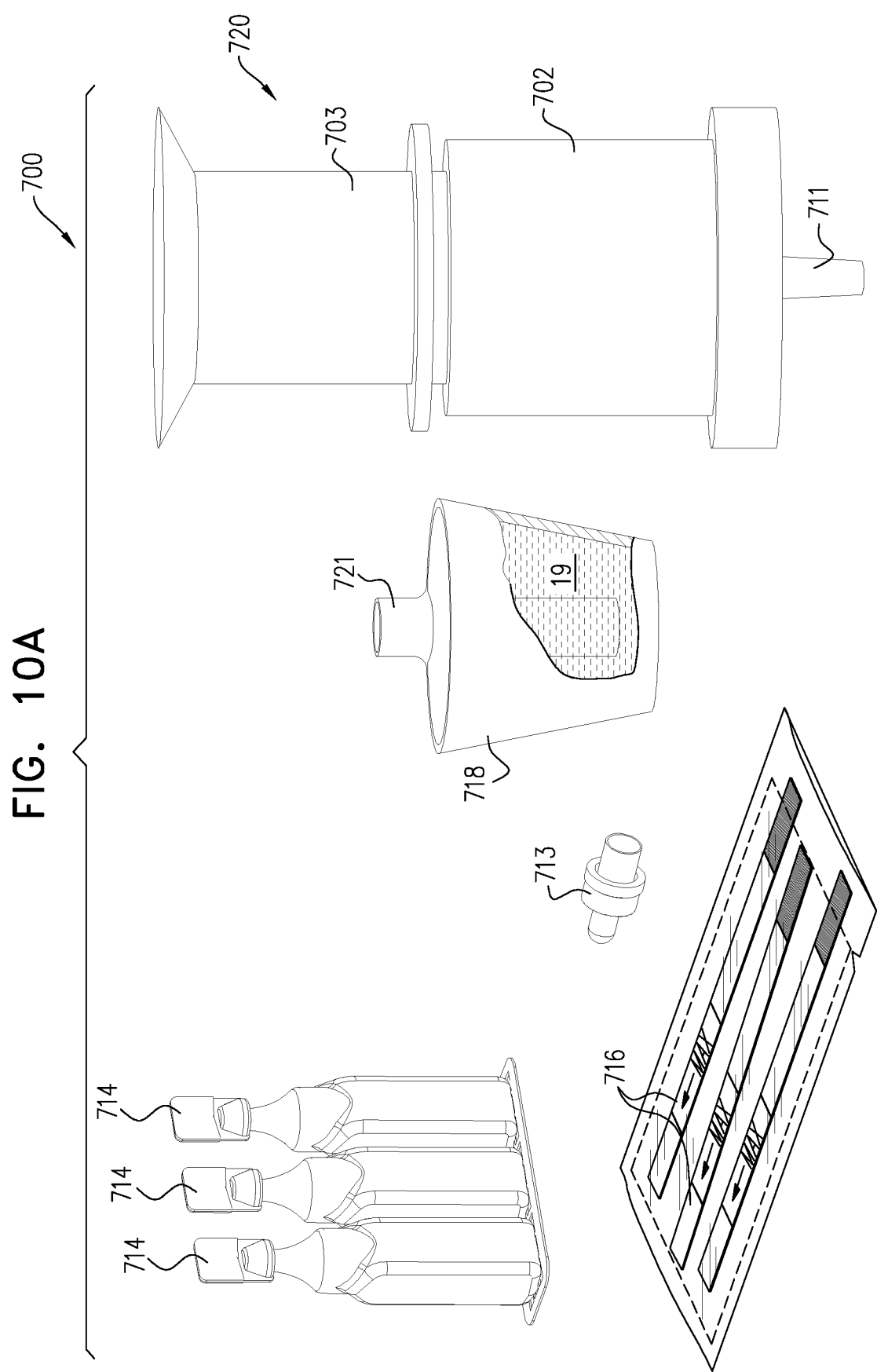

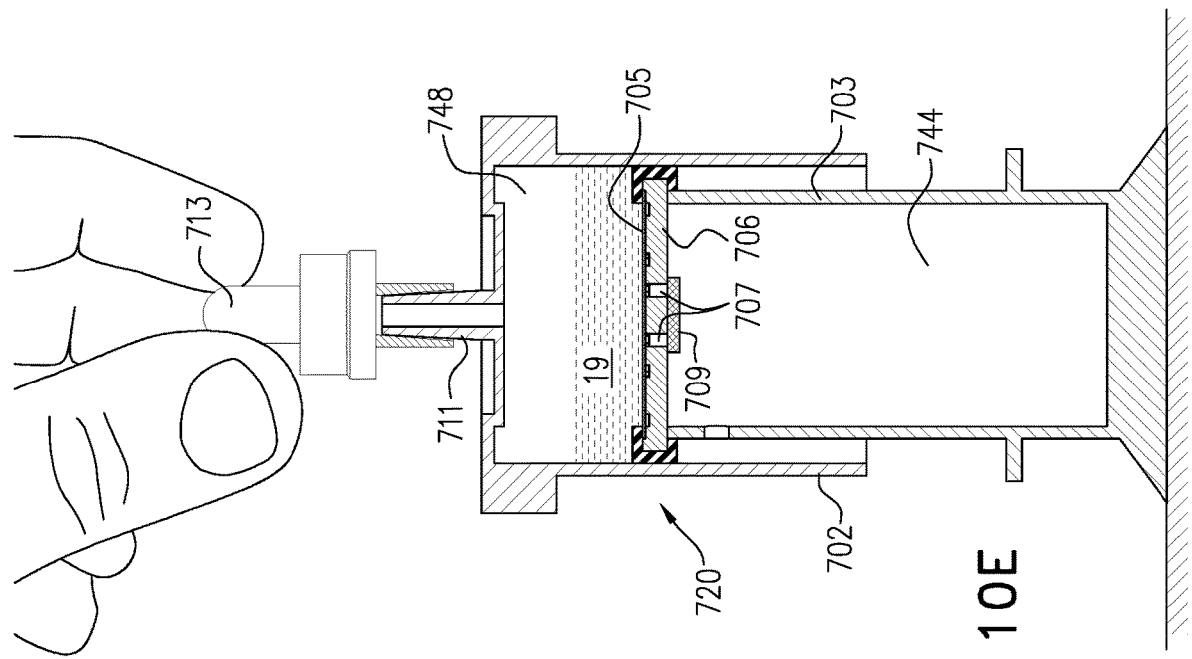
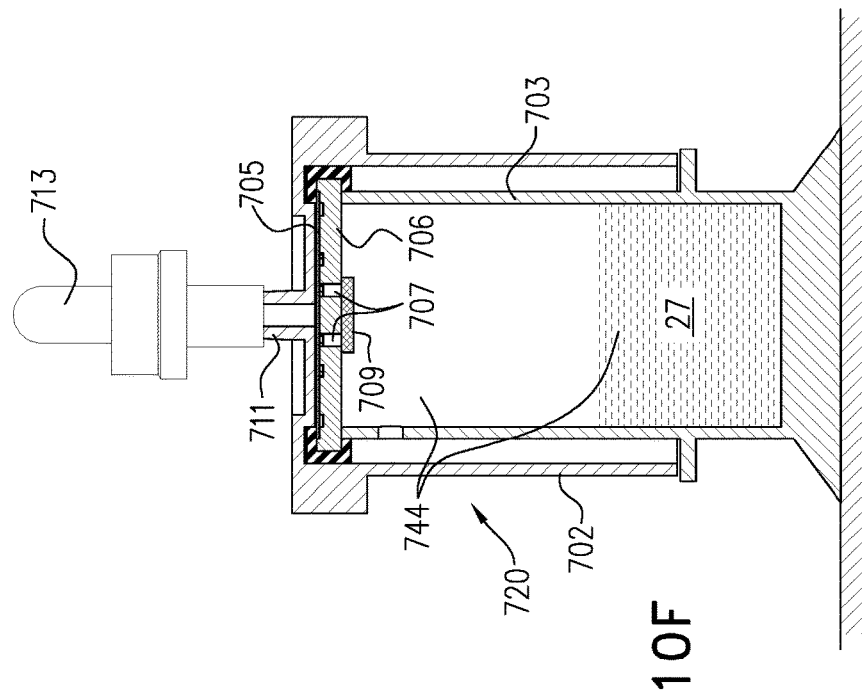
FIG. 10E
FIG. 10F

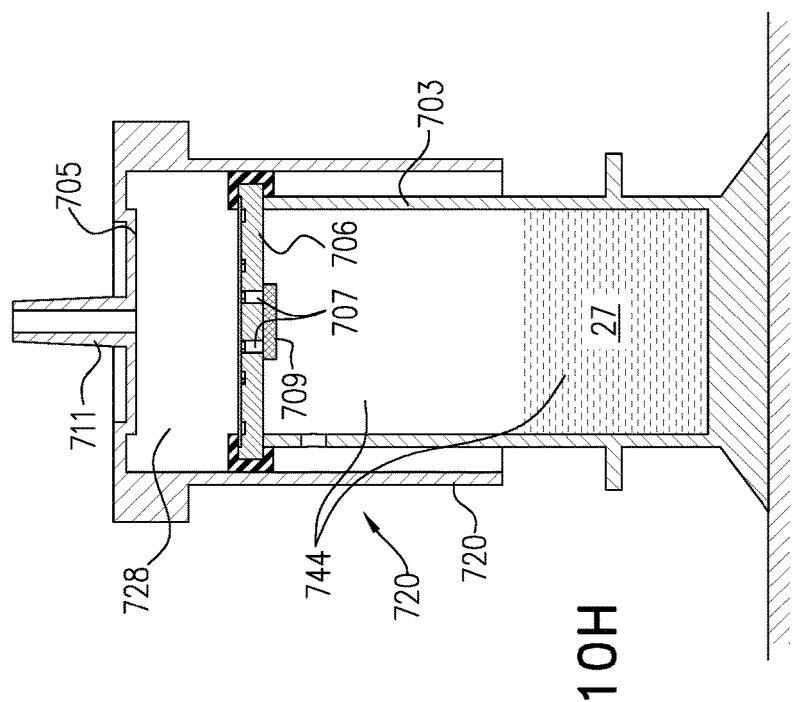
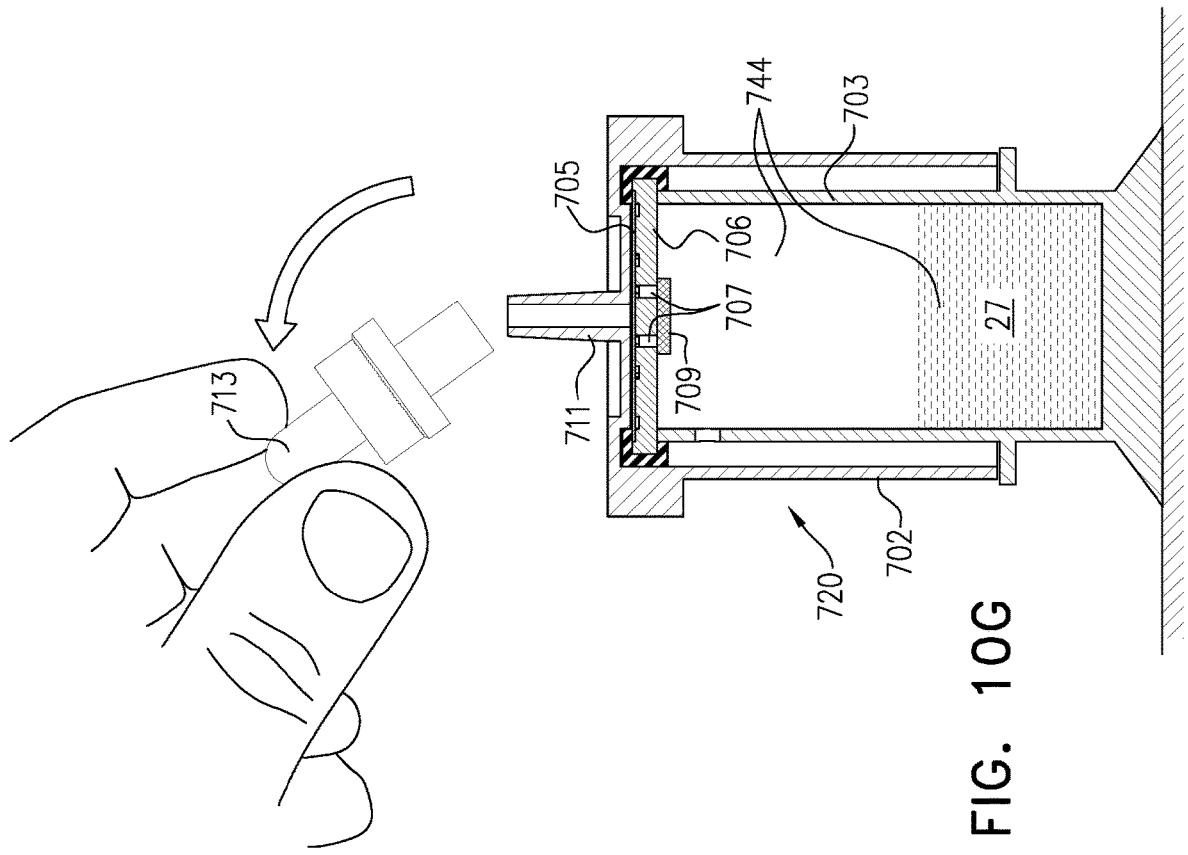
FIG. 10G
FIG. 10H

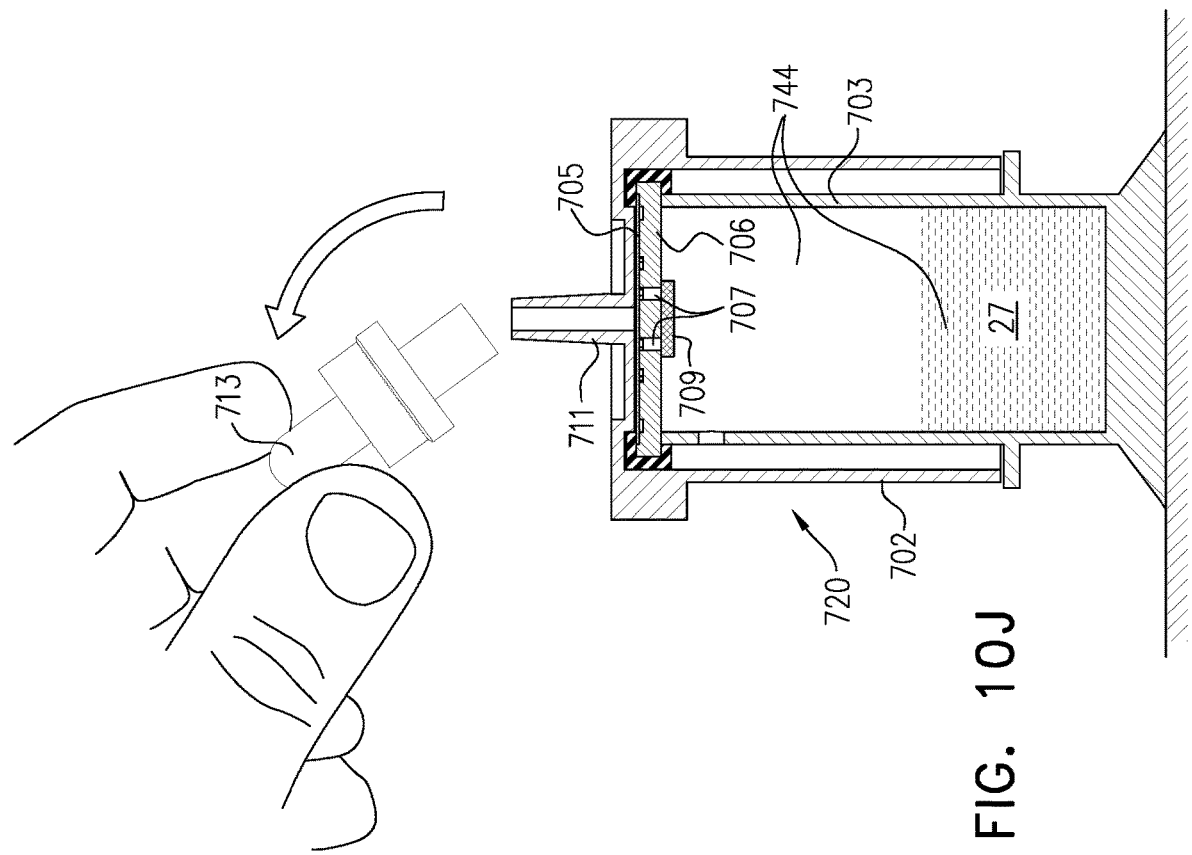
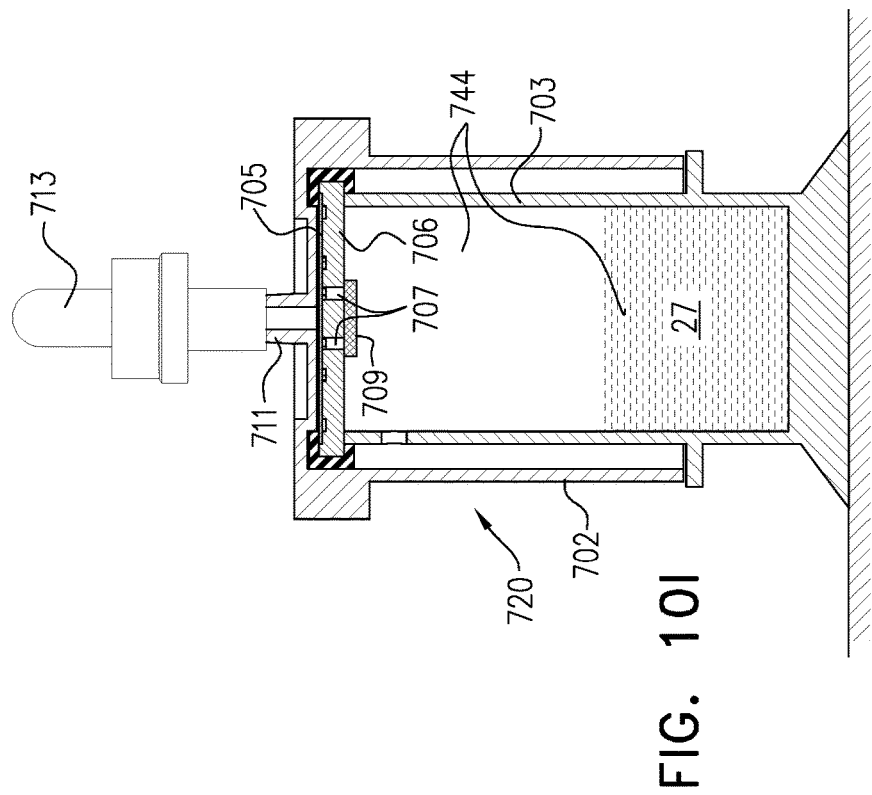
FIG. 10I
FIG. 10J

TESTING DEVICES

CROSS-REFERENCE TO RELATED APPLICATIONS

The present patent application is the U.S. national stage of International Application PCT/IB2021/052056, filed Mar. 11, 2021, which published as PCT Publication WO 2021/181339 to Feldman et al. and which claims priority from U.S. Provisional Application 62/988,145, filed Mar. 11, 2020, which is assigned to the assignee of the present application and incorporated herein by reference.

FIELD OF THE INVENTION

Applications of the present invention relate to testing for the presence of particulates, such as bacteria or viruses, in fluids.

BACKGROUND OF THE INVENTION

Many techniques exist for testing for the presence of bacteria and viruses for aiding in disease diagnosis. For example, testing for the Influenza virus includes molecular-based detection methods, viral culture methods, and immunoassay methods. Influenza virus testing includes the testing of nasal swabs, nasopharyngeal swabs, nasal aspirates, nasopharyngeal aspirates, nasal washes, nasopharyngeal washes, throat swabs, and a combination of samples.

PCT Publication WO 2018/158768 to Fruchter et al. describes inter alia a method for testing for presence of a particulate selected from the group consisting of: a microorganism, a fungus, a bacteria, a spore, a virus, a mite, a biological cell, a biological antigen, a protein, a protein antigen, and a carbohydrate antigen. The method includes (a) collecting, in a tube, fluid that potentially contains the particulate, (b) using a plunger to push the fluid through a filter disposed at a distal portion of the tube or at a distal end of the plunger, and subsequently, (c) while the filter is inside the tube, ascertaining if any of the particulate was trapped by the filter by applying a particulate-presence-testing-facilitation solution to the filter.

PCT Publication WO 2020/049569 to Fruchter et al. describes inter alia a testing device for testing for the presence of particulate in a liquid. The testing device includes a liquid container for containing the liquid; a filter, disposed in or downstream of the liquid container; a liquid-pressure source, which is arranged to apply pressure to drive the liquid contained in the liquid container through the filter; and a filter chamber that is (a) disposed downstream of the liquid container, (b) shaped so as to define an inlet, and (c) in fluid communication with the filter.

US Patent Application Publication 2011/0318814 to Kshirsagar et al. describes inter alia a method for isolating microorganisms from a sample, the sample including sample matrix and microorganisms, the method including the steps of providing a receptacle, the receptacle configured to allow filtering of the sample and to reversibly contain the sample and a concentration agent; adding the sample to the receptacle, wherein a microorganism-bound composition will be formed in the receptacle, the microorganism-bound composition including concentration agent-bound microorganisms and sample matrix; and filtering the microorganism-bound composition through a filter to collect the concentration agent-bound microorganisms on the filter. The filter has an average pore size that is greater than the average size of the microorganisms. Kits and systems are also described.

SUMMARY OF THE INVENTION

Some embodiments of the present invention provide a method for testing a fluid sample taken from a body of a patient for the presence of a particulate. The fluid sample is introduced into a fluid container of a filtration assembly. The fluid sample is passed through a porous filter of the filtration assembly and into a filtrate receptacle by distally advancing a plunger of the filtration assembly within the fluid container toward a distal end of the fluid container, thereby capturing, on or within the porous filter, by size-based filtration, at least a portion of any particulate present in the fluid sample. Thereafter, a cavity is created within the fluid container between a distal end of the plunger and the distal end of the fluid container by proximally partially withdrawing the plunger within the fluid container, while one or more vacuum-prevention openings are open such that proximally partially withdrawing the plunger draws air into the cavity from outside the filtration assembly through the one or more vacuum-prevention openings.

An extraction liquid is prepared by introducing one or more extraction reagents into the cavity and bathing the porous filter in the one or more extraction reagents, the one or more extraction reagents configured to extract and expose a biological target from any particulate captured on or within the porous filter. Thereafter, the extraction liquid is tested for the presence of the particulate by testing for the presence of a biological target.

There is therefore provided, in accordance with an Inventive Concept 1 of the present invention, a method for testing a fluid sample taken from a body of a patient for the presence of a particulate, the method comprising:

introducing the fluid sample into a fluid container of a filtration assembly;

passing the fluid sample through a porous filter of the filtration assembly and into a filtrate receptacle by distally advancing a plunger of the filtration assembly within the fluid container toward a distal end of the fluid container, thereby capturing, on or within the porous filter, by size-based filtration, at least a portion of any particulate present in the fluid sample;

thereafter, creating a cavity within the fluid container between a distal end of the plunger and the distal end of the fluid container by proximally partially withdrawing the plunger within the fluid container, while one or more vacuum-prevention openings are open such that proximally partially withdrawing the plunger draws air into the cavity from outside the filtration assembly through the one or more vacuum-prevention openings;

preparing an extraction liquid by introducing one or more extraction reagents into the cavity and bathing the porous filter in the one or more extraction reagents, the one or more extraction reagents configured to extract and expose a biological target from any particulate captured on or within the porous filter; and thereafter, testing the extraction liquid for the presence of the particulate by testing for the presence of a biological target.

Inventive Concept 2. The method according to Inventive Concept 1, wherein the biological target includes at least one biological target selected from the group of biological targets consisting of a protein antigen, a carbohydrate antigen, and a nucleic acid.

Inventive Concept 3. The method according to Inventive Concept 1, wherein testing the extraction liquid for the presence of the particulate consists of testing the extraction liquid while the extraction liquid is within the cavity between the distal end of the plunger and the distal end of the fluid container.

Inventive Concept 4. The method according to Inventive Concept 1, wherein testing the extraction liquid for the presence of the particulate consists of testing the extraction liquid after the extraction liquid moves out of the cavity between the distal end of the plunger and the distal end of the fluid container.

Inventive Concept 5. The method according to Inventive Concept 1, wherein introducing the one or more extraction reagents into the cavity comprises introducing the one or more extraction reagents into the cavity through the one or more vacuum-prevention openings.

Inventive Concept 6. The method according to Inventive Concept 1, wherein distally advancing the plunger within the fluid container toward the distal end of the fluid container comprises distally advancing the plunger within the fluid container toward the distal end of the fluid container until the distal end of the fluid container blocks further distal advancement of the plunger.

Inventive Concept 7. The method according to Inventive Concept 1, wherein creating the cavity comprises creating the cavity having a volume of between 0.05 and 2.0 cc.

Inventive Concept 8. The method according to Inventive Concept 7, wherein creating the cavity having a volume of between 0.05 and 2.0 cc comprises creating the cavity having a volume of between 0.4 and 0.7 cc.

Inventive Concept 9. The method according to Inventive Concept 1, wherein the porous filter is located on the distal end of the plunger.

Inventive Concept 10. The method according to Inventive Concept 1, wherein the porous filter is coupled to a distal portion of the fluid container.

Inventive Concept 11. The method according to Inventive Concept 1, wherein testing the extraction liquid for the presence of the particulate comprises visually observing the test results by a human eye.

Inventive Concept 12. The method according to Inventive Concept 1, wherein testing the extraction liquid for the presence of the particulate comprises optically ascertaining the results by a device, digitally ascertaining the results by the device, or optically and digitally ascertaining the results by the device.

Inventive Concept 13. The method according to Inventive Concept 1, wherein the porous filter has an average absolute pore size of between 0.2 and 20.0 microns.

Inventive Concept 14. The method according to Inventive Concept 13, wherein the average absolute pore size is between 0.8 and 3.0 microns.

Inventive Concept 15. The method according to Inventive Concept 1, wherein the porous filter has an average nominal pore size of between 0.2 and 20.0 microns.

Inventive Concept 16. The method according to Inventive Concept 15, wherein the average nominal pore size is between 0.8 and 3.0 microns.

Inventive Concept 17. The method according to Inventive Concept 1, wherein the porous filter is a depth filter.

Inventive Concept 18. The method according to Inventive Concept 17, wherein the depth filter is a glass fiber filter.

Inventive Concept 19. The method according to any one of Inventive Concepts 1-18, wherein the fluid container is shaped so as to define the one or more vacuum-prevention openings.

Inventive Concept 20. The method according to Inventive Concept 19, wherein the fluid container is shaped such that the one or more vacuum-prevention openings pass through the distal end of the fluid container.

Inventive Concept 21. The method according to Inventive Concept 19, wherein the fluid container is shaped such that the one or more vacuum-prevention openings pass through a lateral wall of the fluid container proximal to the distal end of the fluid container.

Inventive Concept 22. The method according to any one of Inventive Concepts 1-18, wherein the distal end of the plunger is shaped so as to define the one or more vacuum-prevention openings.

Inventive Concept 23. The method according to any one of Inventive Concepts 1-18, wherein passing the fluid sample through the porous filter and into the filtrate receptacle by distally advancing the plunger within the fluid container toward the distal end of the fluid container comprises passing the fluid sample through the porous filter and into the filtrate receptacle by distally advancing the plunger within the fluid container toward the distal end of the fluid container while the one or more vacuum-prevention openings are closed.

Inventive Concept 24. The method according to any one of Inventive Concepts 1-18, wherein passing the fluid sample through the porous filter and into the filtrate receptacle comprises passing the fluid sample through the porous filter and into a filtrate receptacle of the filtration assembly.

Inventive Concept 25. The method according to Inventive Concept 24, wherein the filtrate receptacle is located within the plunger.

Inventive Concept 26. The method according to Inventive Concept 24, wherein the filtrate receptacle contains a liquid-absorbing substance, which is configured, when mixed with filtrate of the fluid sample within the filtrate receptacle, to reduce risk of leakage of the filtrate from the filtration assembly.

Inventive Concept 27. The method according to Inventive Concept 26, wherein the liquid-absorbing substances includes a gel.

Inventive Concept 28. The method according to Inventive Concept 26, wherein the liquid-absorbing substances includes sodium polyacrylate.

Inventive Concept 29. The method according to Inventive Concept 24, wherein the filtrate receptacle contains an antimicrobial substance, which is configured, when mixed with filtrate of the fluid sample within the filtrate receptacle, to reduce risk of contamination.

Inventive Concept 30. The method according to any one of Inventive Concepts 1-18,
- wherein passing the fluid sample through the porous filter and into the filtrate receptacle comprises passing the fluid sample through the porous filter and into a filtrate receptacle of the filtration assembly,
- wherein the filtration assembly includes one or more valves between the porous filter and the filtrate receptacle,
- wherein passing the fluid sample through the porous filter and into the filtrate receptacle comprises passing the fluid sample through the porous filter and into the filtrate receptacle while the one or more valves are open, and
- wherein introducing the one or more extraction reagents into the cavity and bathing the porous filter in the one or more extraction reagents comprises introducing the one or more extraction reagents into the cavity and bathing the porous filter in the one or more extraction reagents while the one or more valves are closed, thereby preventing the one or more extraction reagents from leaking through the porous filter and out of the cavity.

Inventive Concept 31. The method according to Inventive Concept 30, wherein the one or more valves are pressure-activated valves, which are configured to automatically open upon application of positive pressure generated by the distal advancing of the plunger within the fluid container while the one or more vacuum-prevention openings are closed, and to automatically close when the positive pressure is not applied.

Inventive Concept 32. The method according to Inventive Concept 30,
- wherein the one or more valves comprise one or more non-pressure-activated valves,
- wherein passing the fluid sample through the porous filter and into the filtrate receptacle comprises opening the one or more valves before passing the fluid sample through the porous filter and into the filtrate receptacle while the one or more valves are open, and
- wherein introducing the one or more extraction reagents into the cavity and bathing the porous filter in the extraction reagent comprises introducing the extraction reagent into the cavity and bathing the porous filter in the extraction reagent while the one or more valves are closed, thereby preventing the extraction reagent from leaking through the porous filter and out of the cavity.

Inventive Concept 33. The method according to any one of Inventive Concepts 1-18, wherein introducing the fluid sample into the fluid container comprises proximally partially withdrawing the plunger while the fluid container is in fluid communication with a fluid sample receptacle containing the fluid sample.

Inventive Concept 34. The method according to Inventive Concept 33,
- wherein passing the fluid sample through the porous filter and into the filtrate receptacle comprises passing the fluid sample through the porous filter and into a filtrate receptacle of the filtration assembly,
- wherein the filtration assembly includes one or more valves between the porous filter and the filtrate receptacle, and
- wherein proximally partially withdrawing the plunger while the fluid container is in fluid communication with the fluid sample receptacle comprises proximally partially withdrawing the plunger within the fluid container while the one or more valves are closed.

Inventive Concept 35. The method according to Inventive Concept 33, wherein proximally partially withdrawing the plunger while the fluid container is in fluid communication with the fluid sample receptacle comprises proximally partially withdrawing the plunger while the fluid container is in fluid communication with the fluid sample receptacle via the one or more vacuum-prevention openings.

Inventive Concept 36. The method according to Inventive Concept 35,
- wherein proximally partially withdrawing the plunger while the fluid container is in fluid communication with the fluid sample receptacle comprises proximally partially withdrawing the plunger while the fluid container is in fluid communication with the fluid sample receptacle while the fluid sample receptacle is disposed below the filtration assembly with respect to the Earth, and
- wherein introducing the one or more extraction reagents into the cavity comprises introducing the one or more extraction reagents into the cavity while the cavity is disposed above the porous filter with respect to the Earth.

Inventive Concept 37. The method according to Inventive Concept 36, wherein the fluid container is shaped such that the one or more vacuum-prevention openings pass through the distal end of the fluid container.

Inventive Concept 38. The method according to any one of Inventive Concepts 1-18, further comprising, after creating the cavity and before preparing the extraction liquid:
- pushing at least a portion of the air in the cavity through the porous filter by again distally advancing the plunger within the fluid container toward the distal end of the fluid container; and
- thereafter, recreating the cavity between the distal end of the plunger and the distal end of the fluid container by again proximally partially withdrawing the plunger within the fluid container, while the one or more vacuum-prevention openings are open such that proximally partially withdrawing the plunger draws other air into the cavity from outside the filtration assembly.

Inventive Concept 39. The method according to Inventive Concept 38, wherein pushing at least a portion of the air in the cavity through the porous filter by again distally advancing the plunger within the fluid container toward the distal end of the fluid container comprises pushing at least a portion of the air in the cavity through the porous filter by again distally advancing the plunger within the fluid container toward the distal end of the fluid container while the one or more vacuum-prevention openings are closed.

Inventive Concept 40. The method according to any one of Inventive Concepts 1-18, further comprising introducing, into the cavity, a substance configured to improve test sensitivity.

Inventive Concept 41. The method according to Inventive Concept 40, wherein the substance configured to improve the test sensitivity includes one or more substances selected from the group of substances consisting of: non-ionic detergents, hydrophilic polymers, and quaternary anions.

Inventive Concept 42. The method according to any one of Inventive Concepts 1-18, wherein passing the fluid sample through the porous filter and creating the cavity comprises passing, by a testing system, the fluid sample through the porous filter and creating, by the testing system, the cavity.

Inventive Concept 43. The method according to any one of Inventive Concepts 1-18, wherein the fluid sample taken from the body of the patient is a non-centrifuged fluid sample taken from the body of the patient.

Inventive Concept 44. The method according to any one of Inventive Concepts 1-18, wherein the particulate is selected from the group of particulates consisting of: a microorganism, a micro-animal, a biological cell, a protein, and a carbohydrate.

Inventive Concept 45. The method according to Inventive Concept 44, wherein the particulate is a microorganism, wherein the one or more extraction reagents is configured to extract and expose a microbial target, and wherein testing the extraction liquid comprises testing the extraction liquid for the presence of the microbial target.

Inventive Concept 46. The method according to Inventive Concept 45, wherein the microorganism is a virus.

Inventive Concept 47. The method according to Inventive Concept 45, wherein the microorganism is bacteria.

Inventive Concept 48. The method according to Inventive Concept 47, wherein the bacteria is Streptococcus bacteria, and the microbial target is a Streptococcus antigen.

Inventive Concept 49. The method according to Inventive Concept 48, wherein the Streptococcus bacteria is Group A Streptococcus, and the Streptococcus antigen is a Group A Streptococcus antigen.

Inventive Concept 50. The method according to Inventive Concept 48, wherein the Streptococcus bacteria is Group C Streptococcus, and the Streptococcus antigen is a Group C Streptococcus antigen.

Inventive Concept 51. The method according to Inventive Concept 48, wherein the Streptococcus bacteria is Group G Streptococcus, and the Streptococcus antigen is a Group G Streptococcus antigen.

Inventive Concept 52. The method according to Inventive Concept 48, wherein the Streptococcus bacteria includes one or more bacteria selected from the group consisting of: Group A Streptococcus, Group C Streptococcus, and Group G Streptococcus.

Inventive Concept 53. The method according to Inventive Concept 45, wherein testing the extraction liquid for the presence of the microbial target comprises testing the extraction liquid for the presence of the microbial antigen by performing an immunoassay on the extraction liquid.

Inventive Concept 54. The method according to Inventive Concept 53, wherein performing the immunoassay comprises performing a lateral flow immunoassay on the extraction liquid.

Inventive Concept 55. The method according to Inventive Concept 53, wherein performing the immunoassay comprises performing an enzyme-linked immunosorbent assay (ELISA) on the extraction liquid.

Inventive Concept 56. The method according to Inventive Concept 45, wherein testing the extraction liquid for the presence of the microbial target comprises testing the extraction liquid for the presence of the microbial nucleic acid by performing a molecular-based assay on the extraction liquid.

Inventive Concept 57. The method according to Inventive Concept 56, wherein performing the molecular-based assay on the extraction liquid comprises performing a nucleic acid hybridization method.

Inventive Concept 58. The method according to Inventive Concept 56, wherein performing the molecular-based assay on the extraction liquid comprises performing a nucleic acid amplification method.

Inventive Concept 59. The method according to Inventive Concept 58, wherein the nucleic acid amplification method includes at least one method selected from the group of methods consisting of: polymerase chain reaction (PCR), real-time quantitative PCR (qPCR), reverse transcriptase PCR (RT-PCR), and isothermal amplification.

Inventive Concept 60. The method according to any one of Inventive Concepts 1-18, further comprising applying a physical extraction technique to the porous filter while the one or more extraction reagents bathes the porous filter in the cavity.

Inventive Concept 61. The method according to Inventive Concept 60, wherein applying the physical extraction technique comprises applying a mechanical extraction technique to the porous filter.

Inventive Concept 62. The method according to Inventive Concept 60, wherein applying the physical extraction technique comprises applying a manual extraction technique to the porous filter.

Inventive Concept 63. The method according to Inventive Concept 60, wherein applying the physical extraction technique comprises agitating the porous filter.

Inventive Concept 64. The method according to Inventive Concept 60, wherein applying the physical extraction technique comprises vibrating the porous filter.

Inventive Concept 65. The method according to Inventive Concept 60, wherein applying the physical extraction technique comprises macerating the porous filter.

Inventive Concept 66. The method according to Inventive Concept 60, wherein applying the physical extraction technique comprises tilting the porous filter.

Inventive Concept 67. The method according to any one of Inventive Concepts 1-18, wherein testing the extraction liquid for the presence of the particulate comprises completing ascertaining whether the particulate is present within 5 hours of beginning passing the fluid sample through the porous filter.

Inventive Concept 68. The method according to Inventive Concept 67, wherein completing ascertaining whether the particulate is present comprises completing ascertaining whether the particulate is present within 2 hours of beginning passing the fluid sample through the porous filter.

Inventive Concept 69. The method according to Inventive Concept 67, wherein completing ascertaining whether the particulate is present within 5 hours of beginning passing the fluid sample through the porous filter comprises of completing ascertaining whether the particulate is present between 5 and 30 minutes of beginning passing the fluid sample through the porous filter.

Inventive Concept 70. The method according to any one of Inventive Concepts 1-18, wherein the fluid sample taken from the body of the patient includes at one or more substances selected from the group of substances consisting of: gargled fluid, saliva not swabbed from a throat of the patient, spit, oral rinse fluid, nasal wash fluid, nasal aspirate fluid, nasal swab fluid, and nasopharyngeal swab fluid.

Inventive Concept 71. The method according to Inventive Concept 70, wherein the fluid sample taken from the body of the patient includes the gargled fluid.

Inventive Concept 72. The method according to Inventive Concept 70, wherein the fluid sample taken from the body of the patient includes the saliva not swabbed from the throat of the patient.

Inventive Concept 73. The method according to Inventive Concept 70, wherein the fluid sample taken from the body of the patient includes the nasal wash.

Inventive Concept 74. The method according to Inventive Concept 70, wherein the fluid sample taken from the body of the patient includes the nasal aspirate.

Inventive Concept 75. The method according to any one of Inventive Concepts 1-18,
wherein introducing the fluid sample comprises mixing a culture medium with the fluid sample before or after introducing the fluid sample into the fluid container, and
wherein the method further comprises, before passing the fluid sample through the porous filter, incubating, within the fluid container, the fluid sample mixed with the culture medium.

Inventive Concept 76. The method according to Inventive Concept 75, wherein mixing a culture medium with the fluid sample comprises of mixing a liquid culture medium with the fluid sample.

Inventive Concept 77. The method according to Inventive Concept 75, wherein mixing a culture medium with the fluid sample comprises of mixing a dehydrated culture medium with the fluid sample.

Inventive Concept 78. The method according to Inventive Concept 75, wherein mixing a culture medium with the fluid sample comprises of mixing a powdered culture medium with the fluid sample.

Inventive Concept 79. The method according to Inventive Concept 75, wherein incubating comprises incubating the fluid sample mixed with the culture medium for between 2 and 78 hours.

Inventive Concept 80. The method according to Inventive Concept 79, wherein incubating the fluid sample mixed with the culture medium comprises incubating the fluid sample mixed with the culture medium for between 6 and 18 hours.

Inventive Concept 81. The method according to Inventive Concept 79, wherein incubating the fluid sample mixed with the culture medium comprises incubating the fluid sample mixed with the culture medium for between 4 and 12 hours.

Inventive Concept 82. The method according to Inventive Concept 79, wherein incubating the fluid sample mixed with the culture medium comprises incubating the fluid sample mixed with the culture medium for between 12 and 24 hours.

Inventive Concept 83. The method according to any one of Inventive Concepts 1-18, further comprising transporting at least a portion of the extraction liquid into an external detection test receptacle.

Inventive Concept 84. The method according to Inventive Concept 83, further comprising performing a molecular-based assay detection test on the extraction liquid of the external detection test receptacle.

There is further provided, in accordance with an Inventive Concept 85 of the present invention, a filtration assembly for testing a fluid sample taken from a body of a patient for the presence of a particulate, the filtration assembly comprising:
  a fluid container, which is shaped so as to define a proximal opening;
  a plunger, which is configured to be inserted into the proximal opening of the fluid container so as to define a fluid-container space between a distal end of the plunger and a distal end of the fluid container when the plunger is not fully distally advanced within the fluid container; and
  a porous filter,
  wherein the filtration assembly is shaped so as to define one or more vacuum-prevention openings, which, when open, provide fluid communication between the fluid-container space and outside the filtration assembly,
  wherein the filtration assembly is configured such that:
    distal advancement of the plunger within the fluid container toward the distal end of the fluid container pushes the fluid sample through the porous filter, thereby capturing, on or within the porous filter, by size-based filtration, at least a portion of any particulate present in the fluid sample, and
    proximal partial withdrawal of the plunger within the fluid container while the one or more vacuum-prevention openings are open, after the distal advancement of the plunger while the one or more vacuum-prevention openings are closed, creates a cavity between the distal end of the plunger and the distal end of the fluid container and draws air into the cavity from outside the filtration assembly through the one or more vacuum-prevention openings.

Inventive Concept 86. The filtration assembly according to Inventive Concept 85, wherein the fluid container is shaped so as to define the one or more vacuum-prevention openings.

Inventive Concept 87. The filtration assembly according to Inventive Concept 85, wherein the fluid container is shaped such that the one or more vacuum-prevention openings pass through the distal end of the fluid container.

Inventive Concept 88. The filtration assembly according to Inventive Concept 86, wherein the fluid container is shaped such that the one or more vacuum-prevention openings pass through a lateral wall of the fluid container proximal to the distal end of the fluid container.

Inventive Concept 89. The filtration assembly according to Inventive Concept 85, wherein the distal end of the plunger is shaped so as to define the one or more vacuum-prevention openings.

Inventive Concept 90. The filtration assembly according to Inventive Concept 85, wherein the porous filter has an average absolute pore size of between 0.2 and 20.0 microns.

Inventive Concept 91. The filtration assembly according to Inventive Concept 90, wherein the average absolute pore size is between 0.8 and 3.0 microns.

Inventive Concept 92. The filtration assembly according to Inventive Concept 85, wherein the porous filter has an average nominal pore size of between 0.2 and 20.0 microns.

Inventive Concept 93. The filtration assembly according to Inventive Concept 92, wherein the average nominal pore size is between 0.8 and 3.0 microns.

Inventive Concept 94. The filtration assembly according to Inventive Concept 85, wherein the porous filter is a depth filter.

Inventive Concept 95. The filtration assembly according to Inventive Concept 94, wherein the depth filter is a glass fiber filter.

Inventive Concept 96. The filtration assembly according to any one of Inventive Concepts 85-95, wherein the filtration assembly is configured such that distal advancement of the plunger within the fluid container toward the distal end of the fluid container while the one or more vacuum-prevention openings are closed pushes the fluid sample through the porous filter.

Inventive Concept 97. The filtration assembly according to any one of Inventive Concepts 85-95, wherein the porous filter is located on the distal end of the plunger.

Inventive Concept 98. The filtration assembly according to any one of Inventive Concepts 85-95, wherein the porous filter is coupled to a distal portion of the fluid container.

Inventive Concept 99. The filtration assembly according to any one of Inventive Concepts 85-95, further comprising a filtrate receptacle, wherein the filtration assembly is configured such that the distal advancement of the plunger within the fluid container toward the distal end of the fluid container while the one or more vacuum-prevention openings are closed pushes the fluid sample through the porous filter and into the filtrate receptacle.

Inventive Concept 100. The filtration assembly according to Inventive Concept 99, wherein the filtrate receptacle is located within the plunger.

Inventive Concept 101. The filtration assembly according to Inventive Concept 99, wherein the plunger includes one or more valves between the porous filter and the filtrate receptacle.

Inventive Concept 102. The filtration assembly according to Inventive Concept 101, wherein the one or more valves are pressure-activated valves, which are configured to automatically open upon application of positive pressure generated by the distal advancement of the plunger within the fluid container while the one or more vacuum-prevention openings are closed, and to automatically close when the positive pressure is not applied.

Inventive Concept 103. The filtration assembly according to Inventive Concept 101, wherein the one or more valves comprise one or more non-pressure-activated valves.

Inventive Concept 104. The filtration assembly according to Inventive Concept 99, wherein the filtrate receptacle contains a liquid-absorbing substance, which is configured, when mixed with filtrate of the fluid sample within the filtrate receptacle, to reduce risk of leakage of the filtrate from the filtration assembly.

Inventive Concept 105. The filtration assembly according to Inventive Concept 104, wherein the liquid-absorbing substances includes a gel.

Inventive Concept 106. The filtration assembly according to Inventive Concept 104, wherein the liquid-absorbing substances includes sodium polyacrylate.

Inventive Concept 107. The filtration assembly according to Inventive Concept 99, wherein the filtrate receptacle contains an antimicrobial substance, which is configured, when mixed with filtrate of the fluid sample within the filtrate receptacle, to reduce risk of contamination.

Inventive Concept 108. A testing system comprising the filtration assembly according to any one of Inventive Concepts 85-95, the testing system configured to cause the distal advancement of the plunger within the fluid container and the subsequent proximal partial withdrawal of the plunger within the fluid compartment.

Inventive Concept 109. The testing system according to Inventive Concept 108, wherein the testing system is configured to prepare an extraction liquid by introducing one or more extraction reagents into the cavity and bathing the porous filter in the one or more extraction reagents, the one or more extraction reagents configured to extract a biological target from any particulate captured on or within the porous filter.

Inventive Concept 110. The testing system according to Inventive Concept 109, wherein the biological target includes at least one biological target selected from the group of biological targets consisting of a protein antigen, a carbohydrate antigen, and a nucleic acid.

Inventive Concept 111. The testing system according to Inventive Concept 109, wherein the testing system is configured, after preparing the extraction liquid, to test the extraction liquid for the presence of the particulate by testing for the presence of a biological target.

Inventive Concept 112. The testing system according to Inventive Concept 109, wherein the testing system is configured to introduce the one or more extraction reagents into the cavity through the one or more vacuum-prevention openings.

Inventive Concept 113. The testing system according to Inventive Concept 109, wherein the testing system is configured to introduce the fluid sample into the fluid container by causing partial proximal withdrawal the plunger while the fluid container is in fluid communication with a fluid sample receptacle containing the fluid sample.

Inventive Concept 114. The testing system according to Inventive Concept 113, wherein the testing system is configured to introduce the fluid sample into the fluid container by causing the partial proximal withdrawal the plunger while the fluid container is in fluid communication with the fluid sample receptacle via the one or more vacuum-prevention openings.

Inventive Concept 115. The testing system according to Inventive Concept 109,
wherein the filtration assembly further comprises a filtrate receptacle, wherein the filtration assembly is configured such that the distal advancement of the plunger within the fluid container toward the distal end of the fluid container while the one or more vacuum-prevention openings are closed pushes the fluid sample through the porous filter and into the filtrate receptacle,
wherein the plunger comprises one or more valves between the porous filter and the filtrate receptacle, and
wherein the testing system is configured to:
cause the distal advancement of the plunger within the fluid container while the one or more valves are open, and
introduce the one or more extraction reagents into the cavity and bathe the porous filter in the one or more extraction reagents while the one or more valves are closed, thereby preventing the one or more extraction reagents from leaking through the porous filter and out of the cavity.

Inventive Concept 116. The testing system according to Inventive Concept 115,
wherein the one or more valves comprise one or more non-pressure-activated valves, and
wherein the testing system is configured to:
open the one or more valves before causing the distal advancement of the plunger within the fluid container while the one or more valves are open, and
close the one or more valves before applying the one or more extraction reagents.

Inventive Concept 117. The testing system according to Inventive Concept 108, wherein the testing system is configured to cause the proximal partial withdrawal of the plunger within the fluid compartment to create the cavity having a volume of at least 0.05 and 2.0 cc.

Inventive Concept 118. The testing system according to Inventive Concept 117, wherein the testing system is configured to cause the proximal partial withdrawal of the plunger within the fluid compartment to create the cavity having a volume of between 0.4 and 0.7 cc.

Inventive Concept 119. The testing system according to Inventive Concept 108,
wherein the filtration assembly further comprises a filtrate receptacle, wherein the filtration assembly is configured such that the distal advancement of the plunger within the fluid container toward the distal end of the fluid container while the one or more vacuum-prevention openings are closed pushes the fluid sample through the porous filter and into the filtrate receptacle, and
wherein the testing system is configured, after causing the proximal partial withdrawal of the plunger within the fluid container, to:
again cause distal advancement of the plunger within the fluid container toward the distal end of the fluid container while the one or more vacuum-prevention openings are closed, thereby pushing at least a portion of the air in the cavity through the porous filter and into the filtrate receptacle, and
thereafter, again cause proximal partial withdrawal of the plunger within the fluid container while the one or more vacuum-prevention openings are open, thereby creating the cavity between the distal end of the plunger and the distal end of the fluid container, by drawing other air into the cavity from outside the filtration assembly.

Inventive Concept 120. The testing system according to Inventive Concept 108, wherein the testing system is configured to introduce, into the cavity, a substance configured to improve test sensitivity.

Inventive Concept 121. The testing system according to Inventive Concept 120, wherein the substance configured to improve the test sensitivity comprising one or more substances selected from the group of substances consisting of: non-ionic detergents, hydrophilic polymers, and quaternary anions.

Inventive Concept 122. The testing system according to Inventive Concept 108, wherein the testing system is configured to apply a physical extraction technique to the porous filter while the one or more extraction reagents bathes the porous filter in the cavity.

Inventive Concept 123. The testing system according to Inventive Concept 122, wherein the testing system is configured to apply a mechanical extraction technique to the porous filter.

Inventive Concept 124. The testing system according to Inventive Concept 122, wherein the testing system is configured to apply a manual extraction technique to the porous filter.

Inventive Concept 125. The testing system according to Inventive Concept 122, wherein the testing system is configured to agitate the porous filter.

Inventive Concept 126. The testing system according to Inventive Concept 122, wherein the testing system is configured to vibrate the porous filter.

Inventive Concept 127. The testing system according to Inventive Concept 122, wherein the testing system is configured to macerate the porous filter.

Inventive Concept 128. The testing system according to Inventive Concept 122, wherein the testing system is configured to tilt the porous filter.

Inventive Concept 129. The testing system according to Inventive Concept 108, wherein the testing system is configured to:
  mix a culture medium with the fluid sample before or after introducing the fluid sample into the fluid container, and
  before causing the distal advancement of the plunger within the fluid container, incubate, within the fluid container, the fluid sample mixed with the culture medium.

Inventive Concept 130. The testing system according to Inventive Concept 129, wherein the testing system is configured to incubate the fluid sample mixed with the culture medium for between 2 and 78 hours.

Inventive Concept 131. The testing system according to Inventive Concept 130, wherein the testing system is configured to incubate the fluid sample mixed with the culture medium for between 6 and 18 hours.

Inventive Concept 132. The testing system according to Inventive Concept 130, wherein the testing system is configured to incubate the fluid sample mixed with the culture medium for between 4 and 12 hours.

Inventive Concept 133. The testing system according to Inventive Concept 130, wherein the testing system is configured to incubate the fluid sample mixed with the culture medium for between 12 and 24 hours.

Inventive Concept 134. The testing system according to Inventive Concept 108, wherein the external testing system is configured to transport at least a portion of the extraction liquid into an external detection test receptacle.

Inventive Concept 135. The testing system according to Inventive Concept 134, wherein the external testing system is configured to perform a molecular-based assay detection test on the extraction liquid of the external detection test receptacle.

Inventive Concept 136. A kit comprising the filtration assembly according to any one of Inventive Concepts 85-95, the kit further comprising one or more extraction reagents, configured to extract and expose a biological target from any of the particulate captured on or within the porous filter.

Inventive Concept 137. The kit according to Inventive Concept 136, wherein the particulate is selected from the group of particulates consisting of: a microorganism, a micro-animal, a biological cell, a protein, and a carbohydrate.

Inventive Concept 138. The kit according to Inventive Concept 137, wherein the particulate is a microorganism, wherein the one or more extraction reagents is configured to extract and expose a microbial target.

Inventive Concept 139. The kit according to Inventive Concept 138, wherein the microorganism is a virus.

Inventive Concept 140. The kit according to Inventive Concept 139, wherein the virus is SARS-CoV-2.

Inventive Concept 141. The kit according to Inventive Concept 138, wherein the microorganism is bacteria.

Inventive Concept 142. The kit according to Inventive Concept 141, wherein the bacteria is Streptococcus bacteria, and the microbial target is a Streptococcus antigen.

Inventive Concept 143. The kit according to Inventive Concept 142, wherein the Streptococcus bacteria is Group A Streptococcus, and the Streptococcus antigen is a Group A Streptococcus antigen.

Inventive Concept 144. The kit according to Inventive Concept 142, wherein the Streptococcus bacteria is Group C Streptococcus, and the Streptococcus antigen is a Group C Streptococcus antigen.

Inventive Concept 145. The kit according to Inventive Concept 142, wherein the Streptococcus bacteria is Group G Streptococcus, and the Streptococcus antigen is a Group G Streptococcus antigen.

Inventive Concept 146. The kit according to Inventive Concept 142, wherein the Streptococcus bacteria includes one or more bacteria selected from the group consisting of: Group A Streptococcus, Group C Streptococcus, and Group G Streptococcus.

Inventive Concept 147. The kit according to Inventive Concept 136, further comprising an immunoassay.

Inventive Concept 148. The kit according to Inventive Concept 147, wherein the immunoassay comprises a lateral flow immunoassay.

There is still further provided, in accordance with an Inventive Concept 149 of the present invention, a method for testing a fluid sample taken from a body of a patient for the presence of a particulate, the method comprising:
  introducing the fluid sample into a fluid container of a filtration assembly by proximally partially withdrawing a plunger of the filtration assembly while (a) the fluid container is in fluid communication with a fluid sample receptacle containing the fluid sample and (b) one or more valves are closed, thereby creating, between a distal end of the plunger and a distal end of the fluid container, a fluid-container space at least partially filled within the fluid sample, wherein the one or more valves are disposed between a porous filter of the filtration assembly and a filtrate receptacle of the filtration assembly;
  thereafter, passing the fluid sample through the porous filter and into the filtrate receptacle by distally advancing the plunger within the fluid container toward the distal end of the fluid container, thereby capturing, on or within the porous filter, by size-based filtration, at least a portion of any particulate present in the fluid sample;

thereafter, preparing an extraction liquid by introducing one or more extraction reagents into the fluid container and bathing the porous filter in the one or more extraction reagents, the extraction reagent configured to extract and expose a biological target from any particulate captured on or within the porous filter; and thereafter, testing the extraction liquid for the presence of the particulate by testing for the presence of a biological target.

Inventive Concept 150. The method according to Inventive Concept 149, wherein the one or more valves are pressure-activated valves, which are configured to automatically close while the plunger is proximally partially withdrawn.

Inventive Concept 151. The method according to Inventive Concept 149, wherein the one or more valves comprise one or more non-pressure-activated valves.

Inventive Concept 152. The method according to Inventive Concept 149, wherein the filtrate receptacle is located within the plunger.

Inventive Concept 153. The method according to Inventive Concept 149, wherein the porous filter is located on the distal end of the plunger.

Inventive Concept 154. The method according to Inventive Concept 149, wherein the porous filter is coupled to a distal portion of the fluid container.

Inventive Concept 155. The method according to Inventive Concept 149, wherein introducing the fluid sample into the fluid container comprises introducing, by a testing system, the fluid sample into the fluid container.

Inventive Concept 156. The method according to Inventive Concept 149, wherein the fluid sample taken from the body of the patient is a non-centrifuged fluid sample taken from the body of the patient.

Inventive Concept 157. The method according to any one of Inventive Concepts 149-156, wherein passing the fluid sample through the porous filter and into the filtrate receptacle comprises distally advancing the plunger within the fluid container toward the distal end of the fluid container while one or more vacuum-prevention openings of the filtration assembly are closed.

Inventive Concept 158. The method according to Inventive Concept 157, wherein proximally partially withdrawing the plunger while the fluid container is in fluid communication with the fluid sample receptacle comprises proximally partially withdrawing the plunger while the fluid container is in fluid communication with the fluid sample receptacle via the one or more vacuum-prevention openings.

Inventive Concept 159. The method according to Inventive Concept 157,
wherein the method further comprises, after passing the fluid sample through the porous filter and before preparing the extraction liquid, creating a cavity within the fluid container between the distal end of the plunger and the distal end of the fluid container by proximally partially withdrawing the plunger within the fluid container, while the one or more vacuum-prevention openings are open such that proximally partially withdrawing the plunger draws air into the cavity from outside the filtration assembly through the one or more vacuum-prevention openings, and wherein preparing the extraction liquid by introducing the one or more extraction reagents into the fluid container comprises preparing the extraction liquid by introducing the one or more extraction reagents into the cavity.

Inventive Concept 160. The method according to Inventive Concept 157, wherein introducing the one or more extraction reagents into the fluid container comprises introducing the one or more extraction reagents into the fluid container through the one or more vacuum-prevention openings.

Inventive Concept 161. The method according to Inventive Concept 157, wherein the fluid container is shaped so as to define the one or more vacuum-prevention openings.

Inventive Concept 162. The method according to Inventive Concept 161, wherein the fluid container is shaped such that the one or more vacuum-prevention openings pass through the distal end of the fluid container.

Inventive Concept 163. The method according to Inventive Concept 161, wherein the fluid container is shaped such that the one or more vacuum-prevention openings pass through a lateral wall of the fluid container proximal to the distal end of the fluid container.

Inventive Concept 164. The method according to Inventive Concept 157, wherein the distal end of the plunger is shaped so as to define the one or more vacuum-prevention openings.

Inventive Concept 165. The method according to any one of Inventive Concepts 149-156,
wherein passing the fluid sample through the porous filter and into the filtrate receptacle comprises passing the fluid sample through the porous filter and into the filtrate receptacle while the one or more valves are open, and wherein introducing the one or more extraction reagents into the fluid container and bathing the porous filter in the one or more extraction reagents comprises introducing the one or more extraction reagents into the fluid container and bathing the porous filter in the one or more extraction reagents while the one or more valves are closed, thereby preventing the one or more extraction reagents from leaking through the porous filter and out of the fluid container.

Inventive Concept 166. The method according to Inventive Concept 165, wherein the one or more valves are pressure-activated valves, which are configured to automatically open upon application of positive pressure generated by the distal advancing of the plunger within the fluid container while the one or more vacuum-prevention openings are closed, and to automatically close when the positive pressure is not applied.

Inventive Concept 167. The method according to Inventive Concept 165,
wherein the one or more valves comprise one or more non-pressure-activated valves, wherein passing the fluid sample through the porous filter and into the filtrate receptacle comprises opening the one or more valves before passing the fluid sample through the porous filter and into the filtrate receptacle while the one or more valves are open, and wherein introducing the one or more extraction reagents into the fluid container and bathing the porous filter in the one or more extraction reagents comprises introducing the one or more extraction reagents into the fluid container and bathing the porous filter in the extraction reagent while the one or more valves are closed, thereby preventing the extraction reagent from leaking through the porous filter and out of the fluid container.

The present invention will be more fully understood from the following detailed description of embodiments thereof, taken together with the drawings, in which:

BRIEF DESCRIPTION OF THE DRAWINGS

FIGS. 4A-E are schematic illustrations of several configurations in which a physical extraction method is applied to a filter of a testing system, in accordance with respective applications of the present invention;

FIGS. 6A-B are schematic illustrations of one configuration of one or more valves that regulate the passage of fluid through a filter, in accordance with an application of the present invention;

FIGS. 6C-D are schematic illustrations of another configuration of one or more valves that regulate the passage of fluid through a filter, in accordance with an application of the present invention FIGS. 7A-F show several configurations of an extraction liquid contacting a detection test, in accordance with respective applications of the present invention;

FIGS. 9A-G are schematic illustrations of a filtration assembly and method of use thereof, in accordance with respective applications of the present invention;

DETAILED DESCRIPTION OF APPLICATIONS

Figure 1C:
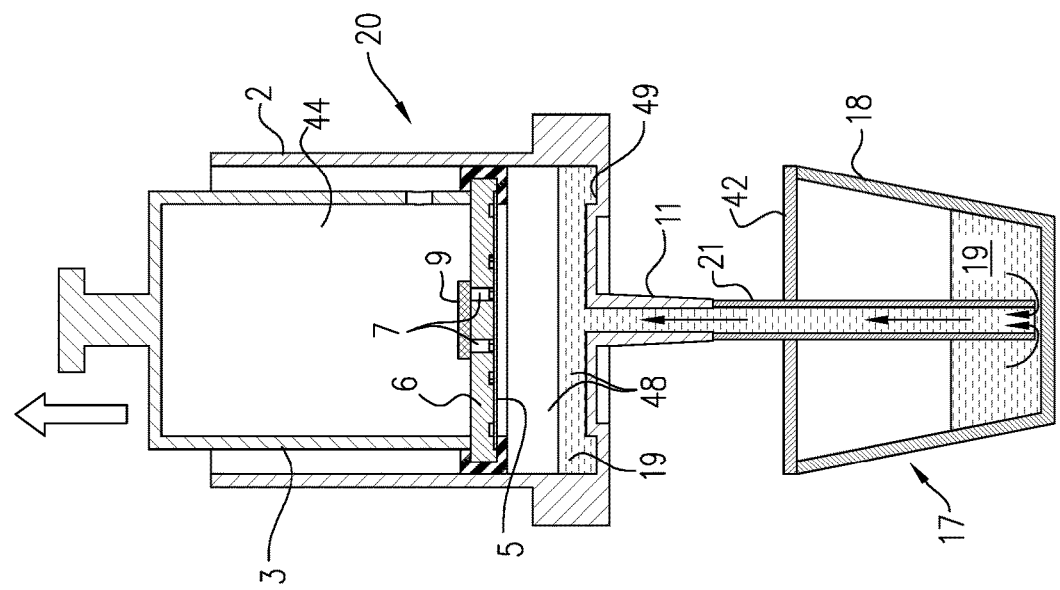
FIG. 1A is a schematic illustration of a testing system for testing a fluid sample for the presence of a particulate, in accordance with an application of the present invention.
FIGS. 1B-R are schematic illustrations of a method for testing the fluid sample using the testing system of FIG. 1A, in accordance with an application of the present invention.

FIG. 1A is a schematic illustration of a testing system 10 for testing a fluid sample 19 taken from a body of a patient for the presence of a particulate, in accordance with an application of the present invention. Testing system 10 comprises a filtration assembly 20. Filtration assembly 20 comprises a fluid container 2 and a plunger 3 that is movably disposed within fluid container 2. In this configuration, plunger 3 comprises one or more of the following elements:
- a plunger shaft 4;
- a porous filter 5;
- a filter support 6 that is shaped so as to define holes 7 therethrough to allow passage of fluid;
- a seal 8 that forms a movable seal between filter support 6 and an inner wall of fluid container 2;
- one or more valves 9 that regulate the passage of the fluid through filter 5 (e.g., by regulating the passage of the fluid through holes 7 in filter support 6); and
- a filtrate receptacle 44 that receives a filtrate 27 that passed through filter 5.

Plunger 3 is configured to be inserted into a proximal opening 46 of fluid container 2 so as to define a fluid-container space 48 between a distal end of plunger 3 (and, optionally, filter 5) and a distal end 49 of fluid container 2 when plunger 3 is not fully distally advanced within fluid container 2 (such as shown in FIG. 1A). Filter 5 is sealed to filter support 6 by seal 8 (as shown) or by another seal (configuration not shown).

Filtration assembly 20 is shaped so as to define one or more vacuum-prevention openings 11, which, when open, provide fluid communication between fluid-container space 48 and outside filtration assembly 20. For example, the one or more vacuum-prevention openings 11 may pass through distal end 49 of fluid container 2 (such as shown), or the one or more vacuum-prevention openings 11 may pass through one or more lateral walls of fluid container 2 in fluid-container space 48 (i.e., in an area that is distal to plunger 3 when plunger 3 is movably disposed within fluid container 2) (configuration not shown). The one or more vacuum-prevention openings 11 allow passage of fluid (liquid and air) between fluid-container space 48 of fluid container 2 and the environment outside filtration assembly 20 while plunger 3 is movably disposed within fluid container 2.

Typically, filtration assembly 20 is removable from testing system 10, and optionally is configured as a disposable unit for single use. In addition to filtration assembly 20, testing system 10 typically further comprises two sets of elements 12 and 17.

First set of elements 12 comprises one or more of the following elements: a plug 13, one or more reagent dispensers 14, and a detection test holder 15. Detection test holder 15 comprises a detection test 16, such as a lateral-flow immunoassay or immunochromatographic assay.

Second set of elements 17 comprises one or more of the following elements: a fluid sample receptacle 18 configured to contain fluid sample 19 taken from the body of a patient, and, typically, a cover 42. Cover 42 of fluid sample receptacle 18 comprises one or more adaptors 21 that are shaped to connect with the one or more vacuum-prevention openings 11.

For some applications, fluid sample 19 includes at least one oronasopharyngeal fluid selected from the group of oronasopharyngeal fluids consisting of gargled fluid, saliva not swabbed from the throat of a patient, nasal wash, nasal aspirate, throat wash, oral wash, spit, material (liquid and/or solid) from (a) (i) a nasal swab or (ii) a nasopharyngeal swab mixed with (b) (i) the gargled fluid and/or (ii) the nasal wash, and/or any combination of the above fluid samples. Alternatively or additionally, fluid sample 19 includes biological body fluids, such as blood, bronchoalveolar fluid, gastric fluid, urine, cerebrospinal fluid, or cystic fluid, either mixed or not mixed with one or more other fluids, such as saline solution. Any of the washes and gargled fluids described herein may include, in addition to the biological body material, a liquid introduced into the human or non-human animal, such as water, carbonated water, saline (e.g., phosphate buffered saline), pelargonium sidoides extract, tannic acid, balloon flower platycodon grandiflorus, berberine sulfate, S-carboxymethylcysteine, curcumin, coloring, flavoring, a detergent (such as Polysorbate 20 (e.g., Tween® 20)), or any combination thereof.

For some applications, fluid sample 19 is a non-centrifuged fluid sample.

Typically, some or all of the elements of first set of elements 12 and second set of elements 17 are removable from testing system 10. Some or all of the elements of first set of elements 12 and second set of elements 17 are movable in relation to one other.

First set of elements 12, second set of elements 17, and filtration assembly 20 are movable in relation to each other, for example by one or more mechanical tracks 35a, 35b, 35c, and 39. Filtration assembly 20 may move in relation to first set of elements 12 and second set of elements 17; first set of elements 12 may move in relation to filtration assembly 20 and second set of elements 17; and/or second set of elements 17 may move in relation to filtration assembly 20 and first set of elements 12. Other combinations of movability are possible and are within the scope of the present invention. For example, first set of elements 12 may be coupled to first track 35a, filtration assembly 20 may be coupled to second track 35b, and second set of elements 17 may be coupled to third track 35c, and mechanical tracks 35a, 35b, and 35c may be configured to be movable relative to one other. For example, the positions of mechanical tracks 35a, 35b, and 35c may be actuated by another mechanical track 39. Alternatively or additionally, the elements may be configured to slide along the respective tracks.

For some applications, mechanical tracks 35a, 35b, and 35c are configured to be oriented horizontally with respect to the Earth. For some of these applications, mechanical track 39 is configured to be oriented vertically with respect to the Earth, i.e., perpendicularly with respect to mechanical tracks 35a, 35b, and 35c. For some applications, mechanical tracks 35a, 35b, and 35c can slide along mechanical track 39.

Figure 1B:
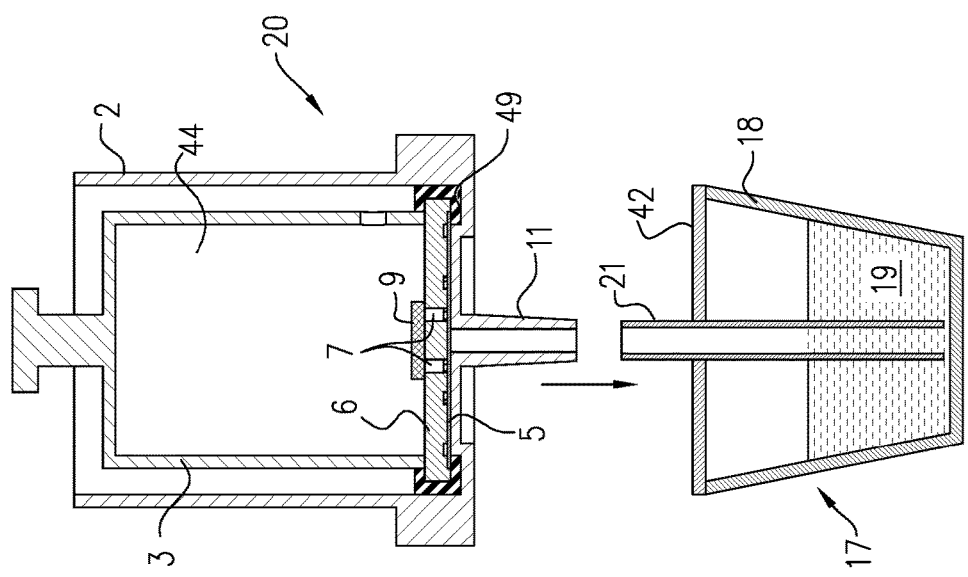
Figure 1D:
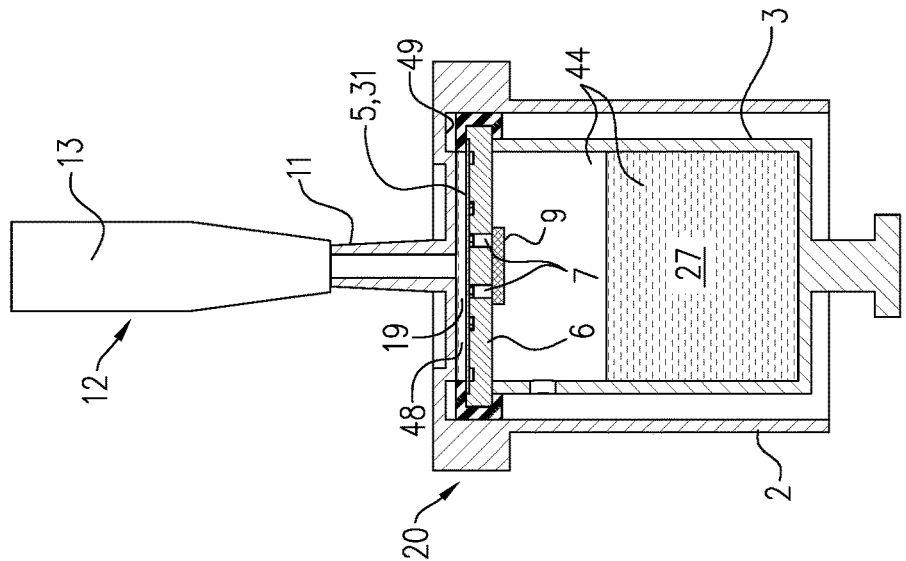
Figure 1E:
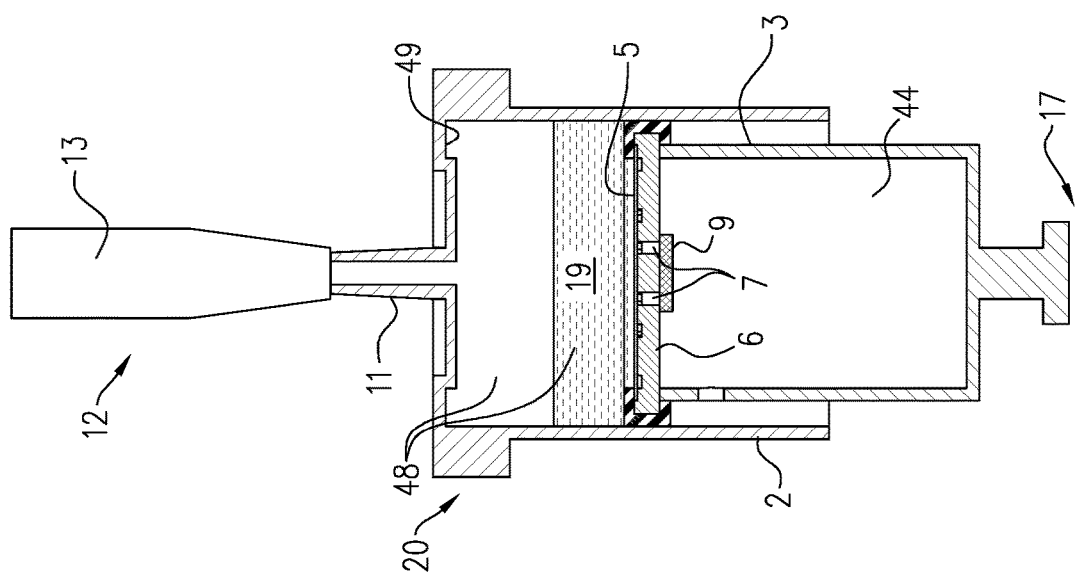

For some applications, the vertical orientation of filtration assembly 20 is adjustable such that distal end 49 of fluid container 2, for example, defining the one or more vacuum-prevention openings 11, can alternatively face second set of elements 17 and face first set of elements 12, as shown in FIGS. 1D-E. For example, filtration assembly 20 can change the vertical orientation of filtration assembly 20 by rotating second track 35b around a longitudinal horizontal axis of second track 35b. (During this change in vertical orientation of filtration assembly 20, fluid sample 19 generally does not leak out of fluid-container space 48 because of the suction created by the lower air pressure within fluid-container space 48 than outside filtration assembly 20.)

Testing system 10 typically comprises one or more actuators (e.g., motors) that are configured to cause the above-mentioned movements. For some applications, testing system 10 further comprises control circuitry, which is configured, in software and/or hardware, to actuate the one or more actuators to perform the steps of the methods described herein.

For some applications, filter 5 has an average absolute pore size of between 0.01 and 20.0 microns, such as between 0.03 and 0.2 microns, between 0.4 and 2.0 microns, between 0.8 and 3.0 microns, and/or between 1.2 and 20 microns.

For some applications, filter 5 has a nominal pore size of between 0.01 and 20.0 microns, such as between 0.4 and 2.0 microns, between 0.8 and 3.0 microns, and/or between 1.2 and 20 microns.

For some applications, filter 5 is a large-pore filter with a nominal pore size of between 30 microns and 1.5 mm, such between 50 and 250 microns (e.g., between 50 and 200 microns, such as between 50 and 150 microns, e.g., between 100 and 150 microns).

For some applications, filter 5 is a depth filter, such as a glass fiber filter.

For some applications, plunger 3 comprises a plurality of filters arranged in series, having differing or the same pore sizes.

Figure 1F:
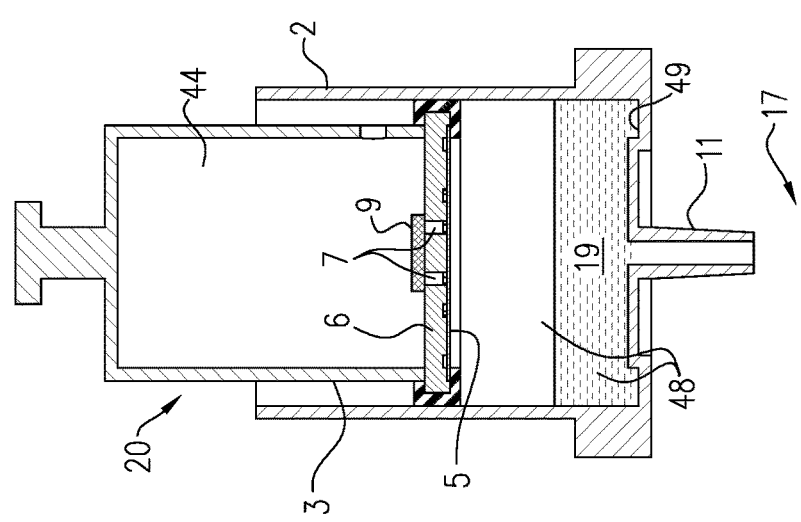
Figure 1G:
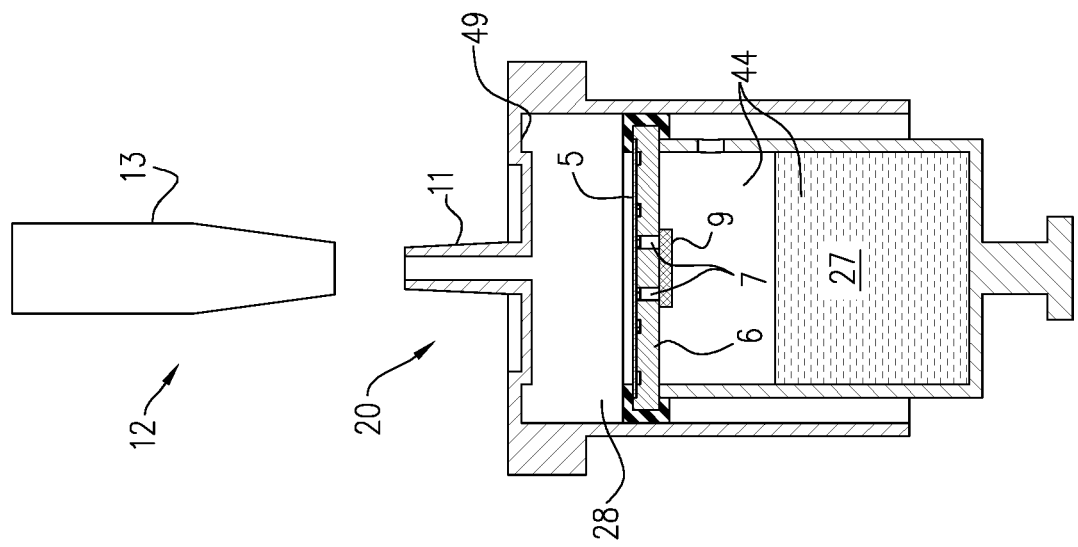
Figure 1H:
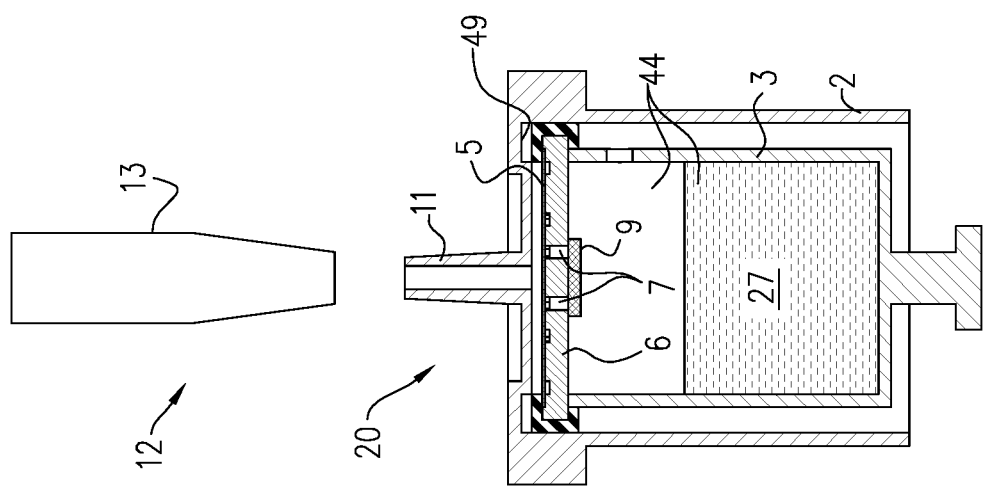
Figure 1K:
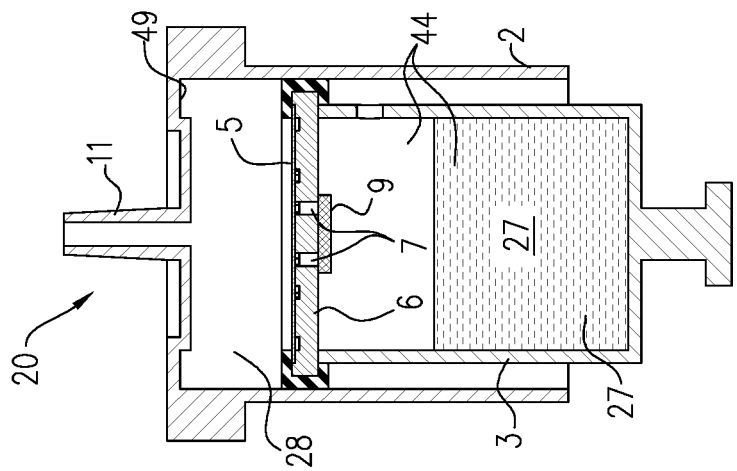
Figure 1J:
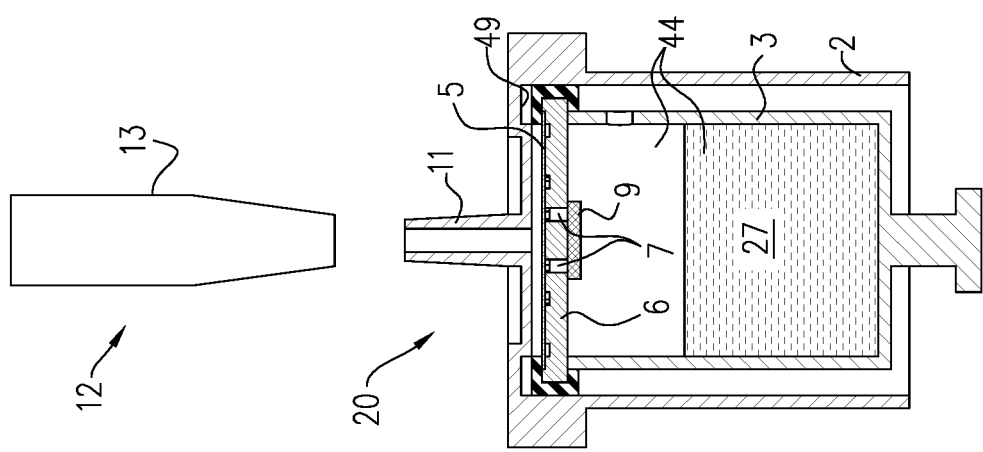
Figure 1I:
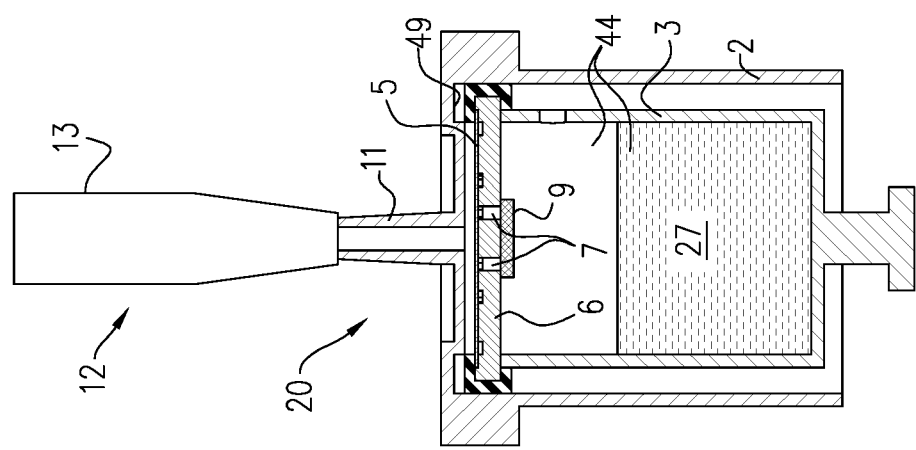
Figure 1O:
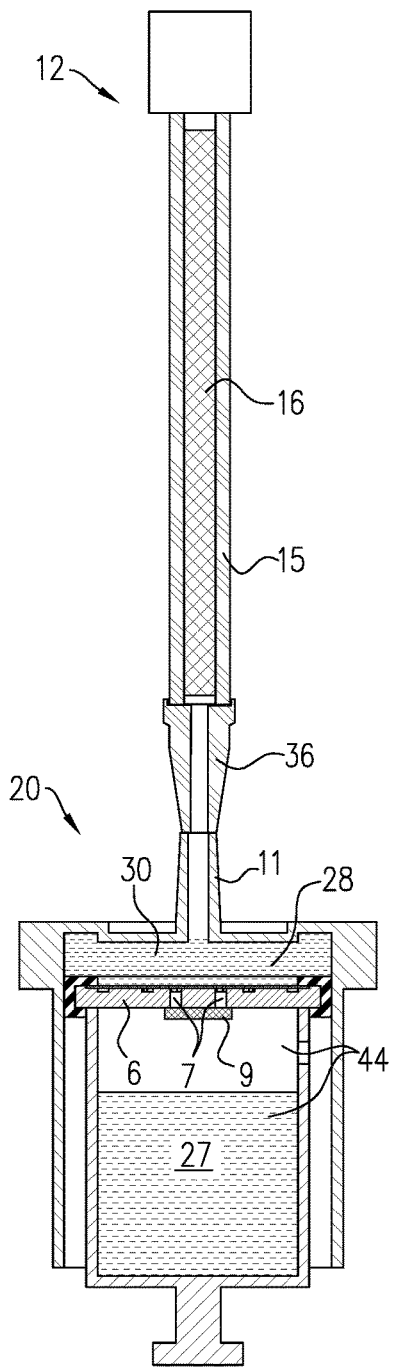
Figure 1P:
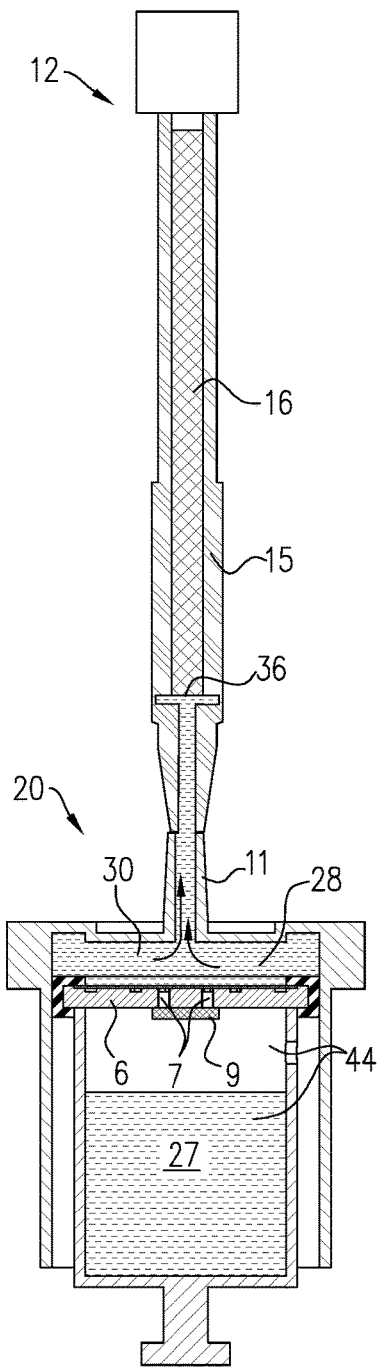
Figure 1Q:
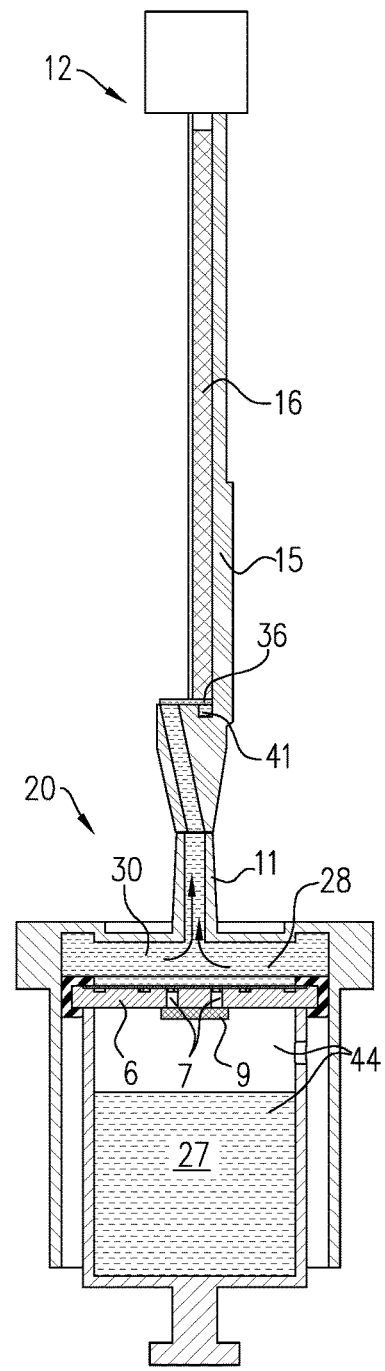
Figure 1R:
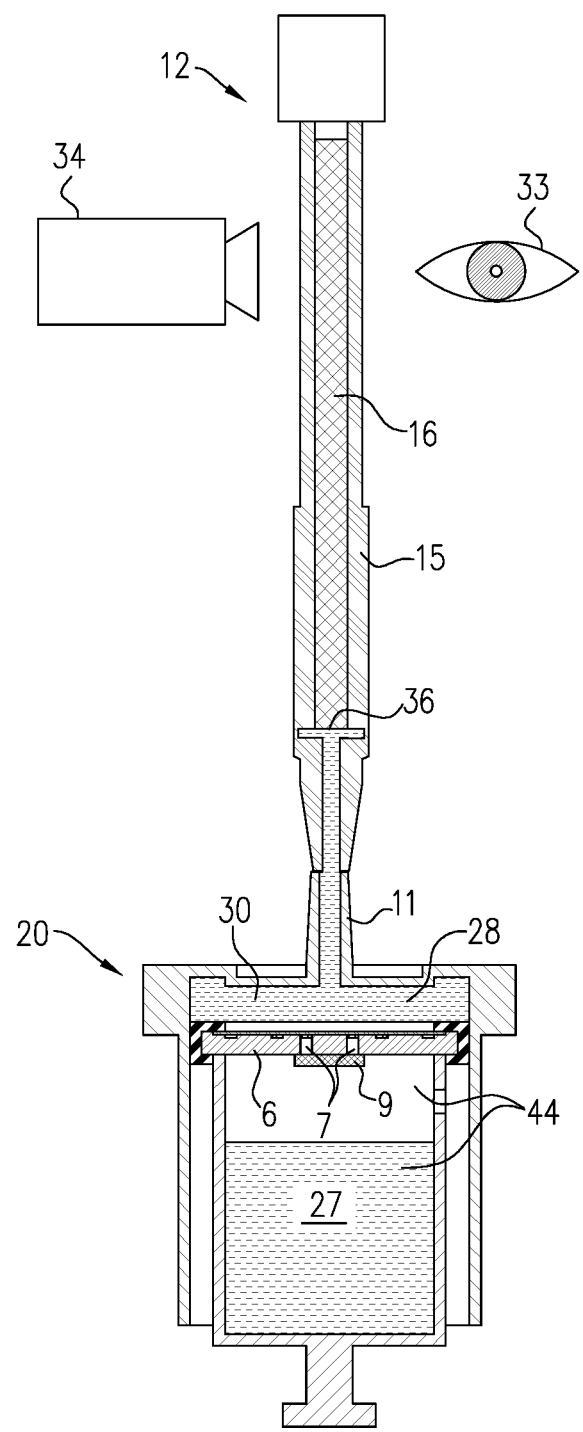

FIGS. 1B-R are schematic illustrations of a method for testing fluid sample 19 taken from a body of a patient for the presence of a particulate, in accordance with an application of the present invention. The method may include all or only a portion of the illustrated steps, as described below. Fluid sample 19 is disposed in fluid sample receptacle 18.

As shown in FIG. 1B, filtration assembly 20 begins in a vertical orientation in which the one or more vacuum-prevention openings 11 defined by fluid container 2 face second set of elements 17, including fluid sample receptacle 18, and plunger 3 is in a maximally-distally-advanced position within fluid container 2, reaching distal end 49, or in a close-to-maximally-distally-advanced position near distal end 49 within fluid container 2 (filtration assembly 20 is typically initially set in this position). The one or more vacuum-prevention openings 11 defined by fluid container 2 are brought into alignment with and into fluid connection with the one or more adaptors 21 of cover 42 of fluid sample receptacle 18, respectively, which, as mentioned above, contains fluid sample 19. This alignment and fluid connection, as well as all of the motions and actions described herein, may be caused using the above-described tracks and/or control circuitry, and/or manually.

As shown in FIG. 1C, plunger 3 is proximally withdrawn within fluid container 2, while the one or more vacuum-prevention openings 11 defined by fluid container 2 are in fluid connection with the one or more adaptors 21 of cover 42 of fluid sample receptacle 18, and while the one or more valves 9 that regulate the passage of the fluid through filter 5 (e.g., by regulating the passage of fluid through holes 7 in filter support 6) are in a closed position. This proximal withdrawal creates fluid-container space 48 within fluid container 2 and sucks fluid sample 19 from fluid sample receptacle 18, up through the one or more vacuum-prevention openings 11, and into fluid-container space 48 within fluid container 2, thereby transferring all or a portion of fluid sample 19 from fluid container 2 to fluid-container space 48 of filtration assembly 20. Optionally, this step of the method is performed while fluid sample receptacle 18 is disposed below filtration assembly 20 with respect to the Earth, and/or while the one or more vacuum-prevention openings 11 face downward with respect to the Earth.

As shown in the transition between FIGS. 1C and 1D, the proximal withdrawing of plunger 3 is completed and then halted, such as once all or most of fluid sample 19 is sucked into fluid-container space 48. Filtration assembly 20 is disconnected from the one or more adaptors 21 of cover 42 of fluid sample receptacle 18.

As shown in the transition between FIG. 1D and FIG. 1E, the vertical orientation of filtration assembly 20 is changed from an orientation in which the one or more vacuum-prevention openings 11 face second set of elements 17 to an orientation in which the one or more vacuum-prevention openings 11 face first set of elements 12. Optionally, after this change in vertical orientation, the one or more vacuum-prevention openings 11 face upward with respect to the Earth, and/or the one or more vacuum-prevention openings 11 are disposed above plunger 3 with respect to the Earth.

As shown in FIG. 1E, the one or more vacuum-prevention openings 11 are closed, such as by plugging with plug 13 of first set of elements 12. Optionally, the one or more vacuum-prevention openings 11 are closed, such as by plugging with plug 13, before the vertical orientation of filtration assembly 20 is changed, as shown in the transition between FIG. 1D and FIG. 1E (configuration not shown).

As shown in the transition between FIGS. 1E and 1F, plunger 3 is distally advanced within fluid container 2, while (a) the one or more valves 9 that regulate the passage of fluid through filter 5 (e.g., by regulating the passage of fluid through holes 7 in filter support 6) are in an open position and (b) the one or more vacuum-prevention openings 11 are closed, thereby forcing fluid sample 19 from fluid-container space 48 within fluid container 2, through filter 5, and into filtrate receptacle 44. This process filters fluid sample 19 to capture, on or within filter 5, particles larger than the pore size of filter 5, which include particulate 31 that may be present in fluid sample 19, while allowing filtrate 27 to pass into filtrate receptacle 44 within plunger 3. Optionally, before performance of this step of the method, fluid sample 19 is incubated and/or combined with growth media 24, such as described hereinbelow with reference to FIGS. 2A-E.

As shown in FIG. 1G, the one or more vacuum-prevention openings 11 are opened, such as by removing plug 13 of first set of elements 12.

As shown in the transition between FIGS. 1G and 1H, a cavity 28 is created within fluid container 2 between the distal end of plunger 3 and distal end 49 of fluid container 2, by partially proximally withdrawing plunger 3 within fluid container 2 while the one or more vacuum-prevention openings 11 are open. This process draws air into filter container 2 from outside filtration assembly 20 through the one or more vacuum-prevention openings 11 and thus creates cavity 28 between the distal end of plunger 3 and distal end 49 of fluid container 2 without applying a vacuum force to filter 5. The open state of the one or more vacuum-prevention openings 11 prevents the formation of a vacuum and allows air to be drawn into cavity 28 created within fluid container 2. Cavity 28 may or may not have the same volume of fluid-container space 48, described hereinabove with reference to FIGS. 1A-F, e.g., cavity 28 may have a smaller volume than fluid-container space 48.

FIGS. 1I-K show an optional intermediate step in the testing process of removing excess fluid from filter 5, performed between creating cavity 28 within fluid container 2, described hereinabove with reference to FIGS. 1G-H, and introducing one or more extraction reagents 29 into cavity 28, described hereinbelow with reference to FIG. 1L. Alternatively, the testing method does not include this optional intermediate step.

As shown in FIG. 1I, the one or more vacuum-prevention openings 11 are closed, such as by plugging with plug 13 of first set of elements 12, and, plunger 3 is distally advanced within fluid container 2, while the one or more valves 9 that regulate the passage of fluid through filter 5 (e.g., by regulating the passage of fluid through holes 7 in filter support 6) are in an open position, thereby forcing any fluid sample 19 remaining in fluid-container space 48 through filter 5 and into filtrate receptacle 44 within plunger 3 as filtrate 27.

As shown in FIG. 1J, the one or more vacuum-prevention openings 11 of fluid container 2 are opened, such as by removing plug 13 of first set of elements 12.

As shown in the transition between FIGS. 1J and 1K, cavity 28 is recreated between the distal end of plunger 3 and distal end 49 of fluid container 2, by partially proximally withdrawing plunger 3 within fluid container 2 while the one or more vacuum-prevention openings 11 are open. This process draws air into filter container 2 from outside filtration assembly 20 through the one or more vacuum-prevention openings 11 and thus recreates cavity 28 between the distal end of plunger 3 and distal end 49 of fluid container 2 without applying a vacuum force to filter 5.

As shown in the transition between FIGS. 1L and 1M, one or more extraction reagents 29 are introduced into cavity 28. The one or more vacuum-prevention openings 11 are aligned with the one or more reagent dispensers 14 of first set of elements 12. The one or more extraction reagents 29 are dispensed from the one or more reagent dispensers 14 sequentially or simultaneously into cavity 28, while the one or more valves 9 that regulate the passage of fluid through filter 5 (e.g., by regulating the passage of fluid through holes 7 in filter support 6) are in a closed position. For some applications, the one or more extraction reagents 29 comprise one or more extraction reagents selected from the group consisting of: a detergent, an acetic acid solution, and a sodium nitrite solution. Alternatively, introduction of one or more extraction reagents 29 into cavity 28 can occur simultaneously with creating cavity 28, with or without drawing air into cavity 28 from outside filtration assembly 20 (configuration not shown). Typically, the one or more extraction reagents 29 are introduced into cavity 28 while cavity 28 is disposed above filter 5 with respect to the Earth.

For some applications, a substance configured to improve test sensitivity is introduced into cavity 28, before or after the one or more extraction reagents 29 are introduced into cavity 28. For some applications, the substance configured to improve the test sensitivity comprises one or more substances selected from the group of substances consisting of: non-ionic detergents e.g., Polysorbate-20, polysorbate-80, brij-35, NP-40, and/or Triton X-100, hydrophilic polymers (e.g., PEG (polyethylene glycol)), and quaternary anions (e.g., Betain).

As shown in FIGS. 1M and 1N, filter 5 is bathed in the one or more extraction reagents 29. FIGS. 1M and 1N show the one or more extraction reagents 29 bathing filter 5 containing captured particles larger than the pore size of filter 5 that may include particulate 31 within cavity 28 (optionally, but not necessarily, for an amount of time of 1-30 minutes), while the one or more valves 9 that regulate the passage of fluid through filter 5 (e.g., by regulating the passage of fluid through holes 7 in filter support 6) are in a closed position. FIG. 1N shows that this step of the method prepares extraction liquid 30 that comprises one or more of the following components: the one or more extraction reagents 29, captured particles larger than the pore size of filter 5 that may include particulate 31, extracted and exposed biological targets 40, and possibly some components or pieces of filter 32 that are mixed or dissolved within extraction liquid 30.

For some applications, a physical extraction method is optionally applied to filter 5 while the one or more extraction reagents 29 bathe filter 5 (such as described hereinbelow with reference to FIGS. 4A-E).

As shown in FIGS. 1O-Q, extraction liquid 30 is tested for the presence of particulate 31. FIG. 1O shows the one or more vacuum-prevention openings 11, while open, aligned with detection test holder 15 of first set of elements 12.

As shown in FIG. 1P, extraction liquid 30 is moved (drawn) from cavity 28 into detection test holder 15. Detection test 16 begins upon contact with extraction liquid 30 within detection test holder 15. For example, for applications in which detection test 16 comprises a lateral-flow immunoassay, the capillary action of the lateral-flow immunoassay begins upon contact with extraction liquid 30.

For some applications, such as shown in FIGS. 1P-Q (which are views of test holder from two direction 90 degrees offset from each other), detection test holder 15 is optionally configured such that detection test holder 15 retains fluid during the duration of the testing by detection test 16, for example, by using an overflow system 36. For example, overflow system 36 may be shaped so as to define a depression 41 into which the fluid overflows and is retained in contact with the detection test.

As shown in FIG. 1R, results of detection test 16 are read to aid in infectious disease diagnosis. FIG. 1R shows the results of detection test 16 being read by a human eye 33 or by an optical reading system 34, which comprises analog and/or digital components (for example, a fluorescent reader). Alternatively, reading system 34 is not optical.

For some applications, reading system 34 is configured to send the results, such as over a computer network that is wireless and/or wired, e.g., the Internet.

For some applications, the results are read after an amount of time has elapsed of 2 minutes to 5 hours after detection test 16 comes into contact with extraction liquid 30. For example, the results may be read after an amount of time has elapsed of 3 minutes to 2 hours after detection test 16 comes into contact with extraction liquid 30. For example, the results may be read after an amount of time has elapsed of 5 minutes to 20 minutes after detection test 16 comes into contact with extraction liquid 30. Typically, the test results are read to aid in infectious disease diagnosis.

For some applications, the particulate is one or more of the following microorganisms: a virus (e.g., an Influenza virus or a coronavirus, such as SARS-CoV-2), a bacterium (e.g., Streptococcus bacteria, such as Group A Streptococcus (pyogenes), Group C Streptococcus, or Group G Streptococcus), a fungus.

Figure 2A:
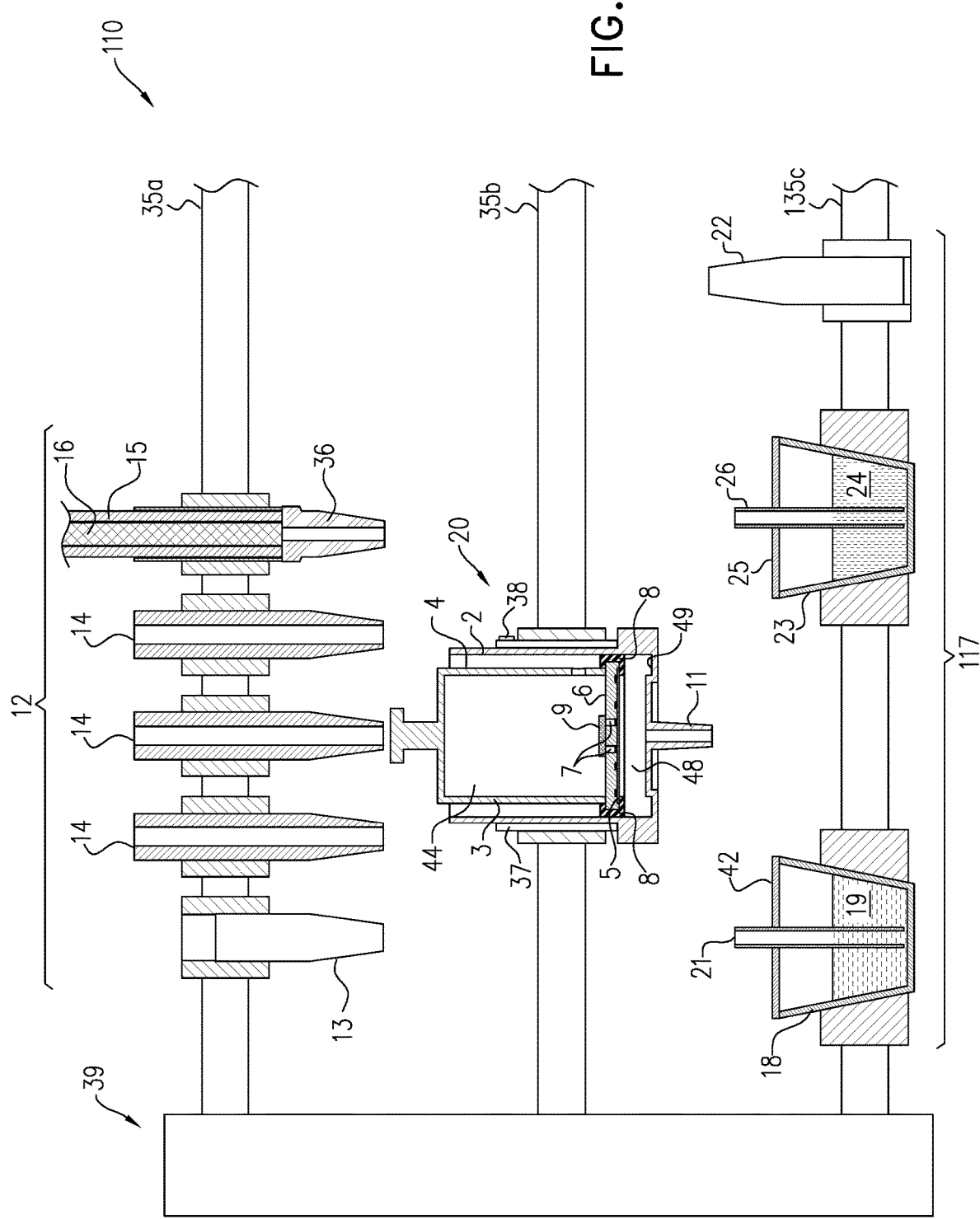
FIG. 2A is a schematic illustration of another testing system for testing a fluid sample for the presence of a particulate that includes growth media, in accordance with an application of the present invention.

Reference is now made to FIG. 2A, which is a schematic illustration of a testing system 110 for testing fluid sample 19 taken from a body of a patient for the presence of a particulate 31 that includes growth media 24, in accordance with an application of the present invention. Other than as described hereinbelow, testing system 110 is generally similar to testing system 10 described hereinabove with reference to FIGS. 1A-R, and may implement any of the features thereof, mutatis mutandis.

In addition to filtration assembly 20, testing system 110 typically further comprises first set of elements 12, described hereinabove with reference to FIGS. 1A-R, and a second set of elements 117.

Second set of elements 117 comprises, in addition to the elements of second set of elements 17 described hereinabove with reference to FIG. 1A, one or more of the following elements, a growth media receptacle 23 containing growth media 24, and a plug 22. Growth media receptacle 23 comprises a cover 25 that comprises one or more adaptors 26 that are shaped to connect with the one or more vacuum-prevention openings 11.

Typically, some or all of the elements of first set of elements 12 and second set of elements 117 are removable from testing system 110. Some or all of the elements of first set of elements 12 and second set of elements 117 are movable in relation to one other.

First set of elements 12, second set of elements 117, and filtration assembly 20 are movable in relation to each other, for example as described hereinabove with reference to FIG. 1A regarding first set of elements 12 and second set of element 17.

FIGS. 2B-E are schematic illustrations of a portion of a method for testing fluid sample 19 taken from a body of a patient for the presence of a particulate, in accordance with an application of the present invention. The portion of the method described with reference to FIGS. 2B-E may be performed instead of the portion of the method described hereinabove with reference to FIGS. 1B-D. The portion of the method described with reference to FIGS. 2B-E is typically followed by the portion of the method described hereinabove with reference to FIGS. 1E-R. Unlike the portion of the method described hereinabove with reference to FIGS. 1B-D, the portion of the method described with reference to FIGS. 2B-E further comprises adding a growth media 24 to filtration assembly 20.

Figure 2C:
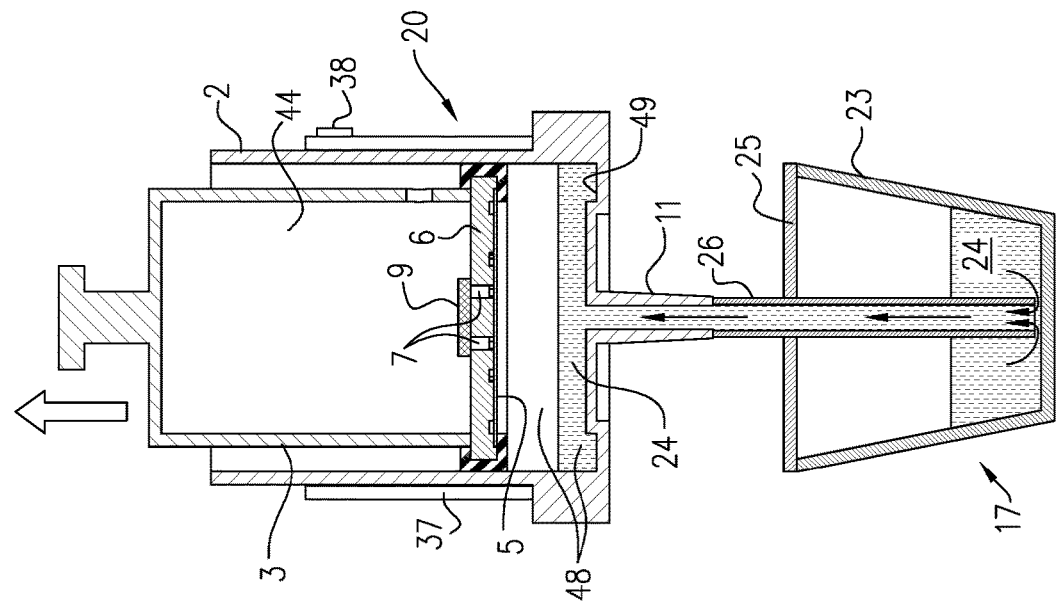
FIGS. 2B-E are schematic illustrations of a portion of a method for testing the fluid sample using the testing system of FIG. 2A, in accordance with an application of the present invention
Figure 2B:
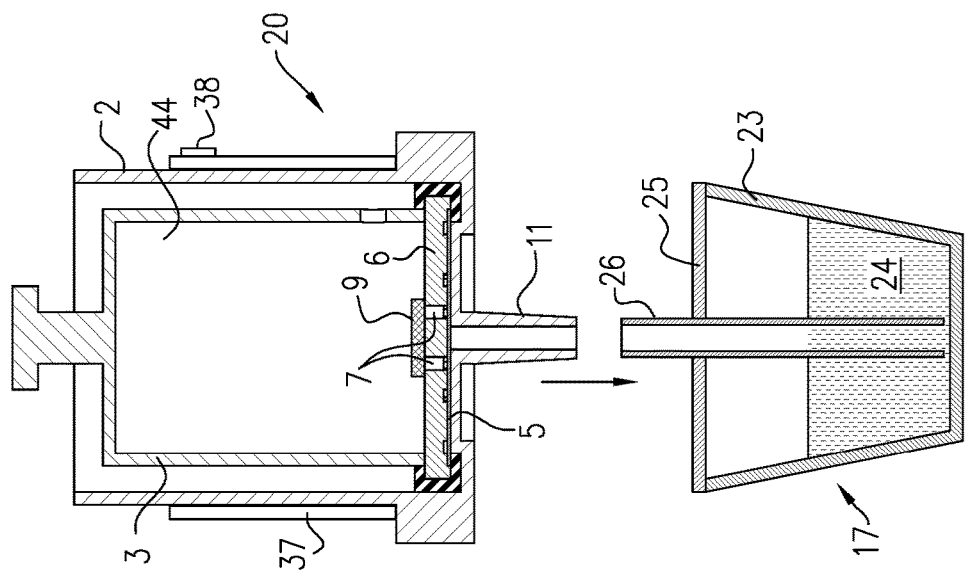

As shown in FIG. 2B, filtration assembly 20 begins in a vertical orientation in which the one or more vacuum-prevention openings 11 defined by fluid container 2 face second set of elements 117, including fluid growth media receptacle 23 and fluid sample receptacle 18, and plunger 3 is in a maximally-distally-advanced position within fluid container 2, reaching distal end 49, or in a close-to-maximally-distally-advanced position near distal end 49 within fluid container 2 (filtration assembly 20 is typically initially set in this position). The one or more vacuum-prevention openings 11 defined by fluid container 2 are aligned with and in fluid connection with the one or more adaptors 26 of cover 25 of growth media receptacle 23, respectively, containing growth media 24, for example, liquid growth media. This alignment, as well as all of the motions and actions described herein, may be caused using the above-described tracks and/or control circuitry, and/or manually.

As shown in FIG. 2C, plunger 3 is proximally withdrawn within fluid container 2, while the one or more vacuum-prevention openings 11 defined by fluid container 2 are in fluid connection with the one or more adaptors 26 of cover 25 of growth media receptacle 23, and while the one or more valves 9 that regulate the passage of fluid through filter 5 (e.g., by regulating the passage of fluid through holes 7 in filter support 6) are in a closed position. This proximal withdrawal creates fluid-container space 48 within fluid container 2 and sucks growth media 24 from growth media receptacle 23, up through the one or more vacuum-prevention openings 11, and into fluid-container space 48 within fluid container 2. Optionally, this step of the method is performed while growth media receptacle 23 is disposed below filtration assembly 20 with respect to the Earth, and/or while the one or more vacuum-prevention openings 11 face downward with respect to the Earth.

Figure 2D:
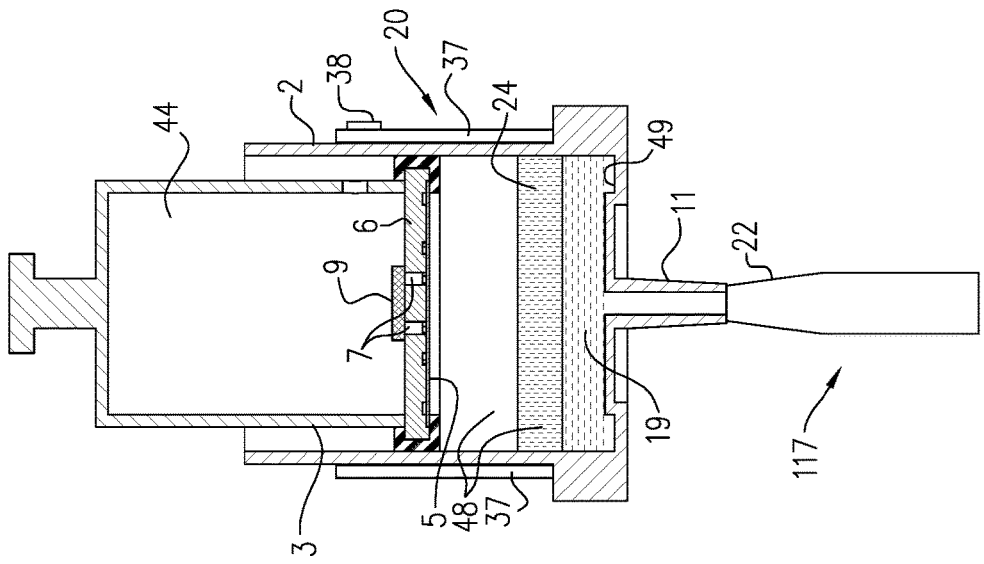

As shown in FIG. 2D, fluid sample 19 is added to filtration assembly 20 that already contains growth media 24. FIG. 2D shows the one or more vacuum-prevention openings 11 aligned with and in fluid connection with the one or more adaptors 21 on cover 42 of receptacle 18 containing fluid sample 19. Plunger 3 is proximally withdrawn within fluid container 2, while the one or more vacuum-prevention openings 11 defined by fluid container 2 are in fluid connection with the one or more adaptors 21 of cover 42 of fluid sample receptacle 18, and while the one or more valves 9 that regulate the passage of fluid through filter 5 (e.g., by regulating the passage of fluid through holes 7 in filter support 6) are in a closed position, thereby sucking fluid sample 19 from fluid sample receptacle 18, up through the one or more vacuum-prevention openings 11, and into fluid-container space 48 within fluid container 2, which already contains growth media 24 (thereby increasing a volume of fluid-container space 48). (For illustrative purposes, fluid sample 19 and growth media 24 are shown separately in FIGS. 2D and 2E, even though in reality they may mix together.)

Alternatively, fluid sample 19 is drawn into filtration assembly 20, as described hereinabove with reference to FIG. 2D, before growth media 24 is drawn into filtration assembly 20, as described hereinabove with reference to FIGS. 2B-C.

Figure 2E:
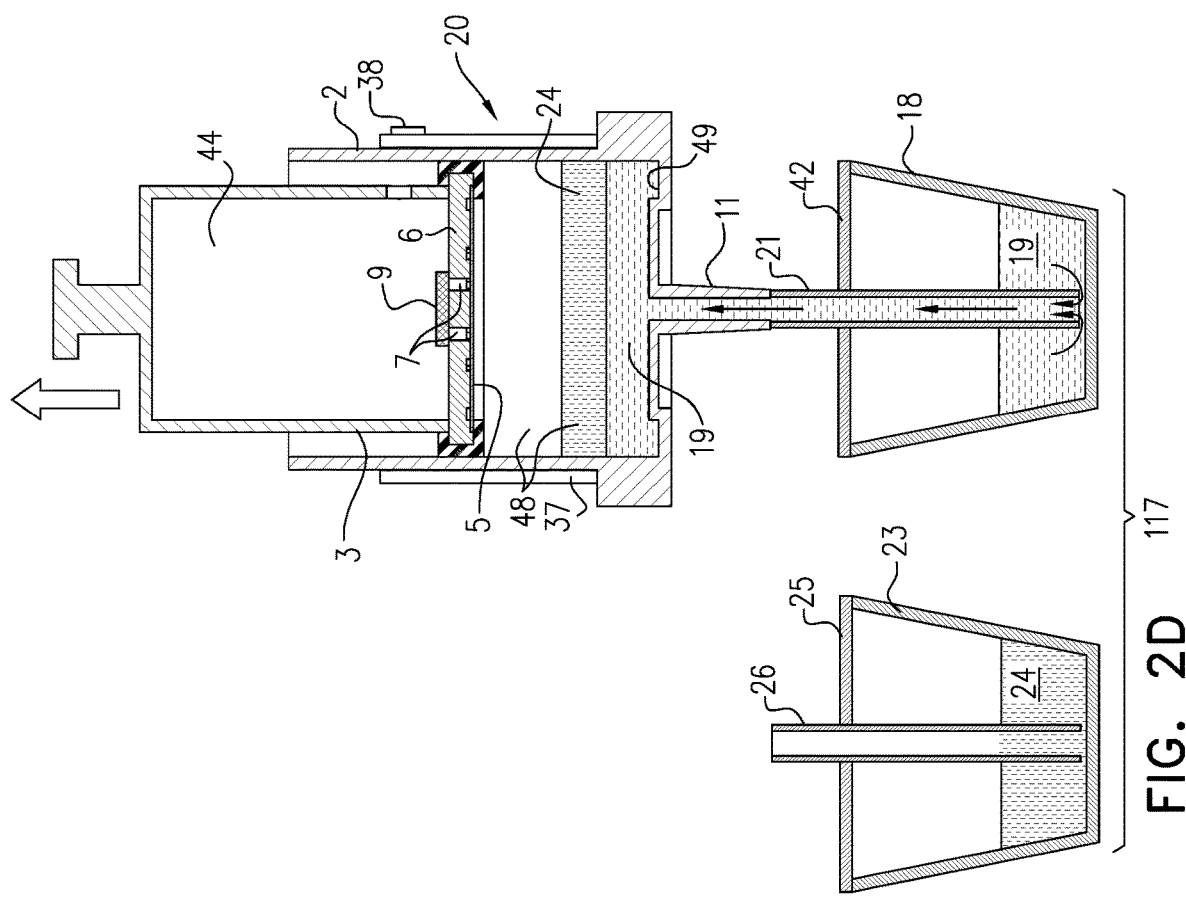

As shown in FIG. 2E, the one or more vacuum-prevention openings 11 are closed, such as using plug 22 of second set of elements 117. Thereafter, growth media 24 and fluid sample 19 are incubated within fluid-container space 48 within fluid container 2 of filtration assembly 20. For example, growth media 24 and fluid sample 19 may be incubated at between 30 and 40 degrees Celsius and/or, for example, for between 2 and 75 hours. For example, a heating element 37 may maintain the incubation temperature of growth media 24 and fluid sample 19 within fluid container 2, while a temperature sensor 38 may measure and calibrate the incubation temperature.

The testing method continues as described hereinabove with reference to FIGS. 1D-R.

Reference is made to FIGS. 3A-J, which are schematic illustrations of a testing system 210 for testing fluid sample 19 taken from a body of a patient for the presence of a particulate 31, and a method of using testing system 210, in accordance with respective applications of the present invention. Other than as described hereinbelow, testing system 210 is generally similar to testing system 10 described hereinabove with reference to FIGS. 1A-R, and may implement any of the features thereof, mutatis mutandis, and/or any of the features of testing system 110 described hereinabove with reference to FIGS. 2A-E, mutatis mutandis.

Testing system 210 comprises a rotary valve 50, which is configured to control the flow of fluid and air. The one or more vacuum-prevention openings 11 are connectable to rotary valve 50. Typically, rotary valve 50 comprises three or more ports 55. Some or all of ports 55 on rotary valve 50 are connectable to two or more fluid dispensers 52 and to detection test holder 15. The two or more fluid dispensers 52 and detection test holder 15 may be removable from rotary valve 50. The two or more fluid dispensers 52 may comprise of the following: a growth media dispenser 53, a fluid sample dispenser 54, and one or more reagent dispensers 14. Rotary valve 50 is shaped so as to define one or more passages 51 that allow fluid and air to pass through rotary valve 50 in controlled paths determined by the position of the one or more passages 51 in relation to the three or more ports 55. Rotary valve 50 can also be positioned in a closed position to prevent the flow of fluid and air through passages 51.

Testing system 210 typically further comprises one or more actuators (e.g., motors) that are configured to cause the rotation of rotary valve 50 described hereinabove and hereinbelow. For some applications, testing system 210 further comprises control circuitry, which is configured, in software and/or hardware, to actuate the one or more actuators to perform the steps of the methods described herein.

Figure 3B:
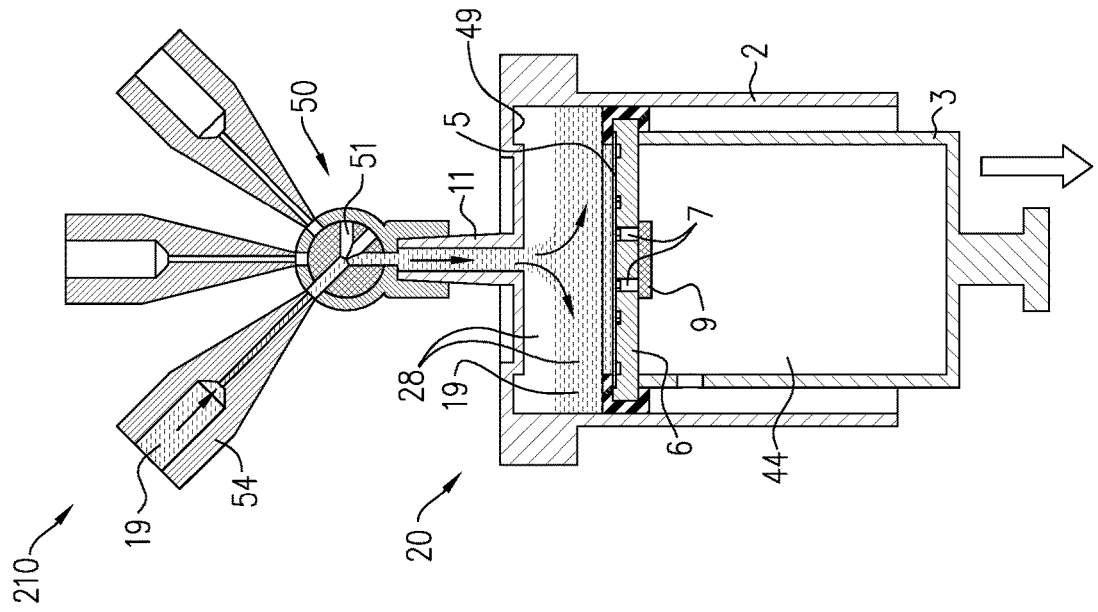
FIGS. 3A-J are schematic illustrations of yet another testing system for testing a fluid sample for the presence of a particulate, and a method of using the testing system, in accordance with respective applications of the present invention.

As shown in FIG. 3B, rotary valve 50 begins in a rotary position in which one or more passages 51 of rotary valve 50 create a path between fluid sample dispenser 54 and the one or more vacuum-prevention openings 11 in fluid container 2, and in which plunger 3 is in a maximally-distally-advanced position within fluid container 2, reaching distal end 49, or in a close-to-maximally-distally-advanced position near distal end 49 within fluid container 2 (filtration assembly 20 is typically initially set in this position).

Figure 3A:
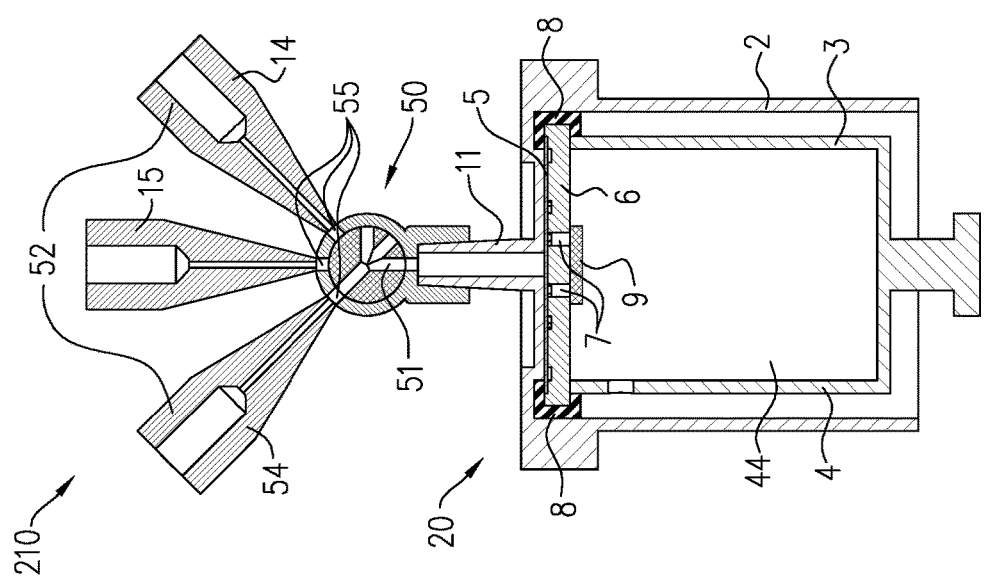

As shown in the transition between FIGS. 3A and 3B, plunger 3 is proximally withdrawn within fluid container 2, while the one or more vacuum-prevention openings 11 defined by fluid container 2 are in fluid connection with the one or more passages 51 of rotary valve 50, and while the one or more valves 9 that regulate the passage of fluid through filter 5 (e.g., by regulating the passage of fluid through holes 7 in filter support 6) are in a closed position. This proximal withdrawal creates fluid-container space 48 within fluid container 2 and sucks all or a portion of fluid sample 19 from fluid sample dispenser 54, through one or more passages 51 in rotary valve 50, and into fluid-container space 48 within fluid container 2.

Figure 3C:
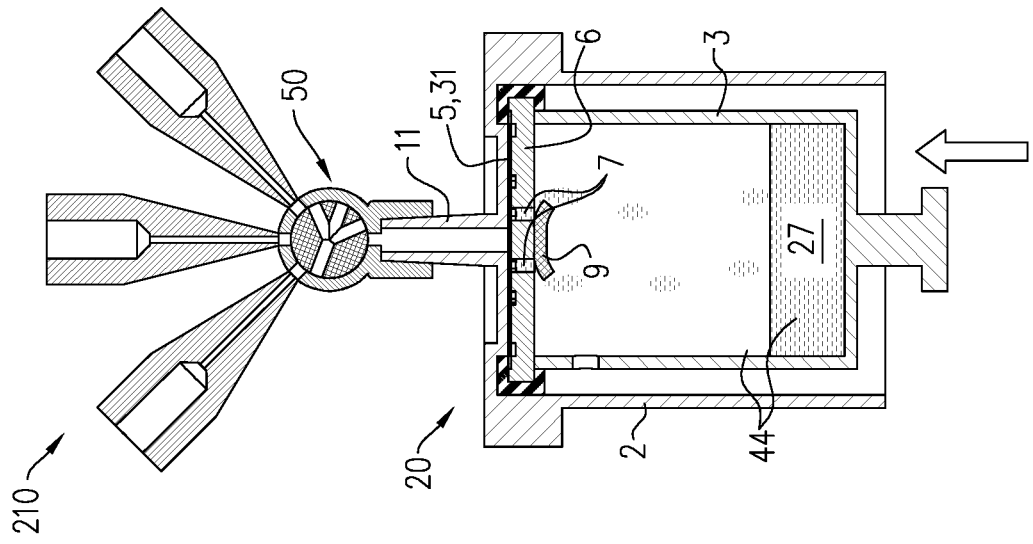

As shown in the transition between FIGS. 3B and 3C, the proximal withdrawing of plunger 3 is completed and then halted, such as once all or most of fluid sample 19 is sucked into fluid-container space 48.

Figure 3D:
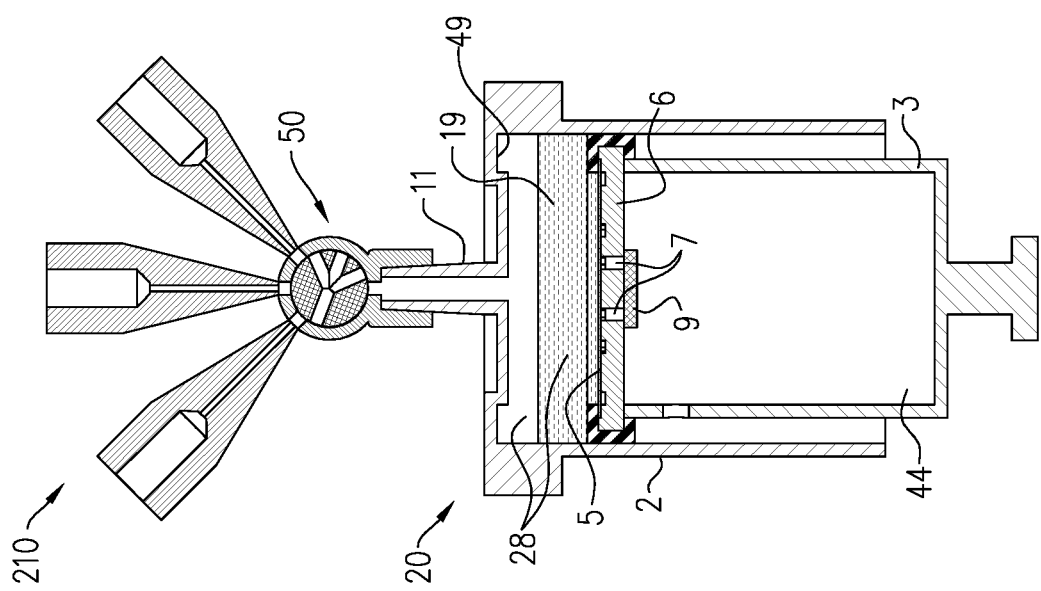

As shown in the transition between FIGS. 3C and 3D, fluid sample 19 is filtered to capture, on or within filter 5, particles larger than the pore size of filter 5, which includes particulate 31 that may be present in fluid sample 19. FIGS. 3C-D show rotary valve 50 rotated to a closed position. Plunger 3 is distally advanced within fluid container 2, while the one or more valves 9 that regulate the passage of fluid through filter 5 (e.g., by regulating the passage of fluid through holes 7 in filter support 6) are in an open position, thereby forcing fluid sample 19 through filter 5 and into filtrate receptacle 44. This process filters fluid sample 19 to capture, on or within filter 5, particles larger than the pore size of filter 5, which include particulate 31 that may be present in fluid sample 19, while allowing filtrate 27 to pass into filtrate receptacle 44 within plunger 3. Optionally, before performance of this step of the method, fluid sample 19 is incubated and/or combined with growth media 24, such as described hereinabove with reference to FIGS. 2A-E, mutatis mutandis.

Figure 3F:
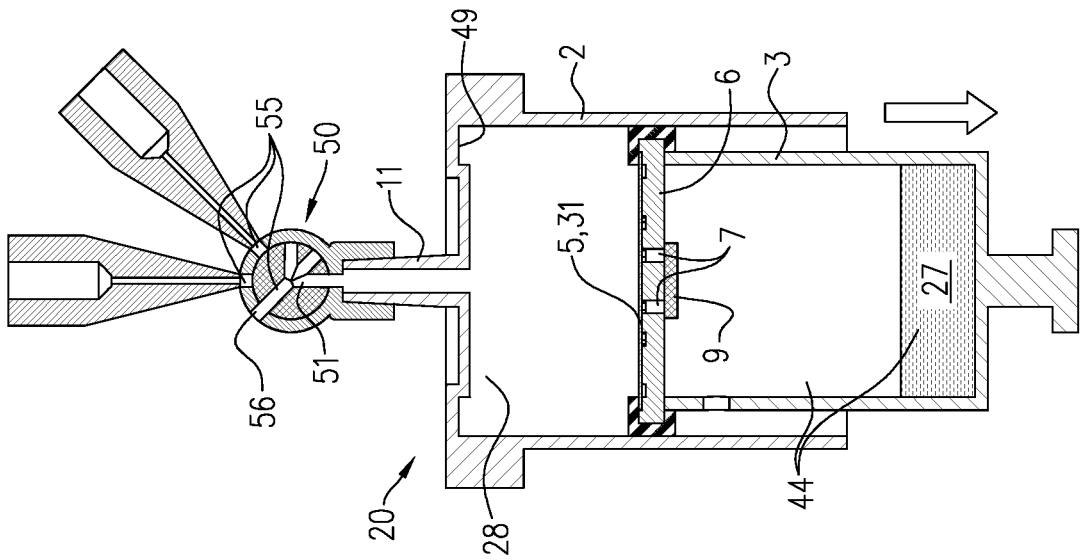
Figure 3E:
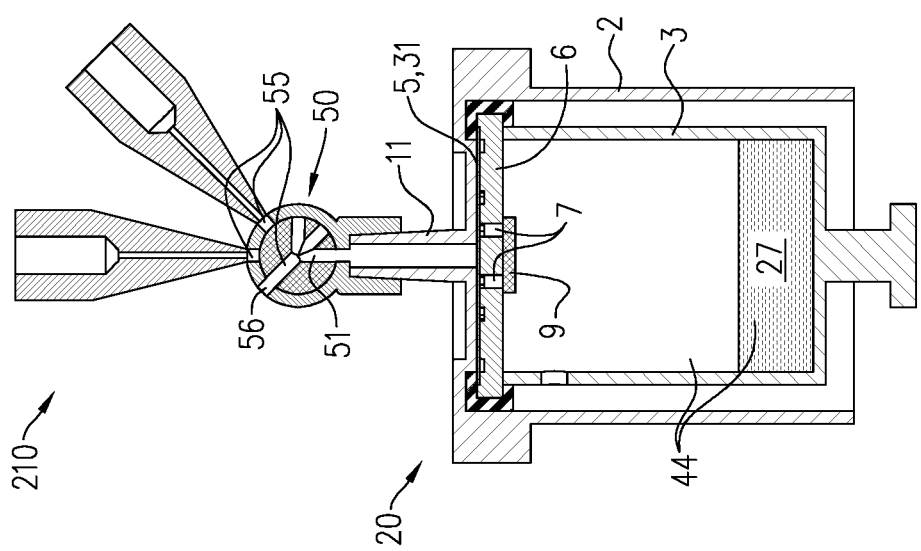

For some applications, as shown in FIGS. 3E-F, cavity 28 is created within fluid container 2 between the distal end of plunger 3 and distal end 49 of fluid container 2, by partially proximally withdrawing plunger 3 within fluid container 2 while the one or more vacuum-prevention openings 11 are open. This process draws air into filter container 2 from outside filtration assembly 20 through the one or more vacuum-prevention openings 11 and thus creates cavity 28 between the distal end of plunger 3 and distal end 49 of fluid container 2 without applying a vacuum force to filter 5. The open state of the one or more vacuum-prevention openings 11 prevents the formation of a vacuum and allows air to be drawn into cavity 28 created within fluid container 2.

FIG. 3E shows rotary valve 50 rotated to a rotary position such that the one or more passages 51 of rotary valve 50 create a path between the one or more vacuum-prevention openings 11 and the one or more air-exposed ports 56 of the three or more ports 55 in rotary valve 50.

As shown in FIG. 3F, plunger 3 is then partially proximally withdrawn within fluid container 2 while the one or more vacuum-prevention openings 11 are open. This process draws air from outside filtration assembly 20 through the one or more passages 51 in rotary valve 50 and into fluid container 2 and thus creates cavity 28 between the distal end of plunger 3 and distal end 49 of fluid container 2 without applying a vacuum force to filter 5.

Figure 3H:
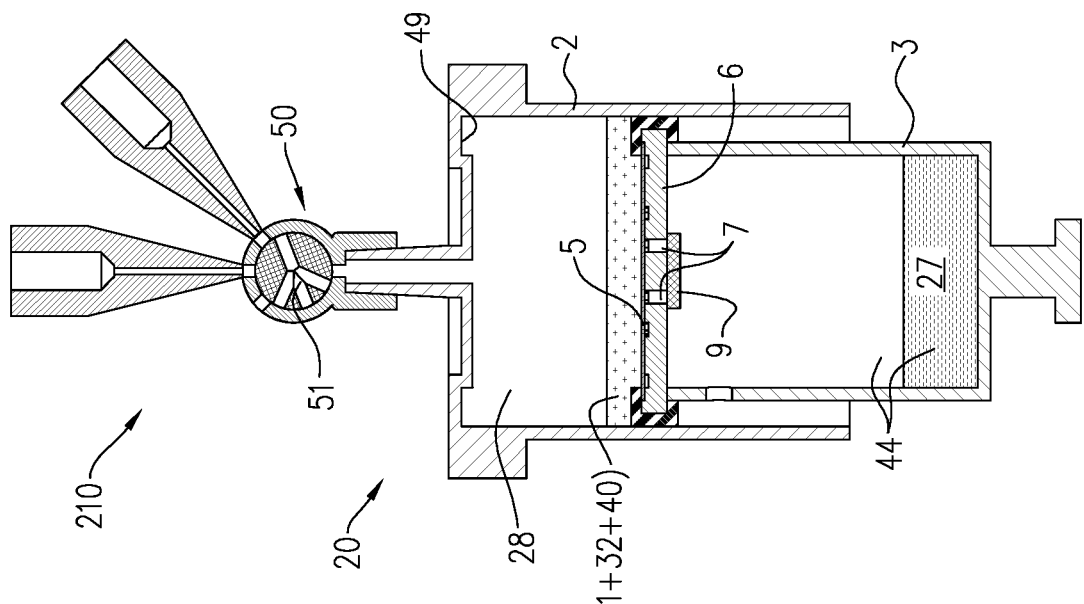
Figure 3G:
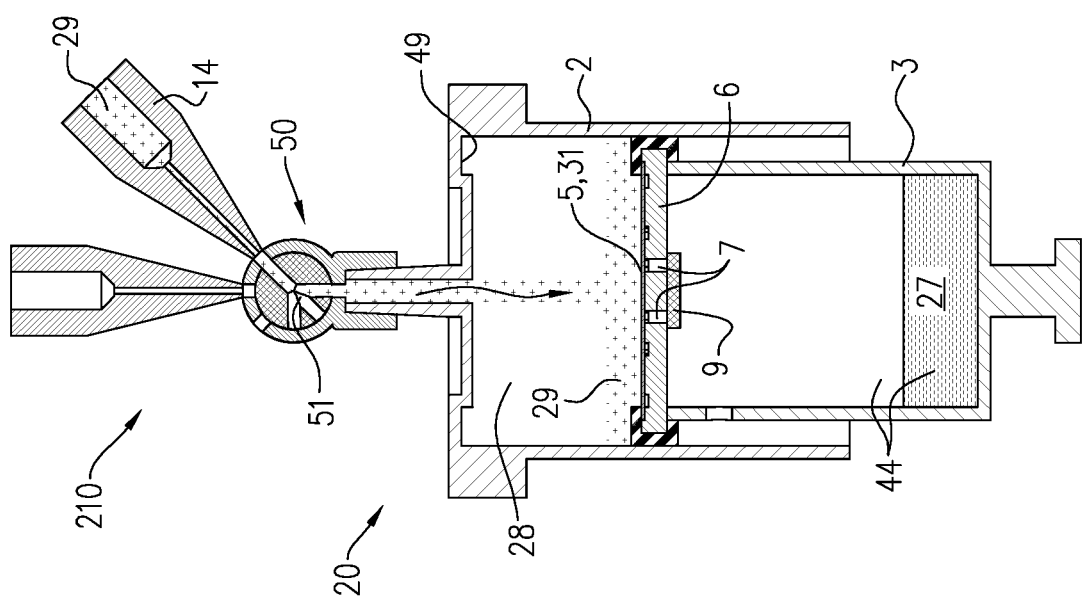

As shown in FIG. 3G, one or more extraction reagents 29 are introduced into cavity 28. FIG. 3G shows rotary valve 50 rotated to a rotary position such that the one or more passages 51 of rotary valve 50 create a path between the one or more vacuum-prevention openings 11 and the one or more reagent dispensers 14. The one or more extraction reagents 29 are dispensed by the one or more reagent dispensers 14 sequentially or simultaneously through one or more passages 51 in rotary valve 50 into cavity 28, while the one or more valves 9 that regulate the passage of fluid through filter 5 (e.g., by regulating the passage of fluid through holes 7 in filter support 6) are in a closed position. Alternatively, introduction of one or more extraction reagents 29 into cavity 28 can occur simultaneously with recreating cavity 28, with or without drawing air into cavity 28 from outside filtration assembly 20 through the one or more air-exposed ports 56 as illustrated in FIG. 3F) of the three or more ports 55 as illustrated in FIG. 3F) in rotary valve 50 (configuration not shown).

As shown in FIG. 3H, filter 5 is bathed in the one or more extraction reagents 29. FIG. 3H shows the one or more extraction reagents 29 bathing filter 5 containing captured particles larger than the pore size of filter 5 that may include particulate 31 within cavity 28 (optionally, but not necessarily, for an amount of time of 1-30 minutes), while the one or more valves 9 that regulate the passage of fluid through filter 5 (e.g., by regulating the passage of fluid through holes 7 in filter support 6) are in a closed position. This process prepares extraction liquid 30 that comprises one or more of the following components: the one or more extraction reagents 29, captured particles larger than the pore size of filter 5 that may include particulate 31, extracted and exposed biological targets 40, and possibly some components or pieces of filter 32 that are mixed or dissolved within extraction liquid 30.

For some applications, a physical extraction method optionally applied to filter 5 while the one or more extraction reagents 29 bathe filter 5 (such as described hereinbelow with reference to FIGS. 4A-E).

Figure 3I:
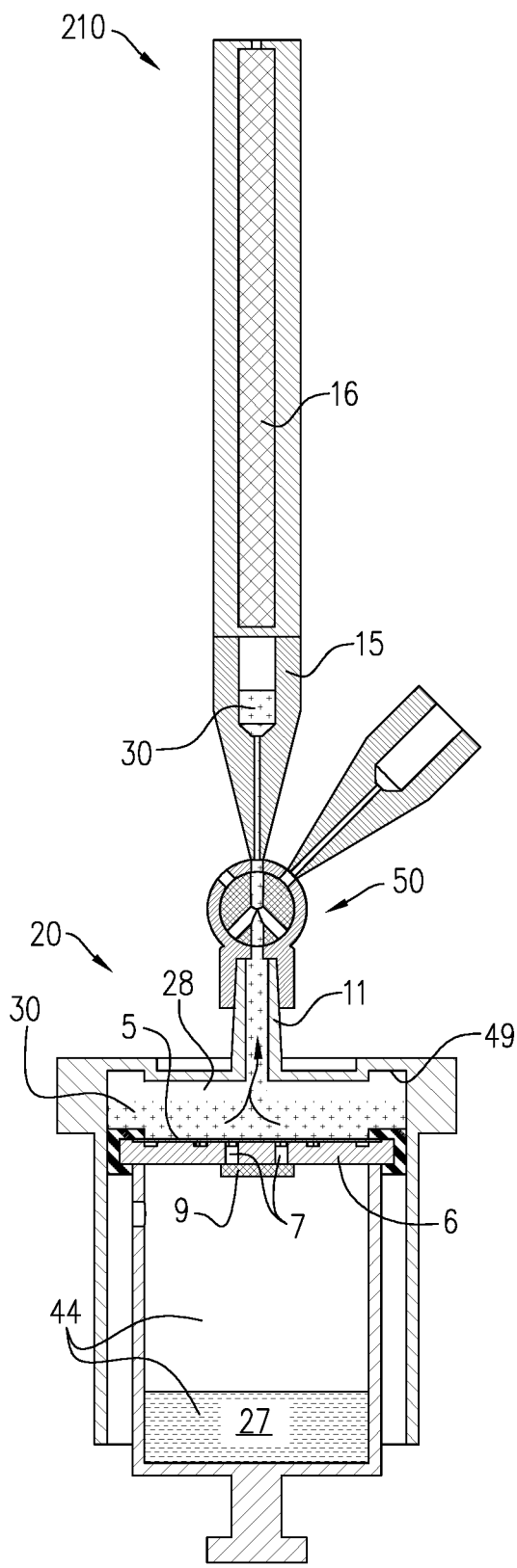

As show in FIG. 3I, extraction liquid 30 is tested for the presence of particulate 31. FIG. 3I shows rotary valve 50 rotated to a rotary position such that the one or more passages 51 of rotary valve 50 create a path between the one or more vacuum-prevention openings 11 and detection test holder 15. Extraction liquid 30 moves from cavity 28 into detection test holder 15 through the one or more passages 51 in rotary valve 50. Detection test 16 begins upon contact with extraction liquid 30 within detection test holder 15. For example, for applications in which detection test 16 comprises a lateral-flow immunoassay, the capillary action of the lateral-flow immunoassay begins upon contact with extraction liquid 30. Detection test holder 15 will be formatted such that it retains fluid during the duration of the testing by detection test 16, for example by rotary valve 50 rotating to a closed position.

Figure 3J:
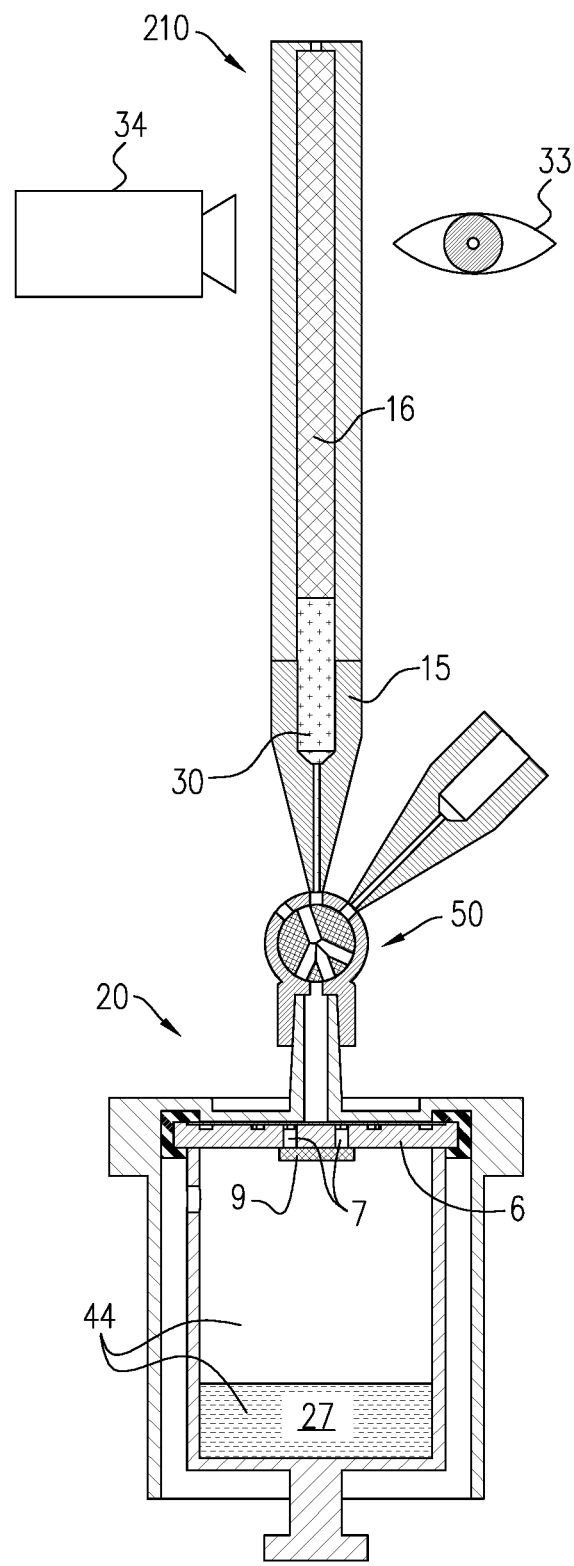

As shown in FIG. 3J, the results of detection test 16 are read to aid in infectious disease diagnosis. FIG. 3J shows the results of detection test 16 are read by human eye 33 or by optical reading system 34, such as described hereinabove with reference to FIG. 1R, mutatis mutandis.

Reference is now made to FIGS. 4A-E, which are schematic illustrations of several configurations in which a physical extraction method is applied to filter 5 while the one or more extraction reagents 29 bathe filter 5 containing captured particles larger than the pore size of filter 5 that may include particulate 31 within cavity 28 (e.g., for an amount of time selected of 1-30 minutes), while the one or more valves 9 that regulate the passage of fluid through filter 5 (e.g., by regulating the passage of fluid through holes 7 in filter support 6) are in a closed position, in accordance with respective applications of the present invention.

FIG. 4A shows a configuration in which the physical extraction method comprises tilting filter 5, for example, by tilting filtration assembly 20.

FIG. 4B shows a configuration in which the physical extraction method comprises vibrating filter 5, for example, by vibrating filtration assembly 20.

FIG. 4C shows a configuration in which the physical extraction method comprises macerating filter 5 using one or more elongate members 60 that are inserted into the one or more vacuum-prevention openings 11. The one or more elongate members 60 macerate filter 5 by rotational, vertical, and/or horizontal motion. The one or more tips 61 of the one or more elongate members 60 that come into contact with filter 5 may have a flexible or retractable element to enable contact with majority of filter 5 surface during maceration.

Figure 4E:
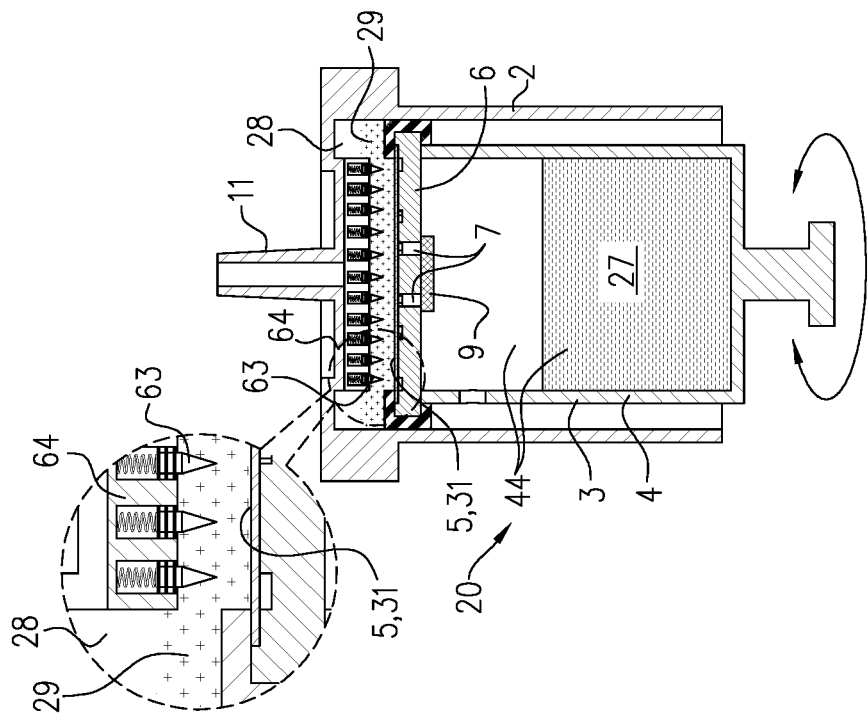
Figure 4D:
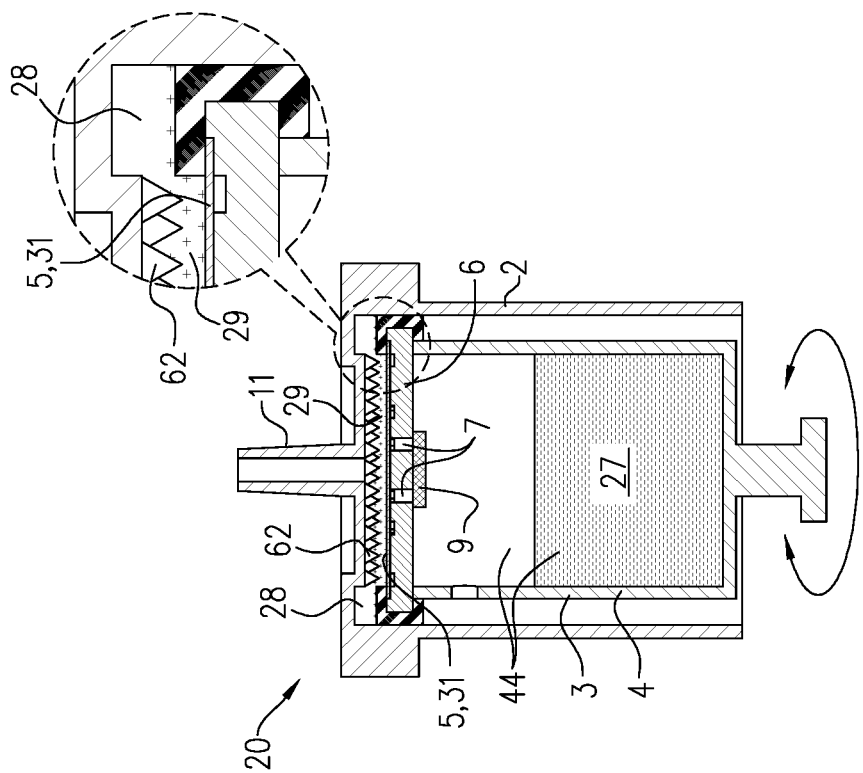

FIG. 4D shows a configuration in which the physical extraction method comprises macerating filter 5 using spikes 62. For example, spikes 62 may be disposed on distal end 49 of fluid container 2 and filter 5 may be disposed on the distal end of plunger 3. Alternatively, spikes 62 may be disposed on the distal end of plunger 3 and filter 5 may be disposed on distal end 49 of fluid container 2. Spikes 62 may come into direct contact with filter 5, for example, when plunger 3 distally advances within fluid container 2. Filter 5 is macerated when spikes 62 move in relation to filter 5, for example by rotating plunger shaft 4, while spikes 62 are in contact with filter 5.

FIG. 4E shows a configuration in which the physical extraction method comprises macerating filter 5 using retractable spikes 63. Retractable spikes 63 are positioned in a way that retractable spikes 63 are located within a casing 64. For example, retractable spikes 63 may be retractably disposed on distal end 49 of fluid container 2 and filter 5 may be disposed on the distal end of plunger 3. Alternatively, retractable spikes 63 may be retractably disposed on the distal end of plunger 3 and filter 5 may be disposed on distal end 49 of fluid container 2. Retractable spikes 63 are revealed from their casing 64 to come into direct contact with filter 5, for example, when plunger 3 distally advances within fluid container 2. Filter 5 is macerated when retractable spikes 63 move in relation to filter 5, for example by rotating plunger shaft 4, while retractable spikes 63 are in contact with filter 5.

Another configuration is provided in which the physical extraction method comprises scratching the surface of filter 5 without macerating filter 5, e.g., using the spikes described hereinabove modified to avoid macerating filter 5.

Figure 5A:
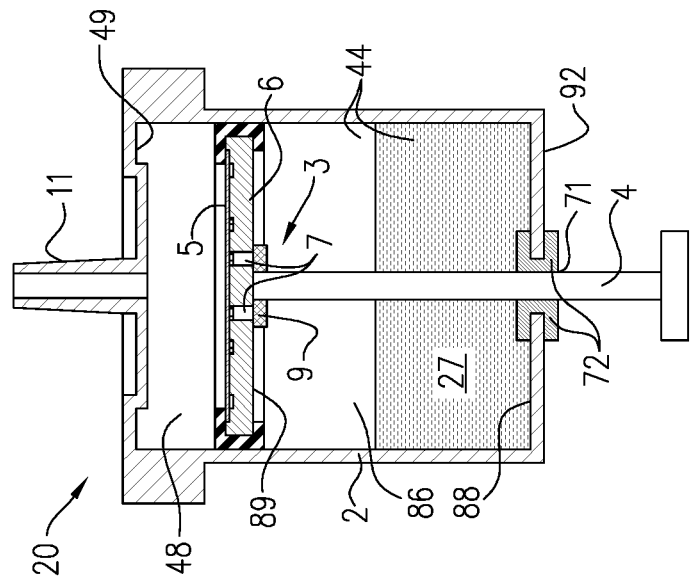
FIGS. 5A-B are schematic illustrations of two configurations, respectively, of a filtrate receptacle, in accordance with respective applications of the present invention.
Figure 5B:
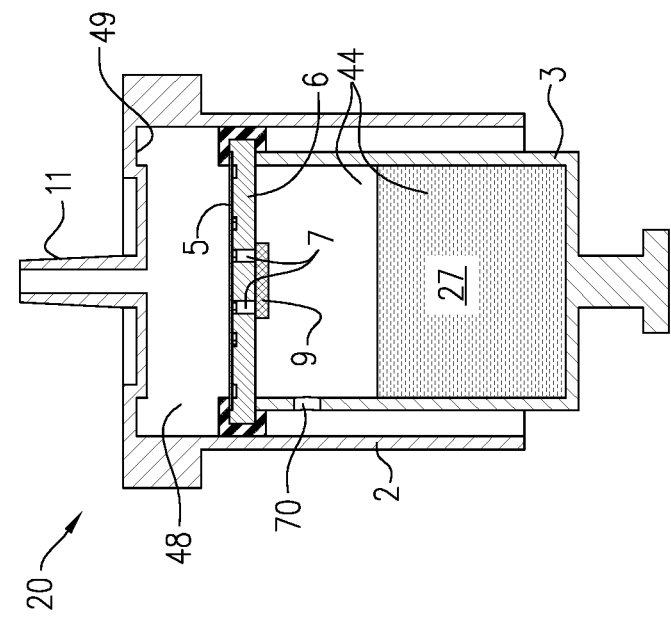

Reference is made to FIGS. 5A-B, which are schematic illustrations of two configurations, respectively, of filtrate receptacle 44 that receives filtrate 27, in accordance with respective applications of the present invention. These configurations may be implemented in combination with any of the configurations of the filtration assemblies described herein.

FIG. 5A shows a configuration in which filtrate receptacle 44 is formatted as a receptacle within plunger 3 that is movably disposed within fluid container 2. In this configuration, filtrate receptacle 44 is shaped so as to define one or more venting openings 70 to allow release of displaced air as filtrate 27 enters filtrate receptacle 44.

FIG. 5B shows a configuration in which filtrate receptacle 44 is defined by a proximal space 86 defined between a proximal end 88 of fluid container 2 and a proximal surface 89 of a plunger head of plunger 3, proximal space 86 created as plunger 3 (e.g., plunger shaft 4) is distally advanced within fluid container 2. (The plunger head may optionally be defined by filter support 6.) In this configuration, plunger shaft 4 protrudes out of filter container 2 through a proximal opening 71 through a wall of fluid container 2, e.g., through a proximal end wall 92 of fluid container 2. Opening 71 through plunger shaft 4 protrudes has a seal 72 around plunger shaft 4 to prevent leakage while allowing for plunger shaft 4 movement.

Reference is now made to FIGS. 6A-B, which are schematic illustrations of one configuration of the one or more valves 9 that regulate the passage of fluid through filter 5 (e.g., by regulating the passage of fluid through holes 7 in filter support 6), in accordance with an application of the present invention. The one or more valves 9 of any of the configurations described herein may optionally implement this configuration.

In the configuration illustrated in FIGS. 6A-B, the one or more valves 9 comprise one or more pressure-activated valves 80. For example, as shown in FIG. 6A, when pressure does not exceed standing pressure of fluid and air disposed above filter 5, the one or more pressure-activated valves 80 remain closed and fluid is unable to pass through filter 5 (e.g., by regulating the passage of fluid through holes 7 in filter support 6 below filter 5 in either direction. As shown in FIG. 6B, when pressure increases, for example when plunger 3 advances within fluid container 2 while the one or more vacuum-prevention openings 11 are closed, such as by plug 13, the one or more pressure-activated valves 80 are forced to transition to an open position in which they allow unidirectional flow of fluid through filter 5 (e.g., by regulating the passage of fluid through holes 7 in filter support 6 below filter 5).

Reference is now made to FIGS. 6C-D, which are schematic illustrations of another configuration of the one or more valves 9 that regulate the passage of fluid through filter 5 (e.g., by regulating the passage of fluid through holes 7 in filter support 6), in accordance with an application of the present invention. The one or more valves 9 of any of the configurations described herein may optionally implement this configuration.

In the configuration illustrated in FIGS. 6C-D, the one or more valves 9 comprise one or more non-pressure-activated valves 81. For example, as shown in FIG. 6C, filter support 6 may comprise two parallel disks 83, 84 that are shaped to define sets of respective holes 82 that together define the one or more non-pressure-activated valves 81. As shown in FIG. 6C, the one or more non-pressure-activated valves 81 are closed when the sets of holes 82 defined by the two parallel disks 83, 84 are not aligned with one another. For example, the two sets of holes 82 defined by the two parallel disks 83, 84 may be non-aligned with one another by turning plunger shaft 4. As shown in FIG. 6D, the one or more non-pressure-activated valves 81 are open when the two sets of holes 82 defined by the two parallel disks 83, 84 are aligned with one another. For example, the two sets of holes 82 defined by the two parallel disks 83, 84 may be aligned with one another by turning plunger shaft 4.

Reference is now made to FIGS. 7A-F, which show several configurations of extraction liquid 30 contacting detection test 16, in accordance with respective applications of the present invention.

Figure 7A:
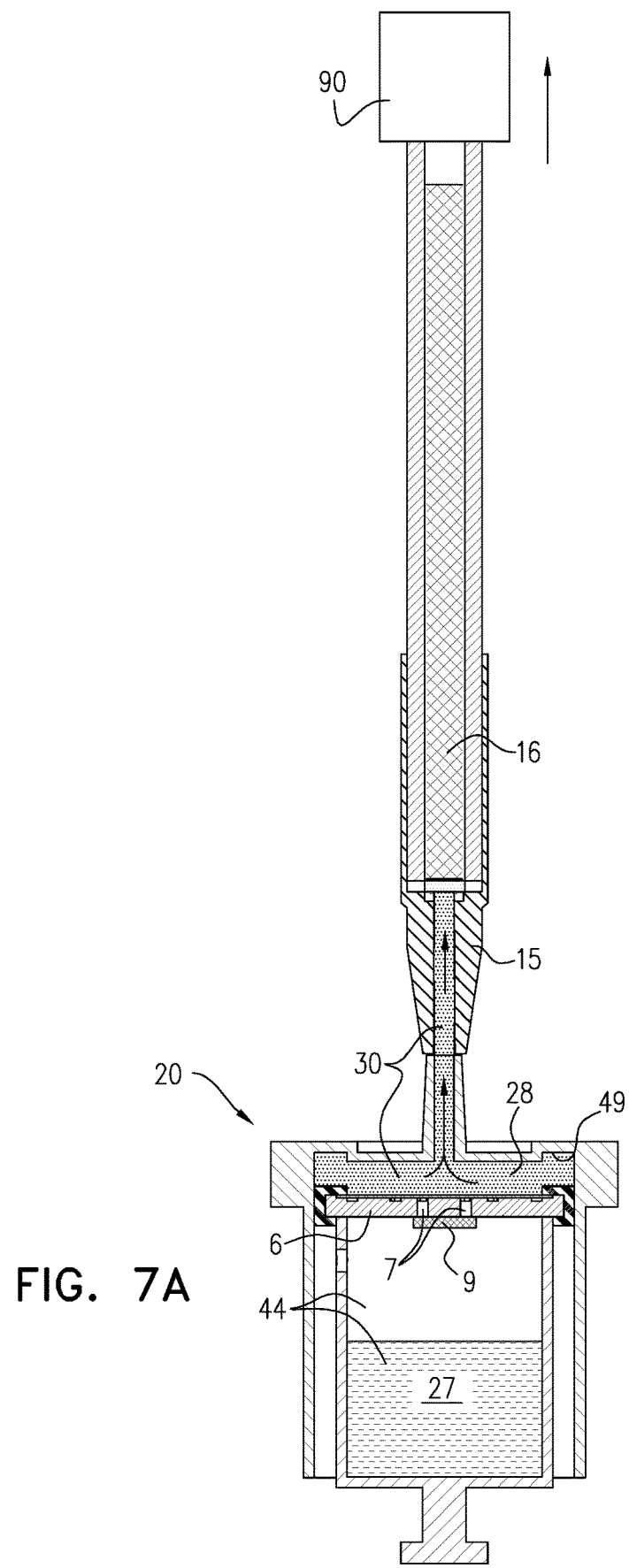

As shown in FIG. 7A, in some applications, extraction liquid 30 moves from cavity 28 into detection test holder 15 to come into contact with detection test 16 by a sucking force. For example, a syringe 90 above detection test holder 15 may apply the sucking force.

Figure 7B:
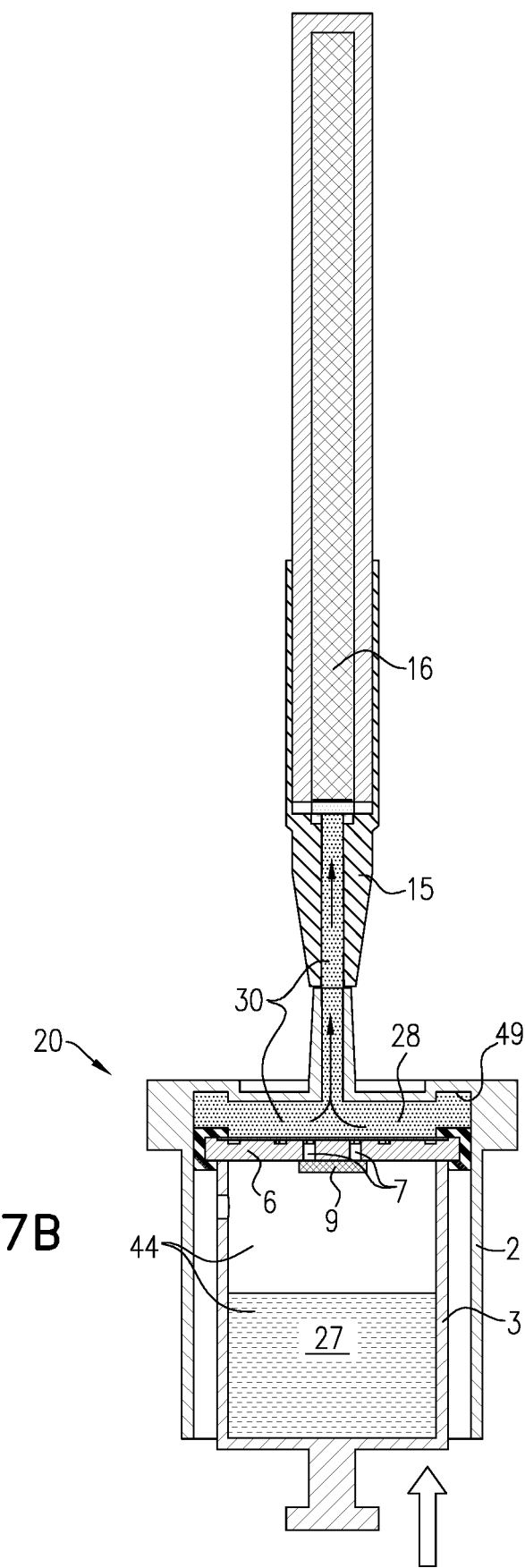

As shown in FIG. 7B, in some applications, extraction liquid 30 moves from cavity 28 into detection test holder 15 to come into contact with detection test 16 by a pushing force. For example, plunger 3 may be distally advanced in fluid container 2 to provide the pushing force.

Figure 7C:
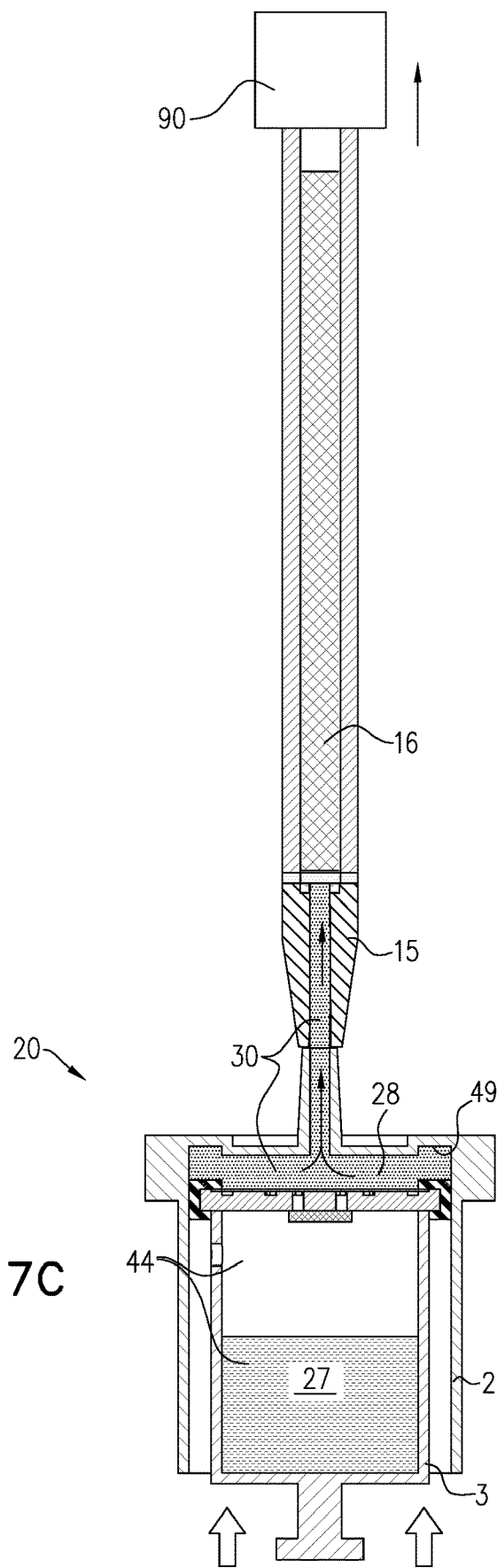

As shown in FIG. 7C, in some applications, extraction liquid 30 moves from cavity 28 into detection test holder 15 to come into contact with detection test 16 by a combination of sucking and a pushing force. For example, a syringe 90 above detection test holder 15 may apply the sucking force while plunger 3 is distally advanced in fluid container 2 to provide the pushing force.

Figure 7D:
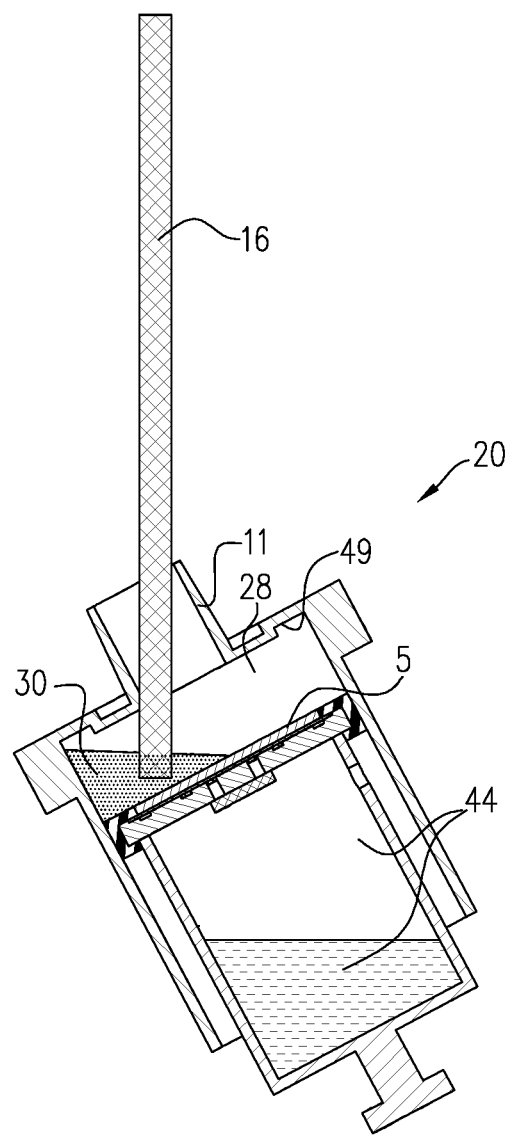

As shown in FIG. 7D, in some applications, detection test 16 is directly inserted through the one or more vacuum-prevention openings 11 into cavity 28 above filter 5 to come into contact with extraction liquid 30, without requiring extraction liquid 30 to move into detection test holder 15. For example, filtration assembly 20 may be tilted slightly so that extraction liquid 30 pools at the base of detection test 16.

As shown in FIGS. 7E-F, in some applications, extraction liquid 30 moves from cavity 28 into detection test holder 15, and detection test holder 15 transports at least a portion of extraction liquid 30 into an external detection test receptacle 130, upon which an external detection test is performed. For example, the external detection test may be a molecular-based assay detection test selected from the group of molecular-based assays comprising of: polymerase chain reaction (PCR), real-time quantitative PCR (qPCR), reverse transcriptase PCR (RT-PCR), and isothermal amplification. The external detection test may be performed by testing system 10, 110, or 210, or another testing system separate from testing system 10, 110, and 210.

Figure 8C:
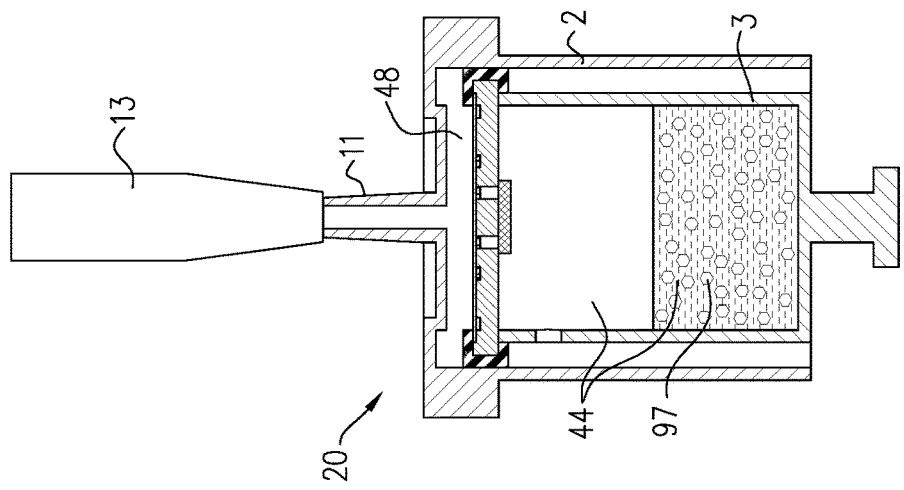
FIGS. 8A-C are schematic illustrations of a configuration in which a filtrate receptacle contains a liquid-absorbing substance or gel, in accordance with an application of the present invention.
Figure 8B:
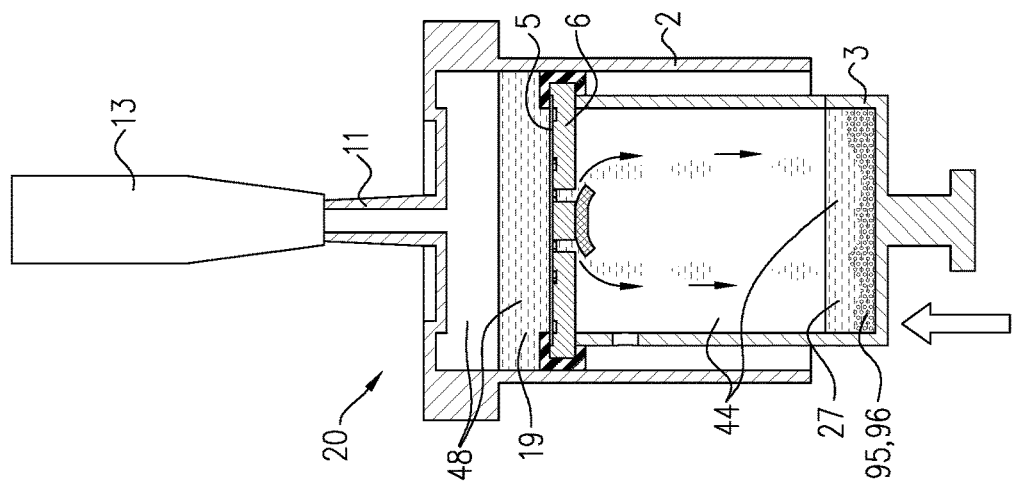
Figure 8A:
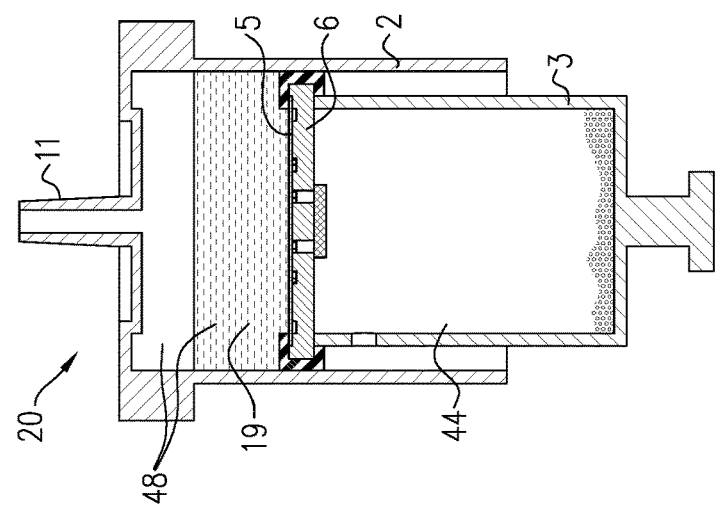

Reference is made to FIGS. 8A-C, which are schematic illustrations of a configuration in which filtrate receptacle 44 contains a liquid-absorbing substance or gel 95, for example sodium polyacrylate, in accordance with an application of the present invention. When fluid sample 19 passes through filter 5 into filtrate receptacle 44, the liquid-absorbing substance or gel 95 mixes with filtrate 27 to transform filtrate 27 from a fluid state into a gel state 96 to prevent leakage. Alternatively, or additionally, filtrate receptacle 44 contains an antimicrobial agent, for example bleach. When fluid sample 19 passes through filter 5 into filtrate receptacle 44, the liquid-absorbing substance or gel 95 mixes with filtrate 27 to eliminate possible contaminants.

Reference is now made to FIGS. 9A-G, which are schematic illustrations of a filtration assembly 500 and method of use thereof, in accordance with respective applications of the present invention. Filtration assembly 500 may implement any of the features of filtration assembly 20 described hereinabove, mutatis mutandis. Filtration assembly 500 is typically removably used in one or more of testing systems 10, 110, or 210 described hereinabove, mutatis mutandis.

A plunger 610 is configured to be inserted into a proximal opening 646 of fluid container 502 so as to define a fluid-container space 648 between a distal end of plunger 610 and a distal end 549 of fluid container 502 when plunger 610 is not fully distally advanced within fluid container 502 (such as shown in FIG. 9A). Typically, the initial position of plunger 610 is as shown in FIG. 9A.

In this configuration, filter 5 is positioned at distal end 549 of a fluid container 502 of filtration assembly 500. Fluid sample 19 is introduced into fluid container 502 from one or more openings 622 in fluid container 502 proximal to filter 5, optionally while plunger 610 is proximally located within fluid container 502, disposed proximally to the one or more openings 622. A head of plunger 610 is shaped so as define a vacuum-prevention opening 606, which is sealingly closable by a plugging end 604 defined by plunger shaft 602 when plunger shaft 602 is positioned such that plugging end 604 is inserted (typically fully) in vacuum-prevention opening 606. In this configuration, fluid container is shaped so as to define a filter support 612 that is positioned distal to filter 5 at distal end 549 of fluid container 502. Fluid support 612 is shaped so as to define one or more sealable openings 614 in fluid communication with filter 5.

As shown in FIG. 9A, fluid sample 19 is introduced into fluid-container space 648 of fluid container 502, while plunger 610 is proximally located within fluid container 502.

As shown in the transition between FIGS. 9B and 9C, plunger 610 is distally advanced within fluid container 502 while plugging end 604 of plunger shaft 602 is inserted (typically fully) in vacuum-prevention opening 606 so as to close and seal vacuum-prevention opening 606, thereby forcing fluid sample 19 through filter 5, thereby filtering fluid sample 19 to capture, on or within filter 5, particles larger than the pore size of filter 5, which include particulate 31 that may be present in fluid sample 19, while allowing filtrate 27 to pass into a filtrate receptacle 510 that is distal to fluid container 502. Optionally, before performance of this step of the method, fluid sample 19 is incubated and/or combined with growth media 24, such as described hereinbelow with reference to FIGS. 2A-E.

As shown in FIG. 9D, plunger shaft 602 is proximally withdrawn to open vacuum-prevention opening 606 by separating plugging end 604 of plunger shaft 602 from vacuum-prevention opening 606.

As shown in the transition between FIGS. 9D and 9E, while vacuum-prevention opening 606 is open, plunger 610 is partially proximally withdrawn to create a cavity 628 in fluid container 502 between a distal end of plunger 610 and distal end 549 of fluid container 502. Cavity 628 may or may not have the same volume of fluid-container space 648, described hereinabove with reference to FIG. 9A, e.g., cavity 628 may have a smaller volume than fluid-container space 648.

Figure 9F:
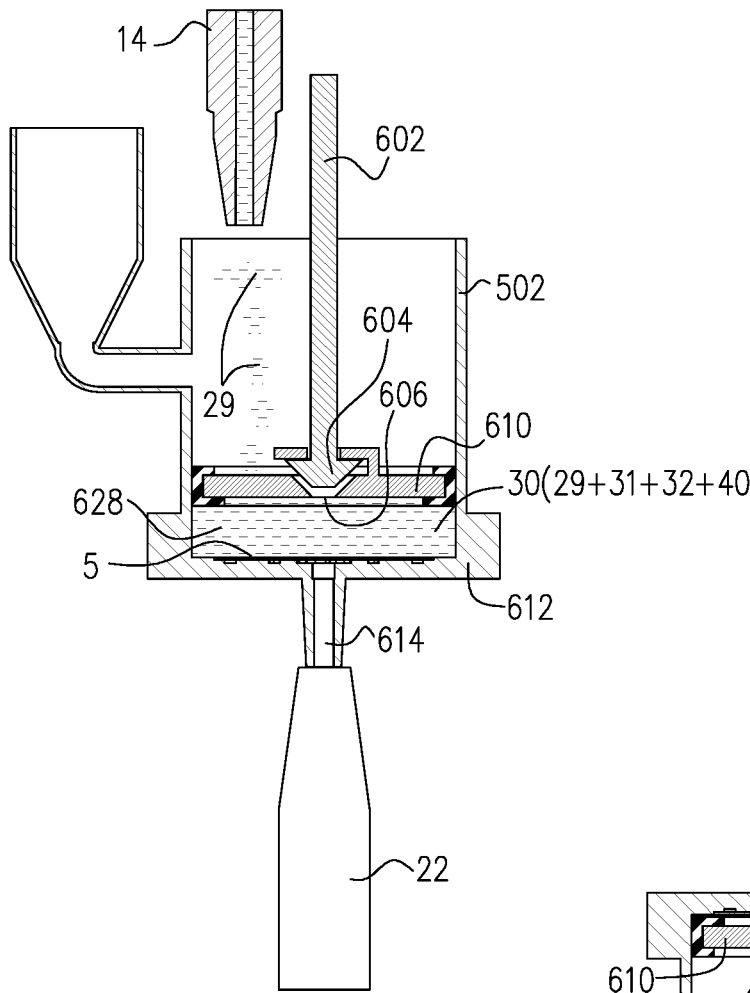

As shown in FIG. 9F, one or more extraction reagents 29 are introduced into cavity 628. The one or more extraction reagents 29 bathe filter 5 that may include particulate 31 (for example, for an amount of time of 1-30 minutes), while the one or more sealable openings 614 defined by filter support 612 are sealed by plug 22. One or more extraction reagents 29 are dispensed by the one or more reagent dispensers 14 and introduced into cavity 628 via vacuum-prevention opening 606 in plunger 610 while plugging end 604 of plunger shaft 602 is separated from vacuum-prevention opening 606. This process prepares extraction liquid 30 that comprises one or more of the following components: the one or more extraction reagents 29, captured particles larger than the pore size of filter 5 that may include particulate 31, extracted and exposed biological targets 40, and possibly some components or pieces of filter 32 that are mixed or dissolved within extraction liquid 30.

Figure 9G:
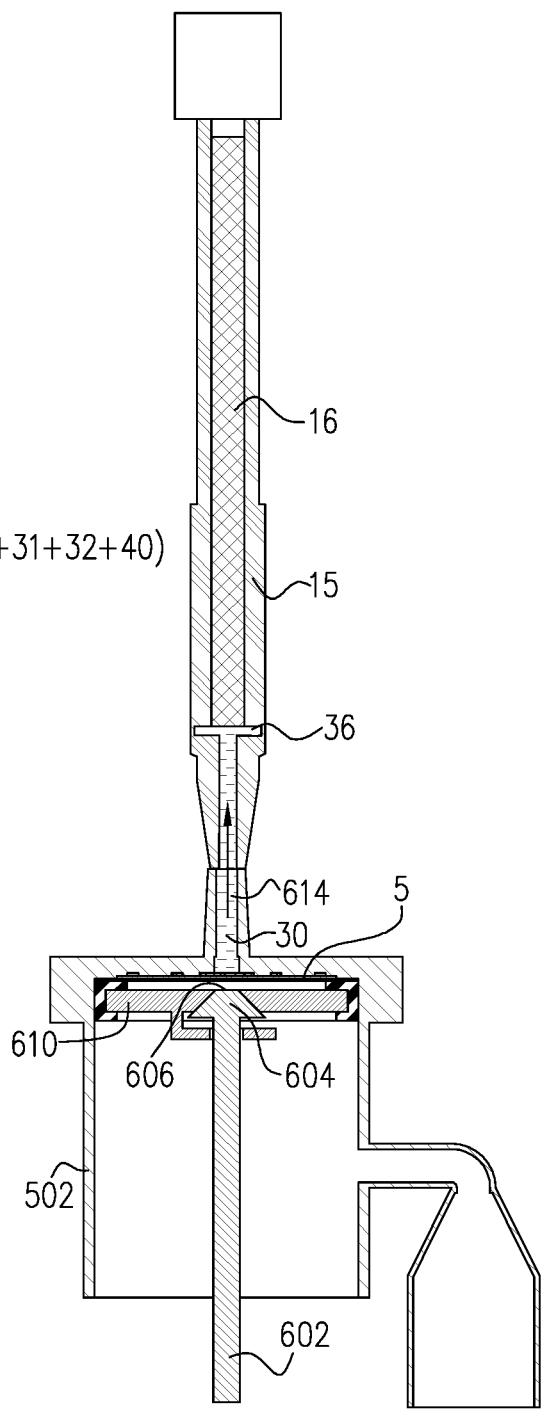

As shown in FIG. 9G, extraction liquid 30 is tested for the presence of particulate 31. Plugging end 604 of plunger shaft 602 seals vacuum-prevention opening 606 on plunger 610. The one or more sealable openings 614 within filter support 612 are aligned with detection test holder 15, and extraction liquid 30 moves from cavity 628 into detection test holder 15. Detection test 16 begins upon contact with extraction liquid 30 within detection test holder 15. For example, for applications in which detection test 16 is a lateral-flow immunoassay, the capillary action of the lateral-flow immunoassay begins upon contact with extraction liquid 30.

Alternatively, for some applications, filtration assembly 500 does not include vacuum-prevention opening 606 in plunger 610. During the performance of the step of the testing method described hereinabove with reference to FIGS. 9D-E, the one or more sealable openings 614 are open and thus serve as one or more vacuum-prevention openings.

Figure 10B:
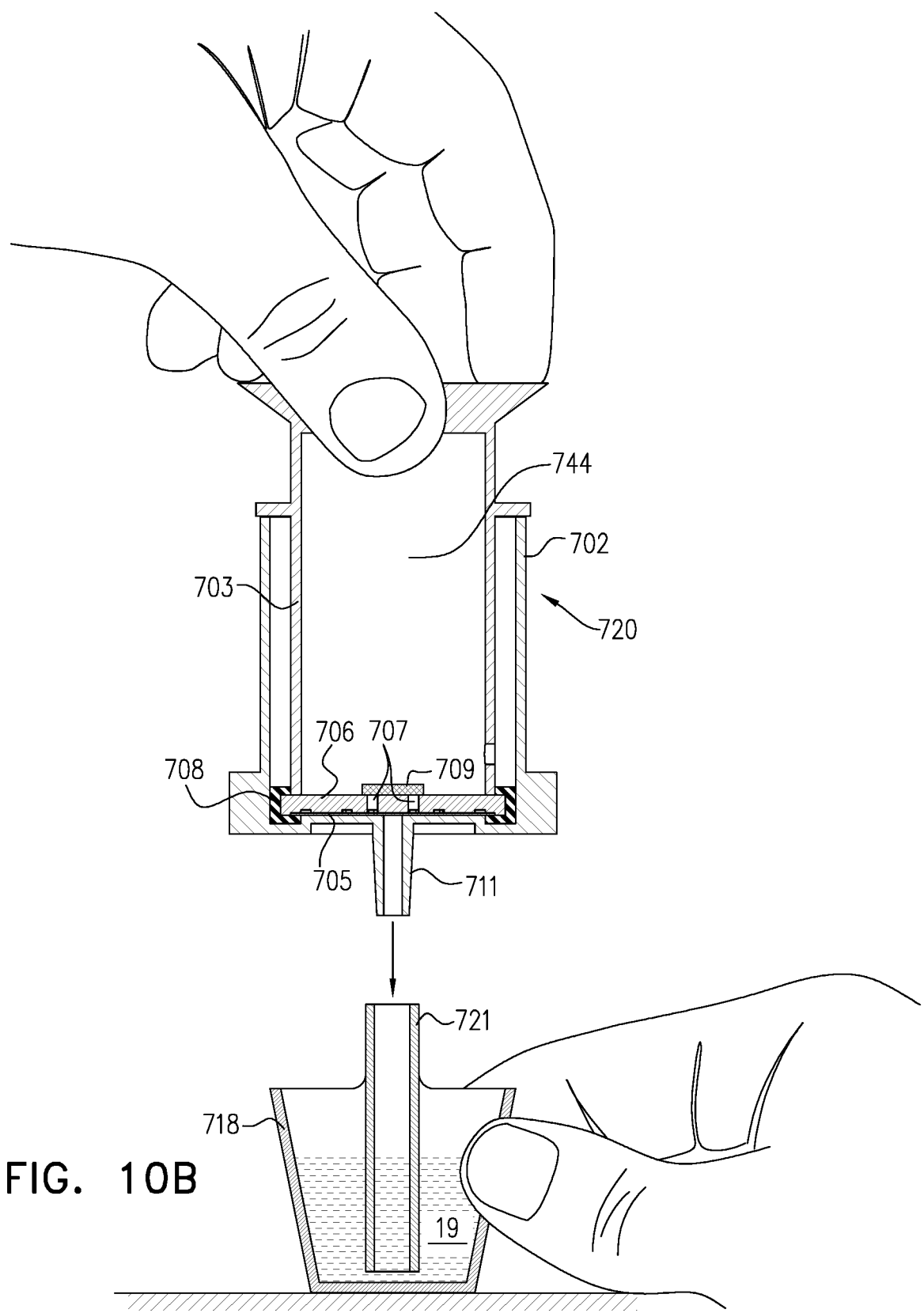
FIGS. 10B-P are schematic illustrations of a method for testing the fluid sample for the presence of a particulate using the testing kit of FIG. 10A, in accordance with an application of the present invention.

Reference is now made to FIG. 10A, which is a schematic illustration of a testing kit 700 for manually testing fluid sample 19, in accordance with an application of the present invention. Other than as described hereinbelow, testing kit 700 comprises element generally similar to those of testing system 10 described hereinabove with reference to FIGS. 1A-R, and may implement any of the features thereof, mutatis mutandis. The techniques described hereinabove with reference to FIGS. 2A-E for testing system 110, with reference to FIGS. 3A-J for testing system 210, with reference to FIGS. 4A-E, with reference to FIGS. 5A-B, with reference to FIGS. 6A-B, with reference to FIGS. 6C-D, with reference to FIGS. 7A-F, with reference to FIGS. 8A-C, and with reference to FIGS. 9A-G may also be modified to be performed manually in a similar manner as described with reference to FIGS. 10A and 10B-P, mutatis mutandis.

The elements of testing kit 700 are used to test fluid sample 19 manually, without the use of the movable guiding elements of testing system 10, such as the mechanical tracks, and without the use of the one or more actuators (e.g., motors) of testing system 10.

Figure 10C:
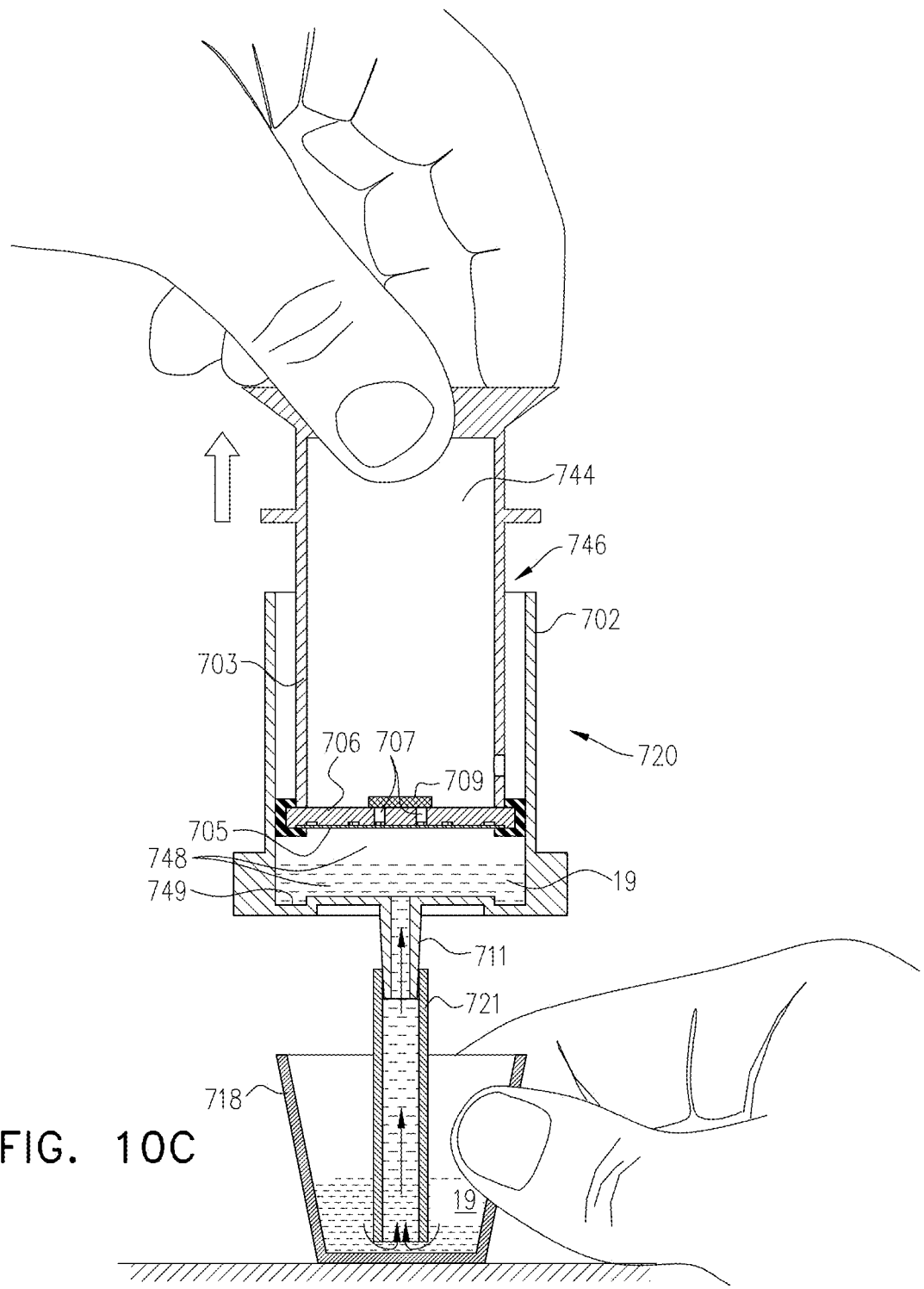
FIG. 10A is a schematic illustration of a testing kit for manually testing a fluid sample, in accordance with an application of the present invention.
Figure 10D:
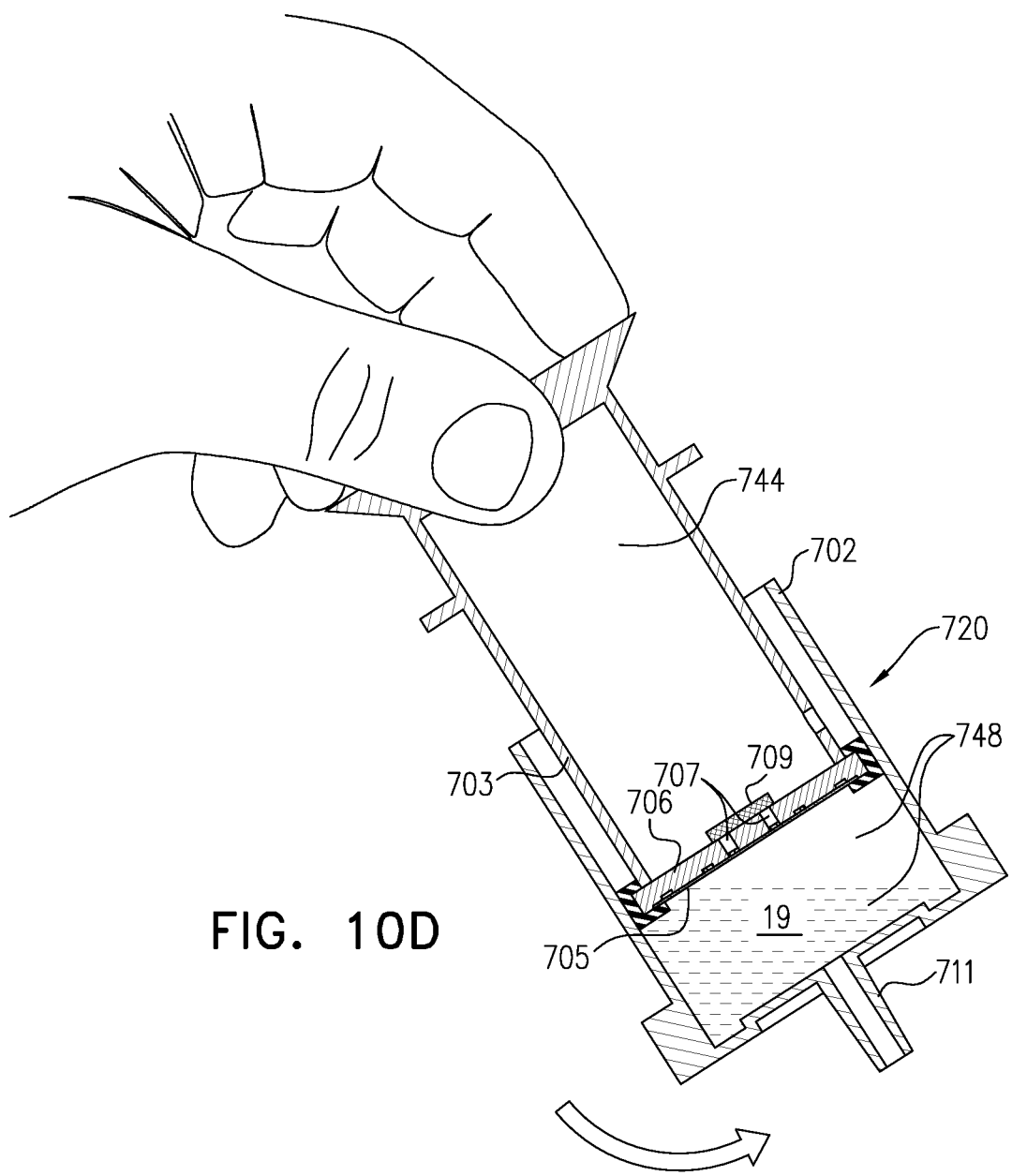
Figure 10L:
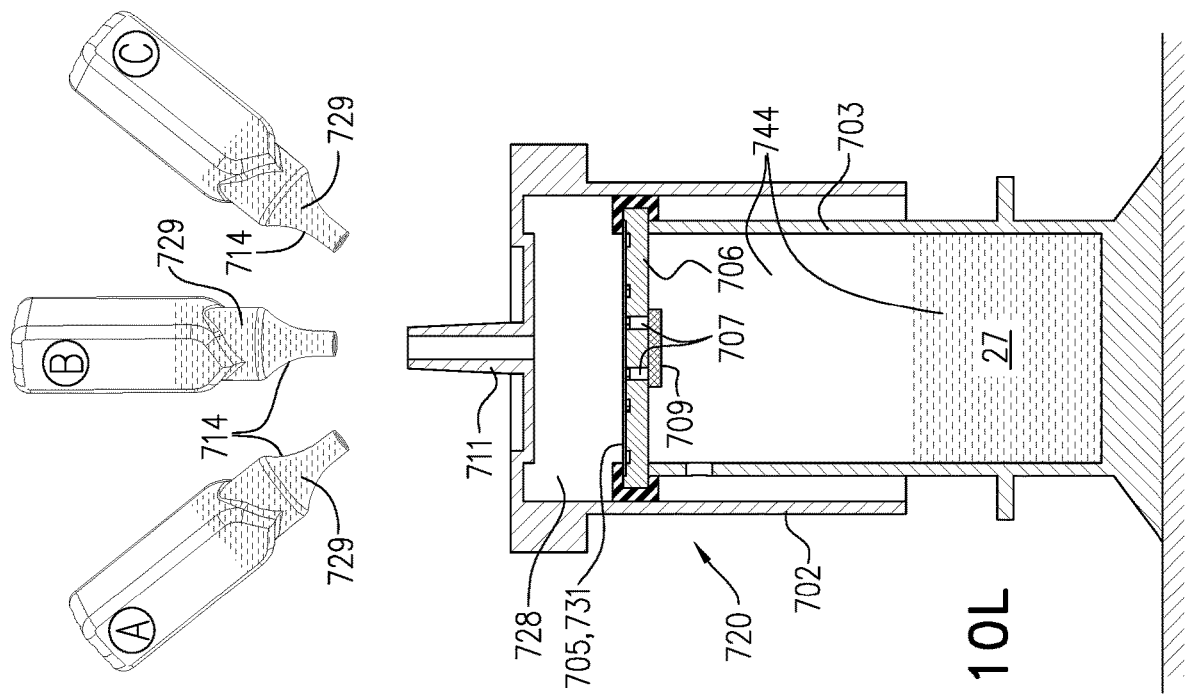
Figure 10K:
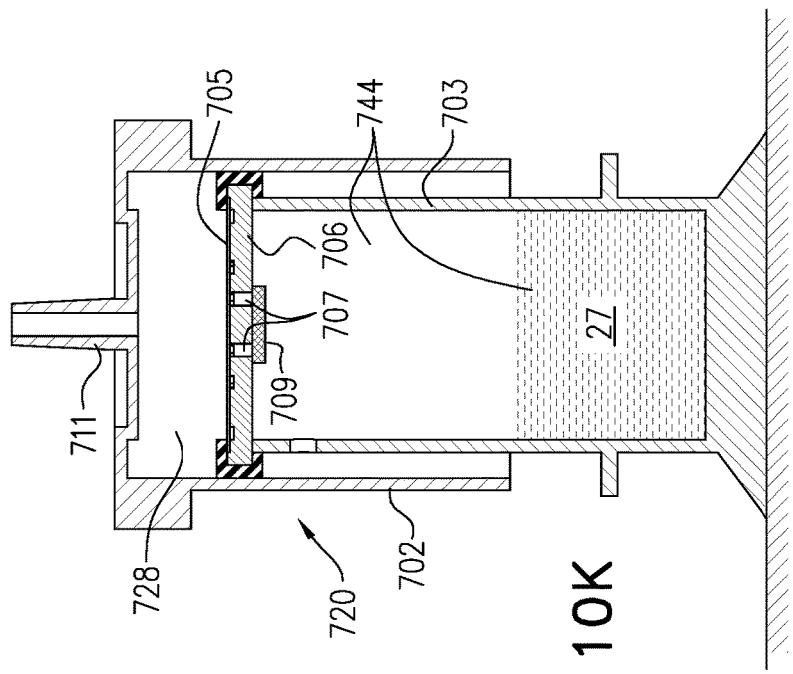
Figure 10N:
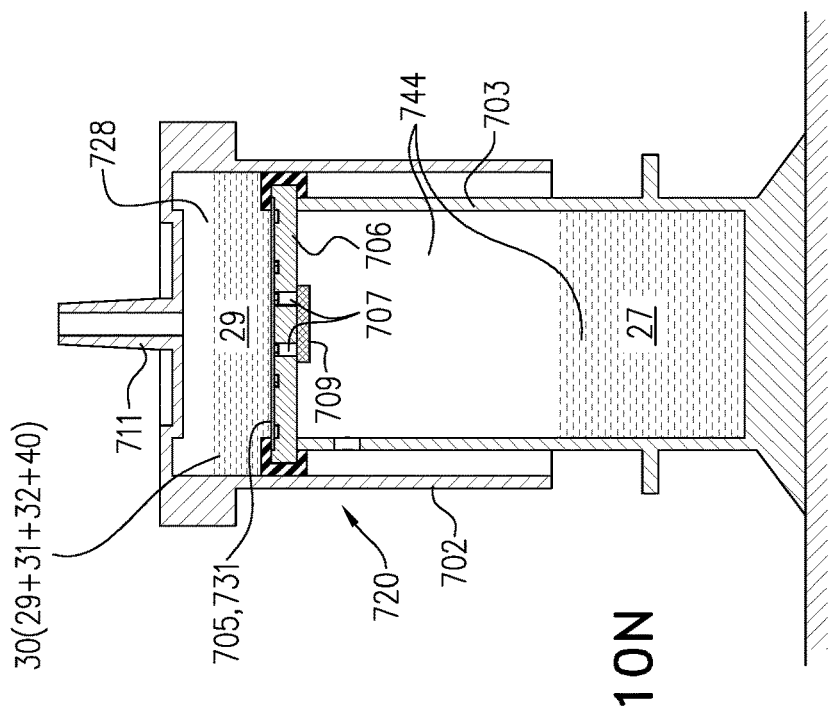
Figure 10M:
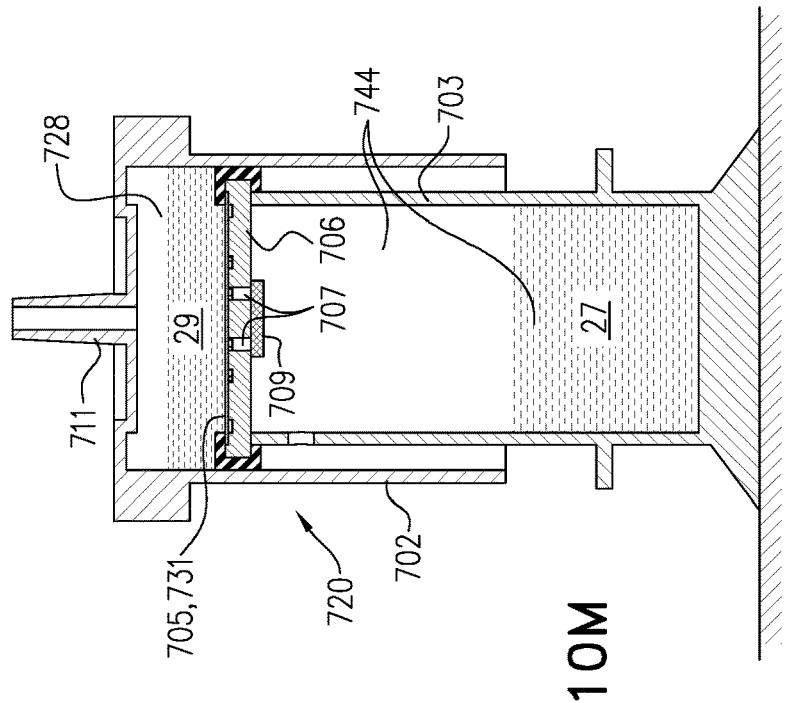
Figure 10P:
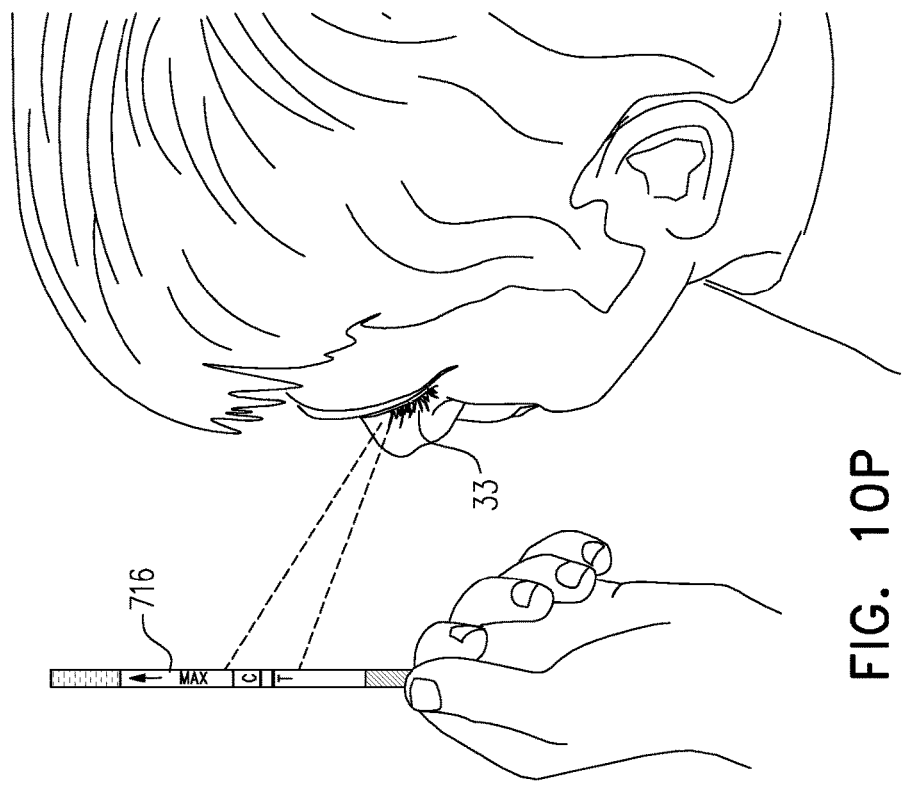

Reference is also made to FIGS. 10B-P, which are schematic illustrations of a method for testing fluid sample 19 taken from a body of a patient for the presence of a particulate using testing kit 700, in accordance with an application of the present invention. The method may include all or only a portion of the illustrated steps, as described below.

Testing kit 700 comprises a filtration assembly 720. Filtration assembly 720 comprises a fluid container 702 and a plunger 703 that is movably disposed within fluid container 702. In this configuration, plunger 703 comprises one or more of the following elements:
- a plunger shaft 704;
- a porous filter 705, which may implement any of the features of filter 705, described hereinabove;
- a filter support 706 that is shaped so as to define holes 707 therethrough to allow passage of fluid;
- a seal 708 that forms a movable seal between filter support 706 and an inner wall of fluid container 702;
- one or more valves 709 that regulate the passage of the fluid through filter 705 (e.g., by regulating the passage of the fluid through holes 707 in filter support 6); and
- a filtrate receptacle 744 that receives filtrate 27 that passed through filter 705.

Plunger 703 is configured to be inserted into a proximal opening 746 of fluid container 702 (labeled in FIG. 10C) so as to define a fluid-container space 748 between a distal end of plunger 703 (and, optionally, filter 705) and a distal end 749 of fluid container 702 when plunger 703 is not fully distally advanced within fluid container 702 (such as shown in FIG. 10C). Filter 705 is sealed to filter support 706 by seal 708 (as shown) or by another seal (configuration not shown).

Filtration assembly 720 is shaped so as to define one or more vacuum-prevention openings 711, which, when open, provide fluid communication between fluid-container space 748 and outside filtration assembly 720. For example, the one or more vacuum-prevention openings 711 may pass through distal end 749 of fluid container 702 (such as shown), or the one or more vacuum-prevention openings 711 may pass through one or more lateral walls of fluid container 702 in fluid-container space 748 (i.e., in an area that is distal to plunger 703 when plunger 703 is movably disposed within fluid container 702) (configuration not shown). The one or more vacuum-prevention openings 711 allow passage of fluid (liquid and air) between fluid-container space 748 of fluid container 702 and the environment outside filtration assembly 720 while plunger 703 is movably disposed within fluid container 702.

In addition to filtration assembly 720, testing kit 710 typically further comprises one or more of the following elements:
- a plug 713;
- one or more reagent dispensers 714;
- a detection test 716, such as a lateral-flow immunoassay or immunochromatographic assay; and
- a fluid sample receptacle 718 configured to contain fluid sample 19 taken from the body of a patient, and, optionally, a cover (not shown).

Optionally, fluid sample receptacle 718 comprises one or more adaptors 721 that are shaped to connect with the one or more vacuum-prevention openings 711. For example, fluid sample receptacle 718 may comprise a tube that defines adaptor 721 at one end, and extends to near the bottom of fluid sample receptacle 718 at the other end, similar to a drinking straw. Optionally, the tube of fluid sample receptacle 718 is coupled to a side of fluid sample receptacle 718. For configurations in which fluid sample receptacle 718 comprises a cover, adaptor 721 may be integrated into the cover, such as described hereinabove regarding cover 42 and adaptor 21 with reference to FIG. 1A.

Alternatively, fluid sample receptacle 718 does not comprise the one or more adaptors 721, e.g., fluid sample receptacle 718 is shaped as a conventional cup, in which case the one or more vacuum-prevention openings 711 are typically longer than shown in the drawings, such that the one or more vacuum-prevention openings 711 reach deeply enough within fluid sample receptacle 718 to draw a sufficient portion of fluid sample 19 from the fluid sample receptacle. In this configuration, the coupling of the one or more vacuum-prevention openings 711 with the one or more adaptors 721 described hereinbelow does not occur, and the one or more vacuum-prevention openings 711 are instead brought directly into fluid communication with fluid sample 19 in fluid sample receptacle 718. These modifications may similarly be made to sample receptacle 18 and the one or more vacuum-prevention openings 11, described hereinabove with reference to FIGS. 1A-C, 2A, and 2D, and/or to growth media receptacle 23 and the one or more vacuum-prevention openings 11, described hereinabove with reference to FIGS. 2A-D.

As shown in FIG. 10B, fluid sample 19 is disposed in fluid sample receptacle 718.

As shown in FIG. 10B, filtration assembly 720 begins in a vertical orientation in which the one or more vacuum-prevention openings 711 defined by fluid container 702 face downward with respect to the Earth, and plunger 703 is in a maximally-distally-advanced position within fluid container 702, reaching distal end 749, or in a close-to-maximally-distally-advanced position near distal end 749 within fluid container 702 (filtration assembly 720 is typically initially set in this position). The one or more vacuum-prevention openings 711 defined by fluid container 702 are coupled in fluid connection with the one or more adaptors 721 of fluid sample receptacle 718, respectively, which, as mentioned above, contains fluid sample 19.

As shown in the transition between FIGS. 10B and 10C, plunger 703 is proximally withdrawn within fluid container 702, while the one or more vacuum-prevention openings 711 defined by fluid container 702 are in fluid connection with the one or more adaptors 721 of cover 42 of fluid sample receptacle 18, and while the one or more valves 709 that regulate the passage of the fluid through filter 705 (e.g., by regulating the passage of fluid through holes 707 in filter support 706) are in a closed position. This proximal withdrawal creates fluid-container space 748 within fluid container 702 and sucks fluid sample 19 from fluid sample receptacle 718, up through the one or more vacuum-prevention openings 711, and into fluid-container space 748 within fluid container 702. Optionally, this step of the method is performed while fluid sample receptacle 718 is disposed below filtration assembly 720 with respect to the Earth, and/or while the one or more vacuum-prevention openings 711 face downward with respect to the Earth.

As shown in the transition between FIGS. 10C and 10D, the proximal withdrawing of plunger 703 is completed and then halted, such as once all or most of fluid sample 19 is sucked into fluid-container space 748. Filtration assembly 720 is disconnected from the one or more adaptors 721 of fluid sample receptacle 718.

As shown in the transition between FIG. 10D and FIG. 10E, the vertical orientation of filtration assembly 720 is changed from an orientation in which the one or more vacuum-prevention openings 711 face downward with respect to the Earth to an orientation in which the one or more vacuum-prevention openings 711 face upward with respect to the Earth, and/or the one or more vacuum-prevention openings 711 are disposed above plunger 703 with respect to the Earth. (During this turning over of filtration assembly 720, fluid sample 19 generally does not leak out of fluid-container space 748 because of the suction created by the lower air pressure within fluid-container space 748 than outside filtration assembly 720.)

As shown in FIG. 10E, the one or more vacuum-prevention openings 711 are closed, such as by plugging with plug 713. Optionally, the one or more vacuum-prevention openings 711 are closed, such as by plugging with plug 713, before the vertical orientation of filtration assembly 720 is changed, as shown in the transition between FIG. 10D and FIG. 10E (configuration not shown).

As shown in the transition between FIGS. 10E and 10F, plunger 703 is distally advanced within fluid container 702, while (a) the one or more valves 709 that regulate the passage of fluid through filter 705 (e.g., by regulating the passage of fluid through holes 707 in filter support 706) are in an open position and (b) the one or more vacuum-prevention openings 711 are closed, thereby forcing fluid sample 19 from fluid-container space 748 within fluid container 702, through filter 705, and into filtrate receptacle 744. This process filters fluid sample 19 to capture, on or within filter 705, particles larger than the pore size of filter 705, which include particulate 31 that may be present in fluid sample 19, while allowing filtrate 27 to pass into filtrate receptacle 744 within plunger 703. Optionally, before performance of this step of the method, fluid sample 19 is incubated and/or combined with growth media 24, such as described hereinabove with reference to FIGS. 2A-E.

As shown in FIG. 10G, the one or more vacuum-prevention openings 711 are opened, such as by removing plug 713.

As shown in the transition between FIGS. 10G and 10H, a cavity 728 is created within fluid container 702 between the distal end of plunger 703 and distal end 749 of fluid container 702, by partially proximally withdrawing plunger 703 within fluid container 702 while the one or more vacuum-prevention openings 711 are open. This process draws air into filter container 702 from outside filtration assembly 720 through the one or more vacuum-prevention openings 711 and thus creates cavity 728 between the distal end of plunger 703 and distal end 749 of fluid container 702 without applying a vacuum force to filter 705. The open state of the one or more vacuum-prevention openings 711 prevents the formation of a vacuum and allows air to be drawn into cavity 728 created within fluid container 702.

FIGS. 10I-K show an optional intermediate step in the testing process of removing excess fluid from filter 705, performed between creating cavity 728 within fluid container 702, described hereinabove with reference to FIGS. 10G-H, and introducing one or more extraction reagents 29 into cavity 728, described hereinbelow with reference to FIG. 10L. Alternatively, the testing method does not include this optional intermediate step.

As shown in FIG. 10I, the one or more vacuum-prevention openings 711 are closed, such as by plugging with plug 713, and, plunger 703 is distally advanced within fluid container 702, while the one or more valves 709 that regulate the passage of fluid through filter 705 (e.g., by regulating the passage of fluid through holes 707 in filter support 706) are in an open position, thereby forcing any fluid sample 19 remaining in cavity 728 through filter 705 and into filtrate receptacle 744 within plunger 703 as filtrate 27.

As shown in FIG. 10J, the one or more vacuum-prevention openings 711 of fluid container 702 are opened, such as by removing plug 713.

As shown in the transition between FIGS. 10J and 10K, cavity 728 is recreated between the distal end of plunger 703 and distal end 749 of fluid container 702, by partially proximally withdrawing plunger 703 within fluid container 702 while the one or more vacuum-prevention openings 711 are open. This process draws air into filter container 702 from outside filtration assembly 720 through the one or more vacuum-prevention openings 711 and thus recreates cavity 728 between the distal end of plunger 703 and distal end 749 of fluid container 702 without applying a vacuum force to filter 705.

As shown in the transition between FIGS. 10L and 10M, one or more extraction reagents 29 are introduced into cavity 728. The one or more vacuum-prevention openings 711 are coupled with the one or more reagent dispensers 714, such as one at a time. The one or more extraction reagents 29 are dispensed from the one or more reagent dispensers 714 sequentially or simultaneously into cavity 728, while the one or more valves 709 that regulate the passage of fluid through filter 705 (e.g., by regulating the passage of fluid through holes 707 in filter support 706) are in a closed position. Typically, the one or more extraction reagents 29 comprise one or more extraction reagents selected from the group consisting of: a detergent, an acetic acid solution, and a sodium nitrite solution. Alternatively, introduction of one or more extraction reagents 29 into cavity 728 can occur simultaneously with creating cavity 728, with or without drawing air into cavity 728 from outside filtration assembly 720 (configuration not shown). Typically, the one or more extraction reagents 29 are introduced into cavity 728 while cavity 728 is disposed above filter 705 with respect to the Earth.

For some applications, a substance configured to improve test sensitivity is introduced into cavity 728, before or after the one or more extraction reagents 29 are introduced into cavity 728. For some applications, the substance configured to improve the test sensitivity comprises one or more substances selected from the group of substances consisting of: non-ionic detergents e.g., Polysorbate-720, polysorbate-80, brij-35, NP-40, and/or Triton X-100, hydrophilic polymers (e.g., PEG (polyethylene glycol)), and quaternary anions (e.g., Betain).

As shown in FIGS. 10M and 10N, filter 705 is bathed in the one or more extraction reagents 29. FIGS. 10M and 10N show the one or more extraction reagents 29 bathing filter 705 containing captured particles larger than the pore size of filter 705 that may include particulate 31 within cavity 728 (optionally, but not necessarily, for an amount of time of 1-30 minutes), while the one or more valves 709 that regulate the passage of fluid through filter 705 (e.g., by regulating the passage of fluid through holes 707 in filter support 706) are in a closed position. FIG. 10N shows that this step of the method prepares an extraction liquid 30 that comprises one or more of the following components: the one or more extraction reagents 29, captured particles larger than the pore size of filter 705 that may include particulate 31, extracted and exposed biological targets 40, and possibly some components or pieces of filter 32 that are mixed or dissolved within extraction liquid 30.

For some applications, a physical extraction method is optionally applied to filter 705 while the one or more extraction reagents 29 bathe filter 705 (such as described hereinabove with reference to FIGS. 4A-E).

Figure 10O:
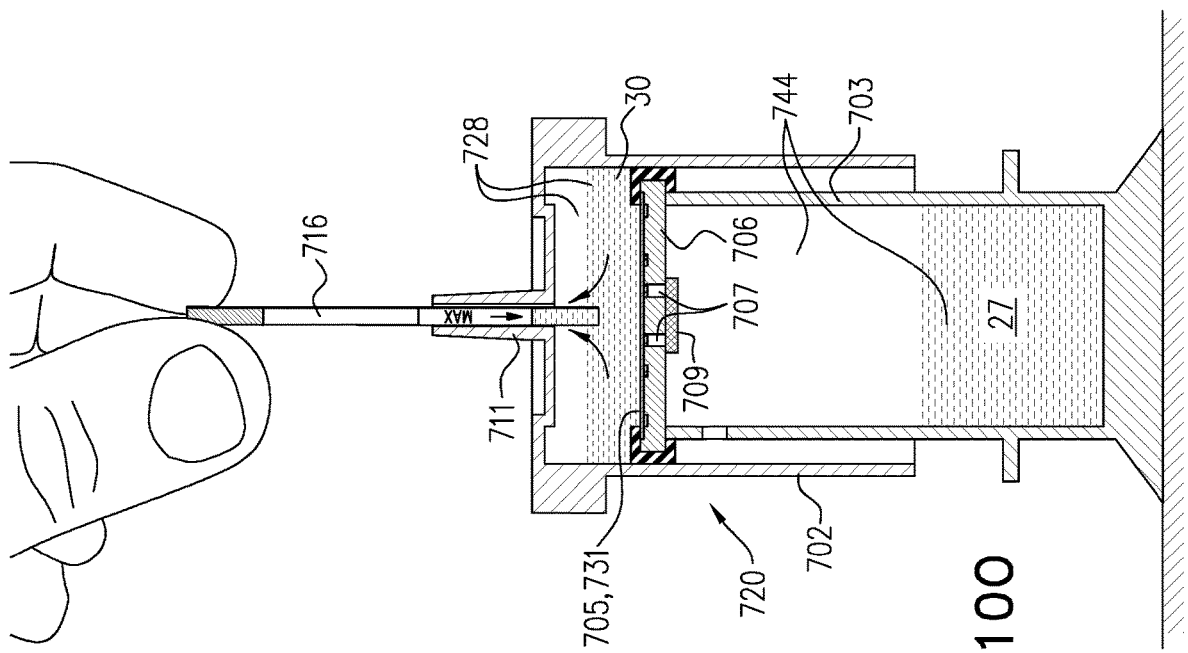

As shown in FIGS. 10O-P, extraction liquid 30 is tested for the presence of particulate 31. For example, as shown in FIG. 10O, detection test 716 may be inserted into the one or more vacuum-prevention openings 711 while open.

As shown in FIG. 10P, the results of detection test 716 may be read by human eye 33. Alternatively, the results may be read by optical reading system 34, described hereinabove with reference to FIG. 1R.

For some applications, the results are read after an amount of time has elapsed of 2 minutes to 5 hours after detection test 716 comes into contact with extraction liquid 30. For example, the results may be read after an amount of time has elapsed of 3 minutes to 2 hours after detection test 716 comes into contact with extraction liquid 30. For example, the results may be read after an amount of time has elapsed of 5 minutes to 20 minutes after detection test 716 comes into contact with extraction liquid 30. Typically, the test results are read to aid in infectious disease diagnosis.

In an embodiment, the techniques and apparatus described herein are combined with techniques and apparatus described in one or more of the following patent applications, which are assigned to the assignee of the present application and are incorporated herein by reference:

PCT Publication WO 2018/158768 to Fruchter et al.;
U.S. Provisional Application 62/727,208, filed Sep. 5, 2018;
U.S. Provisional Application 62/727,268, filed Sep. 5, 2018;
International Application PCT/IL2019/050994, filed Sep. 5, 2019, which published as PCT Publication WO 2020/049566 to Fruchter et al.;
International Application PCT/IL2019/050997, filed Sep. 5, 2019, which published as PCT Publication WO 2020/049569 to Fruchter et al;
U.S. Provisional Application 62/896,295, filed Sep. 5, 2019;
U.S. Provisional Application 62/988,259, filed Mar. 11, 2020;

International Application PCT/IL2020/050957, filed Sep. 3, 2020, which published as PCT Publication WO 2021/044417 to Holtz et al.; and/or International Application PCT/IB2021/052055, filed Mar. 11, 2021 on even dated herewith, entitled, "Testing for Viruses and Cellular Biomarkers," which published as PCT Publication WO 2021/181338 to Fruchter et al.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for testing a fluid sample taken from a body of a patient for the presence of a particulate, the method comprising:
    introducing the fluid sample into a fluid container of a filtration assembly;
    passing the fluid sample through a porous filter of the filtration assembly and into a filtrate receptacle by distally advancing a plunger of the filtration assembly within the fluid container toward a distal end of the fluid container, thereby capturing, on or within the porous filter, by size-based filtration, at least a portion of any particulate present in the fluid sample;
    thereafter, creating a cavity within the fluid container between a distal end of the plunger and the distal end of the fluid container;
    thereafter, preparing an extraction liquid by introducing one or more extraction reagents into the cavity and bathing the porous filter in the one or more extraction reagents, the one or more extraction reagents configured to extract and expose a biological target from any particulate captured on or within the porous filter; and
    thereafter, testing the extraction liquid for the presence of the particulate by testing for the presence of a biological target.

2. The method according to claim 1, wherein testing the extraction liquid for the presence of the particulate consists of testing the extraction liquid while the extraction liquid is within the cavity between the distal end of the plunger and the distal end of the fluid container.

3. The method according to claim 1, wherein testing the extraction liquid for the presence of the particulate consists of testing the extraction liquid after the extraction liquid moves out of the cavity between the distal end of the plunger and the distal end of the fluid container.

4. The method according to claim 1, wherein distally advancing the plunger within the fluid container toward the distal end of the fluid container comprises distally advancing the plunger within the fluid container toward the distal end of the fluid container until the distal end of the fluid container blocks further distal advancement of the plunger.

5. The method according to claim 1, wherein creating the cavity comprises creating the cavity having a volume of between 0.05 and 2.0 cc.

6. The method according to claim 1, wherein the porous filter is located on the distal end of the plunger.

7. The method according to claim 1, wherein passing the fluid sample through the porous filter and into the filtrate receptacle comprises passing the fluid sample through the porous filter and into a filtrate receptacle of the filtration assembly.

8. The method according to claim 7, wherein the filtrate receptacle is located within the plunger.

9. The method according to claim 7, wherein the filtrate receptacle contains a liquid-absorbing substance, which is configured, when mixed with filtrate of the fluid sample within the filtrate receptable, to reduce risk of leakage of the filtrate from the filtration assembly.

10. The method according to claim 7, wherein the filtrate receptacle contains an antimicrobial substance, which is configured, when mixed with filtrate of the fluid sample within the filtrate receptable, to reduce risk of contamination.

11. The method according to claim 1,
    wherein passing the fluid sample through the porous filter and into the filtrate receptacle comprises passing the fluid sample through the porous filter and into a filtrate receptacle of the filtration assembly,
    wherein the filtration assembly includes one or more valves between the porous filter and the filtrate receptacle,
    wherein passing the fluid sample through the porous filter and into the filtrate receptacle comprises passing the fluid sample through the porous filter and into the filtrate receptacle while the one or more valves are open, and
    wherein introducing the one or more extraction reagents into the cavity and bathing the porous filter in the one or more extraction reagents comprises introducing the one or more extraction reagents into the cavity and bathing the porous filter in the one or more extraction reagents while the one or more valves are closed, thereby preventing the one or more extraction reagents from leaking through the porous filter and out of the cavity.

12. The method according to claim 11,
    wherein creating the cavity comprises creating the cavity within the fluid container by proximally partially withdrawing the plunger within the fluid container, while one or more vacuum-prevention openings are open such that proximally partially withdrawing the plunger draws air into the cavity from outside the filtration assembly through the one or more vacuum-prevention openings, and
    wherein the one or more valves are pressure-activated valves, which are configured to automatically open upon application of positive pressure generated by the distal advancing of the plunger within the fluid container while the one or more vacuum-prevention openings are closed, and to automatically close when the positive pressure is not applied.

13. The method according to claim 11,
    wherein the one or more valves comprise one or more non-pressure-activated valves,
    wherein passing the fluid sample through the porous filter and into the filtrate receptacle comprises opening the one or more valves before passing the fluid sample through the porous filter and into the filtrate receptacle while the one or more valves are open, and
    wherein introducing the one or more extraction reagents into the cavity and bathing the porous filter in the extraction reagent comprises introducing the extraction reagent into the cavity and bathing the porous filter in the extraction reagent while the one or more valves are closed, thereby preventing the extraction reagent from leaking through the porous filter and out of the cavity.

14. The method according to claim 1, wherein the particulate is selected from the group of particulates consisting of: a microorganism, a micro-animal, a biological cell, a protein, and a carbohydrate.

15. The method according to claim 14, wherein the particulate is a microorganism, wherein the one or more extraction reagents is configured to extract and expose a microbial target, and wherein testing the extraction liquid comprises testing the extraction liquid for the presence of the microbial target.

16. The method according to claim 15, wherein testing the extraction liquid for the presence of the microbial target comprises testing the extraction liquid for the presence of the microbial antigen by performing an immunoassay on the extraction liquid.

17. The method according to claim 1, wherein the fluid sample taken from the body of the patient is selected from the group of biological body fluids consisting of: blood, bronchoalveolar fluid, gastric fluid, urine, cerebrospinal fluid, and cystic fluid.

18. The method according to claim 1, wherein creating the cavity comprises creating the cavity within the fluid container by proximally partially withdrawing the plunger within the fluid container, while one or more vacuum-prevention openings are open such that proximally partially withdrawing the plunger draws air into the cavity from outside the filtration assembly through the one or more vacuum-prevention openings.

19. The method according to claim 18, wherein introducing the one or more extraction reagents into the cavity comprises introducing the one or more extraction reagents into the cavity through the one or more vacuum-prevention openings.

20. The method according to claim 18, wherein the fluid container is shaped so as to define the one or more vacuum-prevention openings.

21. The method according to claim 20, wherein the fluid container is shaped such that the one or more vacuum-prevention openings pass through the distal end of the fluid container.

22. The method according to claim 18, wherein the distal end of the plunger is shaped so as to define the one or more vacuum-prevention openings.

23. The method according to claim 18, wherein passing the fluid sample through the porous filter and into the filtrate receptacle by distally advancing the plunger within the fluid container toward the distal end of the fluid container comprises passing the fluid sample through the porous filter and into the filtrate receptacle by distally advancing the plunger within the fluid container toward the distal end of the fluid container while the one or more vacuum-prevention openings are closed.

24. The method according to claim 18, further comprising, after creating the cavity and before preparing the extraction liquid:
pushing at least a portion of the air in the cavity through the porous filter by again distally advancing the plunger within the fluid container toward the distal end of the fluid container; and
thereafter, recreating the cavity between the distal end of the plunger and the distal end of the fluid container by again proximally partially withdrawing the plunger within the fluid container, while the one or more vacuum-prevention openings are open such that proximally partially withdrawing the plunger draws other air into the cavity from outside the filtration assembly.

25. The method according to claim 24, wherein pushing at least a portion of the air in the cavity through the porous filter by again distally advancing the plunger within the fluid container toward the distal end of the fluid container comprises pushing at least a portion of the air in the cavity through the porous filter by again distally advancing the plunger within the fluid container toward the distal end of the fluid container while the one or more vacuum-prevention openings are closed.

26. A kit for testing a fluid sample taken from a body of a patient for the presence of a particulate, the kit comprising:
(i) a filtration assembly comprising:
a fluid container, which is shaped so as to define a proximal opening;
a plunger, which is configured to be inserted into the proximal opening of the fluid container so as to define a fluid-container space between a distal end of the plunger and a distal end of the fluid container when the plunger is not fully distally advanced within the fluid container; and
a porous filter,
wherein the filtration assembly is configured:
such that distal advancement of the plunger within the fluid container toward the distal end of the fluid container pushes the fluid sample through the porous filter, thereby capturing, on or within the porous filter, by size-based filtration, at least a portion of any particulate present in the fluid sample, and
to create a cavity between the distal end of the plunger and the distal end of the fluid container after the distal advancement of the plunger; and
(ii) one or more extraction reagents, configured to extract and expose a biological target from any of the particulate captured on or within the porous filter.

27. The kit according to claim 26, wherein the porous filter has an average nominal pore size of between 0.2 and 3.0 microns.

28. The kit according to claim 26, wherein the porous filter is located on the distal end of the plunger.

29. The kit according to claim 26, further comprising a lateral flow immunoassay.

30. The kit according to claim 26,
wherein the filtration assembly is shaped so as to define one or more vacuum-prevention openings, which, when open, provide fluid communication between the fluid-container space and outside the filtration assembly, and
wherein the filtration assembly is configured such that proximal partial withdrawal of the plunger within the fluid container while the one or more vacuum-prevention openings are open, after the distal advancement of the plunger while the one or more vacuum-prevention openings are closed, creates the cavity between the distal end of the plunger and the distal end of the fluid container and draws air into the cavity from outside the filtration assembly through the one or more vacuum-prevention openings.

31. The kit according to claim 30, wherein the fluid container is shaped so as to define the one or more vacuum-prevention openings.

32. The kit according to claim 30, wherein the distal end of the plunger is shaped so as to define the one or more vacuum-prevention openings.

33. The kit according to claim 30, further comprising a filtrate receptacle located within the plunger, wherein the filtration assembly is configured such that the distal advancement of the plunger within the fluid container toward the distal end of the fluid container while the one or more vacuum-prevention openings are closed pushes the fluid sample through the porous filter and into the filtrate receptacle.

34. The kit according to claim 33, wherein the plunger includes one or more valves between the porous filter and the filtrate receptacle, and wherein the filtration assembly is configured such that when the one or more extraction reagents are introduced into the cavity and the one or more valves are in a closed position, the one or more valves prevent the one or more extraction reagents from leaking through the porous filter and out of the cavity, such that the one or more reagents bathe the porous filter.

35. The kit according to claim 34, wherein the one or more valves are pressure-activated valves, which are configured to automatically open upon application of positive pressure generated by the distal advancement of the plunger within the fluid container while the one or more vacuum-prevention openings are closed, and to automatically close when the positive pressure is not applied.

36. The kit according to claim 33, wherein the filtrate receptacle contains a liquid-absorbing substance, which is configured, when mixed with filtrate of the fluid sample within the filtrate receptable, to reduce risk of leakage of the filtrate from the filtration assembly.

37. The kit according to claim 33, wherein the filtrate receptacle contains an antimicrobial substance, which is configured, when mixed with filtrate of the fluid sample within the filtrate receptable, to reduce risk of contamination.

\* \* \* \* \*